(12) United States Patent
Ibuki et al.

(10) Patent No.: US 8,353,196 B2
(45) Date of Patent: Jan. 15, 2013

(54) GAS-MIXTURE-NONUNIFORMITY ACQUISITION APPARATUS AND GAS-MIXTURE-STATE ACQUISITION APPARATUS FOR INTERNAL COMBUSTION ENGINE

(75) Inventors: Taku Ibuki, Gotenba (JP); Shigeki Nakayama, Susono (JP); Kazuhisa Inagaki, Komaki (JP); Matsuei Ueda, Nisshin (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 1082 days.

(21) Appl. No.: 12/232,792

(22) Filed: Sep. 24, 2008

(65) Prior Publication Data
US 2010/0071662 A1 Mar. 25, 2010

(51) Int. Cl.
*G01M 15/00* (2006.01)
(52) U.S. Cl. .................................................... 73/35.02
(58) Field of Classification Search ............... 73/35.02, 73/53.05, 114.38, 114.52, 114.53, 114.55
See application file for complete search history.

(56) References Cited

U.S. PATENT DOCUMENTS

| | | | | |
|---|---|---|---|---|
| 7,401,602 B2* | 7/2008 | Nakayama et al. | | 123/585 |
| 7,537,382 B2* | 5/2009 | Ibuki et al. | | 374/144 |
| 2007/0044781 A1* | 3/2007 | Nakayama et al. | | 123/704 |
| 2008/0196488 A1* | 8/2008 | Bauer et al. | | 73/114.53 |
| 2009/0097525 A1* | 4/2009 | Ibuki et al. | | 374/29 |

FOREIGN PATENT DOCUMENTS

| | | |
|---|---|---|
| JP | A-7-34894 | 2/1995 |
| JP | A-2001-254645 | 9/2001 |
| JP | A-2002-54491 | 2/2002 |
| JP | A-2003-172198 | 6/2003 |
| JP | A-2007-247487 | 9/2007 |

OTHER PUBLICATIONS

Inagaki, K. et al. *1st Report: Phenomenological Multi-zone PDF Model for Predicting the Transient Behavior of Diesel Engine Combustion.* Universal Diesel Engine Simulator. SAE Paper. Dec. 9, 2008.
Inagaki, K. et al. *Diesel Combustion Prediction in Transient Operation using a New Cycle-simulation (First Report). High-precision Combustion Model Combined with Multi-zone PDF Concept.* vol. 38, No. 5, Sep. 2007.
Ueda, M. et al. *Diesel Combustion Prediction in Transient Operation using a New Cycle-simulation (Second Report). Transient Performance Prediction using the Combustion Model.* vol. 38, No. 5, Sep. 2007.
Hiroyasu, H. et al. *Fuel Spray Penetration and Spray Angle in Diesel Engines.* No. 21, 1980.

* cited by examiner

*Primary Examiner* — Eric S McCall
(74) *Attorney, Agent, or Firm* — Oliff & Berridge, PLC

(57) ABSTRACT

In a gas-mixture-nonuniformity acquisition apparatus for an internal combustion engine, the nonuniformity of fuel concentration within a gas mixture is acquired under the assumption that, in a process in which a cylinder interior gas taken into a combustion chamber of the engine and fuel injected into the combustion chamber mix together to form a gas mixture, a collision reaction repeatedly takes place within the gas mixture in such a manner that, due to collision of two gas volumes having different fuel mass ratios, respective portions of the two gas volumes mix together, and the mixed portions separate from the corresponding gas volumes and form a portion or the entirety of another gas volume having a fuel mass ratio different from those of the two gas volumes.

15 Claims, 28 Drawing Sheets

BEFORE INJECTION

POST INJECTION TIME $t_{z2}$

GAS-MIXTURE-NONUNIFORMITY ACQUISITION APPARATUS AND GAS-MIXTURE-STATE ACQUISITION APPARATUS FOR INTERNAL COMBUSTION ENGINE

BACKGROUND OF THE INVENTION

1. Field of the Invention

The present invention relates to a gas-mixture-nonuniformity acquisition apparatus for an internal combustion engine which acquires the degree of nonuniformity (hereinafter simply referred to as "nonuniformity") of a gas mixture formed within a combustion chamber of the internal combustion engine through mixture of a cylinder interior gas (a gas having being taken into the combustion chamber) and injected fuel. The present invention also relates to a gas-mixture-state acquisition apparatus for an internal combustion engine which acquires the state of such a gas mixture by reference to the nonuniformity of the gas mixture.

2. Description of the Related Art

Accurate prediction of combustion noise, generated torque, etc. is important for combustion control of an internal combustion engine. Accurate prediction of combustion noise, generated torque, etc. requires accurate prediction of a heat generation rate (heat generation speed) within each combustion chamber in relation to crank angle. This heat generation rate depends on a reaction speed of fuel (fuel vapor) within a gas mixture formed in the combustion chamber, and the reaction speed of fuel greatly depends on the state (fuel concentration, temperature, etc.) of the gas mixture. Therefore, accurate prediction of the state of the gas mixture is needed for accurate prediction of the heat generation rate. There have been known various methods for predicting the state of gas mixture (see, for example, Japanese Patent Application Laid-Open (kokai) No. 2001-254645).

Incidentally, when a gas mixture formed within a combustion chamber is observed microscopically, the fuel concentration (fuel mass concentration) within the gas mixture changes in accordance with the position within a region occupied by the gas mixture. Therefore, the heat generation rate, which is greatly influenced by the fuel concentration within the gas mixture, also changes in accordance with the position within the region occupied by the gas mixture. In other words, since the fuel concentration of the gas mixture formed within the combustion chamber becomes nonuniform, the heat generation rate becomes nonuniform. As a result, conceivably, the heat generation rate within the entire combustion chamber is greatly influenced by the nonuniformity of the fuel concentration within the gas mixture.

From the above, accurately acquiring the nonuniformity of the fuel concentration within the gas mixture is considered to be important for accurate prediction of the heat generation rate (accordingly, combustion noise, generated torque, etc.). However, the above-mentioned publication does not describe the nonuniformity of fuel concentration within a gas mixture at all. Meanwhile, methods for accurately acquiring the nonuniformity of fuel concentration within a gas mixture have conventionally been described in various papers, etc.

However, any method requires solving a complicated differential equation using a probability density function or the like, and involves a huge calculation load. Accordingly, there has been desire for developing a method for accurately acquiring the nonuniformity of fuel concentration within a gas mixture through a relatively simple calculation which does not require solving a complicated differential equation or the like.

SUMMARY OF THE INVENTION

In view of the foregoing, an object of the present invention is to provide a gas-mixture-nonuniformity acquisition apparatus for an internal combustion engine which can accurately acquire the nonuniformity of fuel concentration within a gas mixture through a relatively simple calculation.

In a gas-mixture-nonuniformity acquisition apparatus according to the present invention, it assumed that, in a process in which a cylinder interior gas taken into a combustion chamber of the engine and fuel injected into the combustion chamber mix together to form a gas mixture, "collision reaction" repeatedly occurs within the gas mixture. The "collision reaction" refers to a reaction in which, due to collision of two gas volumes having different fuel mass ratios, respective portions of the two gas volumes mix together, the mixed portions separate from the corresponding gas volumes, respectively, and form a portion or the entirety of another gas volume having a fuel mass ratio different from those of the two gas volumes.

The gas-mixture-nonuniformity acquisition apparatus comprises nonuniformity acquisition means which acquires a nonuniformity of fuel concentration (fuel mass concentration) within the gas mixture under such assumption. In the present invention, the gas mixture is considered to be an aggregate of gas volumes having different fuel mass ratios. As a result of the above-described collision reaction being successively repeated for each combination of two arbitrary gas volumes among two or more gas volumes, the distribution of the quantities (masses, volumes, etc.) of the gas volumes within the gas mixture changes. In the present invention, the nonuniformity of fuel concentration within the gas mixture (hereinafter may be simply referred to as the "nonuniformity") is acquired on the basis of, for example, the distribution of the quantities of the gas volumes.

Notably, in the present invention, the term "fuel" in the phrase "fuel mass ratio" means fuel (fuel vapor) newly supplied into the combustion chamber by means of fuel injection. Therefore, the fuel does not contain fuel previously included in cylinder interior gas (e.g., unburned fuel remaining in the cylinder interior gas due to EGR or the like). In such a case, the fuel mass ratio of the cylinder interior gas (which does not include fuel vapor) is "0." Meanwhile, the fuel mass ratio of fuel vapor (which does not include the cylinder interior gas) produced by means of fuel injection is "1."

Specifically, the nonuniformity acquisition means is configured to handle a volume of the cylinder interior gas whose fuel mass ratio is "0" and a volume of the fuel vapor whose fuel mass ratio is "1" as gas volumes to be subjected to the collision reaction. That is, in the present invention, it is considered that the cylinder interior gas itself (a volume thereof) and the fuel vapor itself (a volume thereof) are contained as portions of the gas mixture. Notably, the fuel mass ratio of the volume of the cylinder interior gas may be determined in consideration of the fuel previously included in the cylinder interior gas (e.g., unburned fuel remaining in the cylinder interior gas due to EGR or the like).

In a process in which a gas mixture is being formed within the combustion chamber, with elapse of time, the cylinder interior gas is continuously taken into the gas mixture to form a portion thereof, and, in a period in which fuel is injected, injected fuel (fuel vapor) is taken into the gas mixture to form a portion thereof. Accordingly, an increase in the quantity of the volume of the cylinder interior gas (that is, the gas volume whose fuel mass ratio is "0") within the gas mixture depends on the quantity of cylinder interior gas newly taken in with elapse of time. Further, an increase in the quantity of the volume of the fuel vapor (that is, the gas volume whose fuel mass ratio is "1") within the gas mixture depends on the quantity of fuel newly injected with elapse of time.

Preferably, the nonuniformity acquisition means is configured to acquire the nonuniformity under the assumption that the above-described collision reaction is successively performed for all combinations each formed by two arbitrary gas volumes among the two or more gas volumes located within the gas mixture and having different fuel mass ratios. By virtue of this configuration, for example, the distribution (that is, nonuniformity) of the quantities of the gas volumes within the gas mixture can be obtained accurately.

Preferably, the gas-mixture-nonuniformity acquisition apparatus according to the present invention further comprises fuel-mass-ratio specifying means which specifies the fuel mass ratio of the another gas volume by making use of the law of conservation of mass regarding fuel that the sum of masses of fuels contained in the respective portions of the collided two gas volumes is equal to a value obtained by multiplying the sum of masses of the respective portions of the two gas volumes by the fuel mass ratio of the another gas volume. The "mass of fuel contained in a portion of a gas volume" can be obtained by multiplying the mass of the portion of the gas volume by the fuel mass ratio of the gas volume.

When it is assumed that the law of conservation of mass stands for fuel which takes part in mixing and separation before and after the collision reaction, the fuel mass ratio of the "another gas volume," which is a gas volume whose quantity increases as a result of the collision reaction, can be specified simply and easily.

The gas-mixture-nonuniformity acquisition apparatus of the present invention further comprises gas-volume quantity acquisition means for acquiring the quantities of two or more gas volumes located within the gas mixture and having different fuel mass ratios; and mixing volume acquisition means for acquiring a mixing volume which is a volume in which the respective portions of the collided two gas volumes mix together. The gas-volume quantity acquisition means is configured to calculate decrease amounts of the quantities of the collided two gas volumes corresponding to the respective portions and an increase amount of the quantity of the another gas volume, by use of the acquired mixing volume, to thereby update and acquire the quantities of the two gas volume and the quantity of the another gas volume. The nonuniformity acquisition means acquires the nonuniformity on the basis of the distribution of the updated and acquired quantities of the respective gas volumes. Here, the "quantity" of a gas volume refers to a mass, volume, or the like of the gas volume.

By virtue of this configuration, a mixing volume which is a volume in which the two gas volumes mix together as a result of the collision reaction is obtained. This mixing volume is equal to the respective volumes of the above-described portions which separate from the two gas volumes to be subjected to the collision reaction and form the another gas volume. The respective quantities (masses) of the above-described portions can be obtained by use of the mixing volume (for example, multiplying the mixing volume by the density of each gas volume).

In addition, the respective quantities of the above-described portions are equal to the respective decrease amounts of the quantities of the two gas volumes, and the sum of the respective quantities of the above-described portions is equal to the increase amount of the quantity of the another gas volume. Therefore, by virtue of the above-described configuration, the respective amounts by which the quantities of the two gas volumes decrease as a result of the collision reaction and the amount by which the quantity of the another gas volume increases as a result of the collision reaction can be obtained simply and easily by use of the mixing volume.

Since the respective quantities of the two gas volumes and the quantity of the another gas volume can be updated simply and easily, the distribution of the quantities of the gas volumes within the gas mixture can be updated simply and easily. As a result, the nonuniformity can be obtained simply and easily on the basis of the distribution of the quantities of the gas volumes.

Notably, preferably, the nonuniformity is the standard deviation, variance, or the like regarding the fuel mass ratio, which is obtained on the basis of the updated and acquired distribution of the quantities of the gas volumes.

When the mixing volume acquisition means is provided, the mixing volume acquisition means is preferably configured to acquire the mixing volume on the basis of smaller one of the quantities (volumes) of the collided two gas volumes.

The mixing volume, which is a volume in which the collided two gas volumes mix together, can be considered to be equal to a volume through which the collided two gas volumes interact. The volume in which the collided two gas volumes interact is considered to relate to a volume (hereinafter referred to as a "passage volume") which is defined by one of the gas volumes which is smaller in volume (hereinafter referred to as the "small gas volume") when the entirety of the small gas volume passes through the other gas volume which is larger in volume (hereinafter referred to as the "large gas volume").

This passage volume is considered to greatly depend on the quantity (volume; specifically, in the case where the gas volume is considered to has the form of a sphere, the cross sectional area of the sphere) of the small gas volume. Since the passage volume can be obtained through employment of the above-described configuration, the mixing volume which relates to the passage volume can be obtained.

In this case, preferably, the mixing volume acquisition means is configured to acquire the mixing volume on the basis of a ratio of the volume of the large gas volume to the volume of the entire gas mixture. The ratio (probability) at which the small gas volume passes through the interior of the large gas volume can be assumed to be equal to the ratio of the volume of the large gas volume to the volume of the entire gas mixture. Under such assumption, the mixing volume becomes a value equal to (or corresponding to) a value obtained by multiplying the passage volume by the ratio. The above-described configuration is based on such knowledge. By virtue of this configuration, the mixing volume can be obtained more accurately.

When the mixing volume acquisition means is provided, preferably, the gas-mixture-nonuniformity acquisition apparatus of the present invention further comprises gas-volume velocity acquisition means for acquiring velocities of the two or more gas volumes located within the gas mixture and having different fuel mass ratios; and the mixing volume acquisition means is configured to acquire the mixing volume on the basis of a difference between the velocities of the collided two gas volumes.

The passage volume greatly depends not only on the quantity of the small gas volume (e.g., the cross sectional area of the sphere of the small gas volume), but also on the difference between the velocities of the small and large gas volumes. Since the passage volume can be obtained through employment of the above-described configuration, the mixing volume which relates to the passage volume can be obtained.

When the gas-volume velocity acquisition means is provided, the gas-volume velocity acquisition means is preferably configured to update and acquire the velocity of the another gas volume by making use of the law of conservation of momentum that the sum of a momentum of the another gas volume before the collision reaction and respective momentums of the separated portions of the two gas volumes before the collision reaction is equal to a momentum of the another gas volume after the collision reaction.

When it is assumed that the law of conservation of momentum stands between the another gas volume and the fuel which takes part in mixing and separation before and after the collision reaction, the velocity of the another gas volume after the collision reaction can be updated simply and easily.

When the gas-volume velocity acquisition means is provided, the gas-volume velocity acquisition means is preferably configured to acquire the velocity of the volume of the cylinder interior gas while regarding the velocity of the cylinder interior gas newly taken into the gas mixture to be zero.

It is considered that the cylinder interior gas is gradually taken into the gas mixture with elapse of time because the region of fuel spray (accordingly, the region of the gas mixture) expands with elapse of time within the cylinder interior gas which remains stationary within the combustion chamber. That is, the velocity of the cylinder interior gas newly taken into the gas mixture can be considered to be zero. The above-described configuration is based on this point of view.

Thus, the momentum of the cylinder interior gas newly taken into the gas mixture becomes "0." Accordingly, in the case where the velocity of a volume of the cylinder interior gas (a gas volume whose fuel mass ratio is "0"), which changes as result of the cylinder interior gas being newly taken into the gas mixture, is calculated by making use of the law of conservation of momentum or the like, the calculation can be simplified. Notably, the velocity of the cylinder interior gas newly taken into the gas mixture may be determined in consideration of a gas flow within the cylinder (swirl, squish, etc.).

When the gas-volume velocity acquisition means is provided, the gas-volume velocity acquisition means is preferably configured to acquire the velocity of the volume of the fuel vapor by making use of the velocity of the injected fuel. The velocity of the fuel vapor newly added to the gas mixture to form a portion thereof can be considered to be equal to the velocity of fuel injected from a fuel injection valve. The velocity of fuel injected from the fuel injection valve can be obtained simply and accurately by a well known equation described in various papers or the like. The above-described configuration is based on this point of view.

Thus, the momentum of the fuel vapor newly added to the gas mixture to form a portion thereof can be obtained simply and accurately. Accordingly, in the case where the velocity of a volume of the fuel vapor (a gas volume whose fuel mass ratio is "1"), which changes as result of the fuel vapor being newly added to the gas mixture to form a portion thereof is calculated by making use of the law of conservation of momentum or the like, the velocity of the volume of the fuel vapor can be calculated easily and accurately.

Further, a gas-mixture-state acquisition apparatus according to the present invention comprises gas-mixture-state acquisition means for acquiring the state of the gas mixture by making use of the nonuniformity of fuel concentration within the gas mixture acquired by the gas-mixture-nonuniformity acquisition apparatus of the present invention. The "state" of the gas mixture refers to the temperature, fuel concentration, or the like of the gas mixture.

By virtue of this configuration, the state of the gas mixture is acquired in consideration of the nonuniformity within the gas mixture. Therefore, the state of the gas mixture can be acquired accurately, as compared with the case where the state of the gas mixture is acquired without consideration of the nonuniformity.

In this case, preferably, the gas-mixture-state acquisition means comprises gas-mixture-temperature acquisition means for acquiring a temperature of the gas mixture; and fuel-reaction-speed acquisition means for acquiring a reaction speed (combustion speed) of the fuel while changing a method of acquiring the reaction speed of the fuel within the gas mixture depending on whether or not the temperature of the gas mixture has exceeded a predetermined ignition temperature.

More specifically, the fuel-reaction-speed acquisition means is configured such that the fuel-reaction-speed acquisition means acquires the reaction speed of the fuel in consideration of premix combustion based on low-temperature oxidation reaction when the temperature of the gas mixture has not yet exceeded the predetermined ignition temperature, and acquires the reaction speed of the fuel in consideration of diffusion combustion and premix combustion based on high-temperature oxidation reaction when the temperature of the gas mixture has exceeded the predetermined ignition temperature. The ignition temperature refers to a temperature at which high-temperature oxidation reaction (so-called hot flame reaction) of fuel starts and which can be obtained through an experiment, simulation, or the like.

It is known that in the case where the temperature of the gas mixture has not yet exceeded the ignition temperature, the fuel within the gas mixture combusts in such a manner that premix combustion based on low-temperature oxidation reaction (that is, cool flame reaction) occurs predominantly. Meanwhile, in the case where the temperature of the gas mixture has exceeded the ignition temperature, the reaction speed is calculated in consideration of diffusion combustion as well as premix combustion based on high-temperature oxidation reaction as a manner of combustion of the fuel within the gas mixture. It has been found that heat generation rates calculated in consideration of the diffusion combustion accurately coincide with the actually measured values (the details will be described later).

Therefore, when the above-described configuration is employed, the reaction speed (combustion speed) of fuel can be calculated accurately before and after a point at which the temperature of the gas mixture exceeds the ignition temperature. As a result, combustion noise, generated torque, etc. can be predicted accurately.

Moreover, preferably, the fuel-reaction-speed acquisition means is configured as follows. In the case where the injection of fuel continues even after the temperature of the gas mixture has exceeded the predetermined ignition temperature, the fuel-reaction-speed acquisition means divides the gas mixture into a pre-ignition injected portion based on fuel injected before the temperature of the gas mixture has exceeded the predetermined ignition temperature and a prost ignition injected portion based on fuel injected after the temperature of the gas mixture has exceeded the predetermined ignition temperature, individually handles the pre-ignition injected portion and the post-ignition injected portion, acquiring the reaction speed of fuel for the pre-ignition injected portion in consideration of the diffusion combustion and the premix combustion based on the high-temperature oxidation reaction, and acquiring the reaction speed of fuel for the post-ignition injected portion in consideration of the diffusion combustion only.

In the case where the injection of fuel continues even after the temperature of the gas mixture has exceeded the predetermined ignition temperature, the reaction speed of fuel for the entire gas mixture is calculated, while considering that, in addition to premix combustion based on high-temperature oxidation reaction, diffusion combustion occurs in the pre-ignition injected portion as in the above-described case, and only the diffusion combustion occurs in the post-ignition injected portion. It has been found that heat generation rates obtained through such calculation more accurately coincide with the actually measured values (the details will be described later).

Therefore, when the above-described configuration is employed, the reaction speed (combustion speed) of fuel can be calculated accurately even in the case where the injection of fuel continues even after the temperature of the gas mixture has exceeded the predetermined ignition temperature. As a result, combustion noise, generated torque, etc. can be predicted accurately.

DESCRIPTION OF THE PREFERRED EMBODIMENT

With reference to the drawings, there will now be described a gas-mixture-state acquisition apparatus according to an embodiment of the present invention which includes a gas-mixture-nonuniformity acquisition apparatus for an internal combustion engine (diesel engine) according to the present invention. In addition to the state of a gas mixture, the gas-mixture-state acquisition apparatus estimates a heat generation rate (heat generation speed) based on a reaction of fuel, in relation to crank angle. Further, the gas-mixture-state acquisition apparatus estimates the nonuniformity of fuel concentration within a gas mixture.

Figure 1:
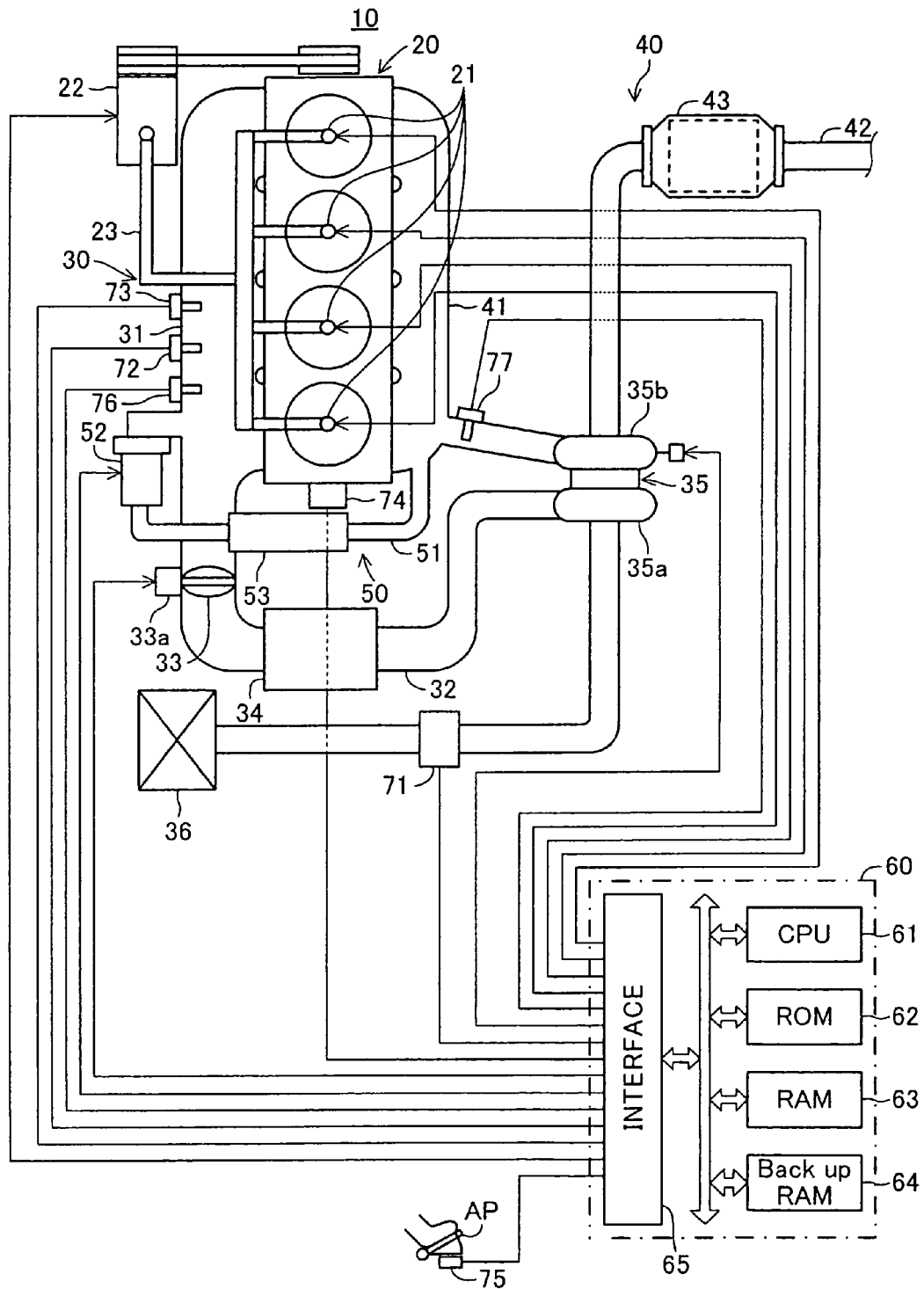
FIG. 1 a schematic diagram showing the overall configuration of a system in which a gas-mixture-state acquisition apparatus including a gas-mixture-nonuniformity acquisition apparatus for an internal combustion engine according to an embodiment of the present invention is applied to a four-cylinder internal combustion engine (diesel engine)

FIG. 1 a schematic diagram showing the overall configuration of a system in which the gas-mixture-state acquisition apparatus according to the embodiment of the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electric control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electric control apparatus 60. In accordance with a drive signal from the electric control apparatus 60 (an instruction signal corresponding to a base fuel injection pressure Pcrbase to be described later), the fuel injection pump 22 pressurizes fuel in such a manner that the actual injection pressure (discharge pressure) of fuel becomes equal to the base fuel injection pressure Pcrbase.

Thus, fuel pressurized to the base fuel injection pressure Pcrbase is supplied from the fuel injection pump 22 to the fuel injection valves 21. Moreover, the fuel injection valves 21 are electrically connected to the electric control apparatus 60. In accordance with a drive signal (an instruction signal corresponding to an fuel injection quantity (mass) Qfin) from the electric control apparatus 60, each of the fuel injection valves 21 opens for an injection period TAU so as to inject, directly to the combustion chamber of the corresponding cylinder, the fuel pressurized to the base fuel injection pressure Pcrbase, in the fuel injection quantity Qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electric control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electric control apparatus 60 so as to change the quantity of exhaust gas to be circulated (exhaust-gas circulation quantity; EGR-gas flow rate).

The electric control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data when necessary. The backup RAM 64 stores data in a state in which the power supply is on, and stands the stored data even after the power supply is shut off. The interface 65 contains A/D converters.

The interface 65 is connected to a hot-wire-type airflow meter 71 disposed in the intake pipe 32; an intake gas temperature sensor 72 provided in the intake passage to be located downstream of the throttle valve 33 and downstream of a point where the exhaust circulation pipe 51 is connected to the intake passage; an intake pipe pressure sensor 73 provided in the intake passage to be located downstream of the throttle valve 33 and downstream of the point where the exhaust circulation pipe 51 is connected to the intake passage; a crank position sensor 74; an accelerator opening sensor 75; an intake-gas oxygen concentration sensor 76 provided in the intake passage to be located downstream of the throttle valve 33 and downstream of the point where the exhaust circulation pipe 51 is connected to the intake passage; and an exhaust-gas oxygen concentration sensor 77 provided at the downstream-side merging portion of the exhaust manifold 41. The interface 65 receives respective signals from these sensors, and supplies the received signals to the CPU 61. Further, the interface 65 is connected to the fuel injection valves 21, the fuel injection pump 22, the throttle valve actuator 33a, and the EGR control valve 52; and outputs corresponding drive signals to these components in accordance with instructions from the CPU 61.

The hot-wire-type airflow meter 71 measures the mass flow rate of intake air passing through the intake passage (intake new air quantity per unit time; new air quantity per unit time), and generates a signal indicating the mass flow rate Ga (air flow rate Ga). The intake gas temperature sensor 72 detects the temperature of gas taken into each cylinder (that is, each combustion cumber; each cylinder interior) of the engine 10 (i.e., intake gas temperature), and generates a signal representing the intake gas temperature Tb. The intake pipe pressure sensor 73 measures the pressure of the gas taken into each cylinder of the engine 10 (i.e., intake pipe pressure), and generates a signal representing the intake pipe pressure Pb.

The crank position sensor 74 detects the absolute crank angle of each cylinder, and generates a signal representing the actual crank angle CAact and engine speed NE; i.e., rotational speed of the engine 10. The accelerator opening sensor 75 detects an amount by which an accelerator pedal AP is operated, and generates a signal representing the accelerator pedal operated amount Accp. The intake-gas oxygen concentration sensor 76 detects the oxygen concentration of intake gas, and generates a signal representing intake-gas oxygen concentration RO2in. The exhaust-gas oxygen concentration sensor 77 detects the oxygen concentration of exhaust gas, and generates a signal representing exhaust-gas oxygen concentration RO2ex Outline of a Gas-Mixture-State Estimation Method:

Next, there will be described a gas-mixture-state estimation method performed by the gas-mixture-state acquisition apparatus, which includes the gas-mixture-nonuniformity acquisition apparatus having the above-described configuration (hereinafter may be referred to as the "present apparatus").

Figure 2:
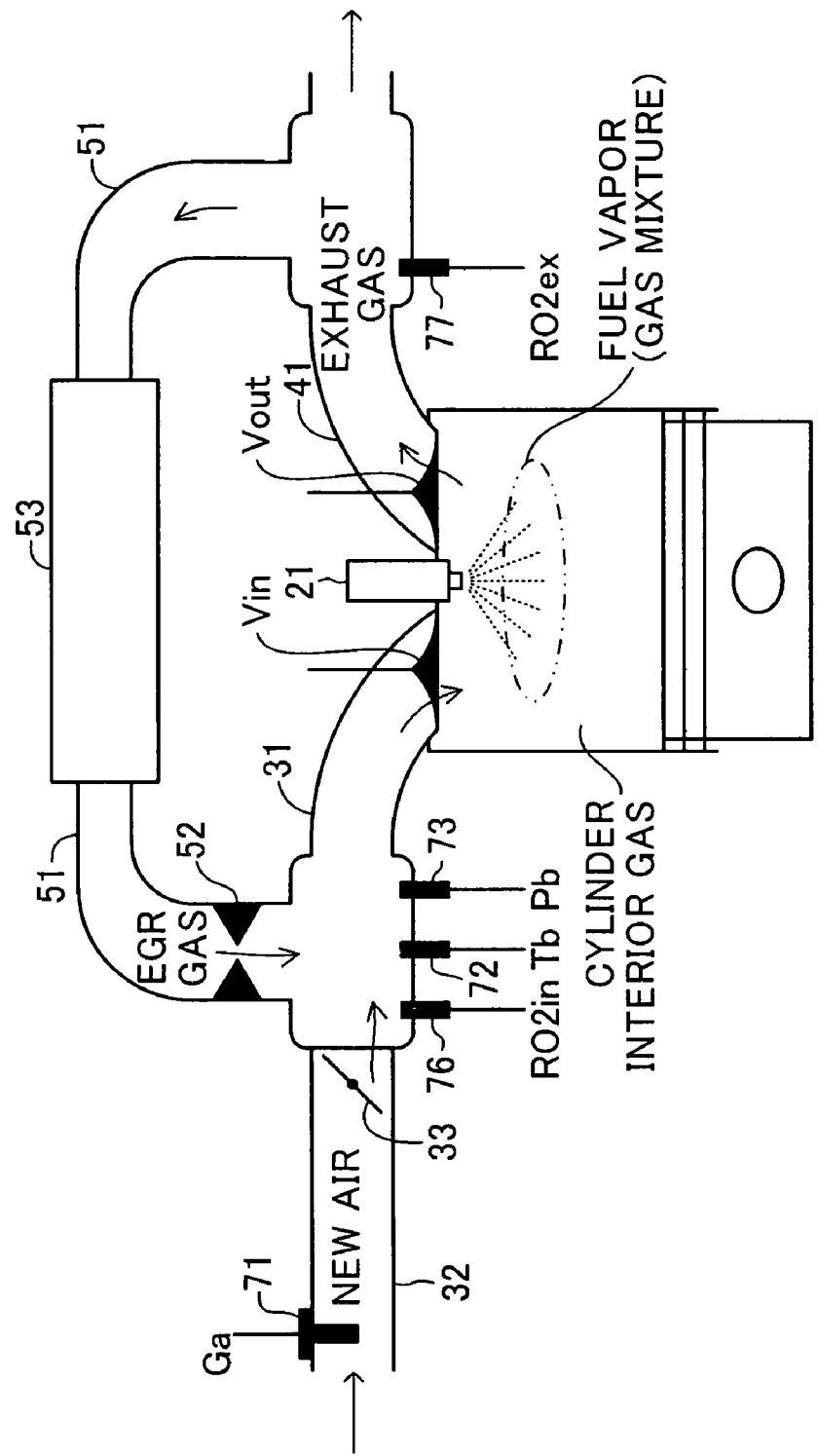
FIG. 2 is a diagram schematically showing a state in which gas is taken from an intake manifold to a certain cylinder and is then discharged to an exhaust manifold.

FIG. 2 is a diagram schematically showing a state in which gas is taken from the intake manifold 31 into a certain cylinder (cylinder interior; combustion chamber) of the engine 10 and is then discharged to the exhaust manifold 41 after combustion. As shown in FIG. 2, the gas taken into the combustion chamber (accordingly, cylinder interior gas) includes new air taken from the tip end of the intake pipe 32 via the throttle valve 33, and EGR gas taken from the exhaust circulation pipe 51 via the EGR control valve 52.

The ratio (i.e., EGR ratio) of the quantity (mass) of the taken EGR gas to the sum of the quantity (mass) of the taken new air and the quantity (mass) of the taken EGR gas changes depending on the opening of the throttle valve 33 and the opening of the EGR control valve 52, which are properly controlled by the electric control apparatus 60 (CPU 61) in accordance with the operating condition.

During an intake stroke, the new air and the EGR gas are taken in the combustion chamber via an opened intake valve Vin as the piston moves downward, and the thus-produced gas mixture serves as cylinder interior gas. The cylinder interior gas is confined within the combustion chamber when the intake valve Vin closes near a point in time when the piston has reached compression bottom dead center, and then compressed in a subsequent compression stroke as the piston moves upward. The point in time when the intake valve Vin closes will be also referred to as "IVC."

When the piston reaches the vicinity of compression top dead center (specifically, when a fuel injection (start) timing (crank angle) CAinj to be described later comes), the present apparatus opens the corresponding fuel injection valve 21 for an injection period TAU corresponding to the fuel injection quantity Qfin. As a result, liquid fuel is continuously injected from the fuel injection valve 21 directly into the combustion chamber (i.e., toward the cylinder interior gas) over the injection period TAU from the fuel injection timing CAinj. This injected fuel immediately becomes fuel vapor due to heat received from the cylinder interior gas whose temperature has increased as a result of compression, and takes the cylinder interior gas therein to produce a gas mixture (=the fuel vapor+ the cylinder interior gas) with elapse of time. The gas mixture spreads conically within the combustion chamber.

Figure 3:
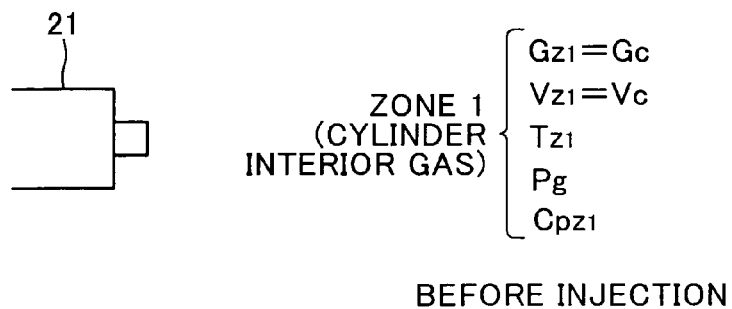
FIG. 3 is an illustration showing the interior of a combustion chamber in which only a cylinder interior gas is present before the start of fuel injection after an intake valve is closed.
Figure 4:
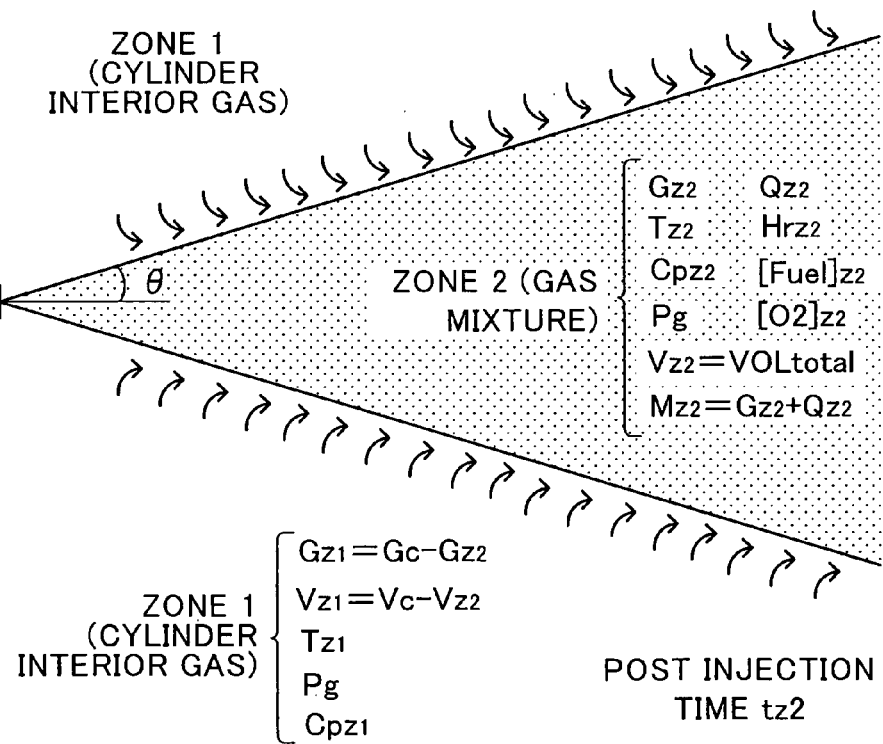
FIG. 4 is an illustration schematically showing a state in which fuel vapor (zone 2) is spreading within the combustion chamber at a certain point in time after the start of fuel injection.

FIG. 3 is an illustration showing the interior of a combustion chamber in which only the above-described cylinder interior gas is present before the start of fuel injection after IVC; and FIG. 4 is an illustration schematically showing a state in which the fuel vapor (accordingly, the gas mixture) is spreading within the combustion chamber at a certain point in time after the start of fuel injection.

As shown in FIGS. 3 and 4, the present apparatus performs estimation processing while dividing the interior of the combustion chamber into a region occupied by the cylinder interior gas and a region occupied by the gas mixture, which regions will be referred to as a "zone 1" and a "zone 2," respectively. Therefore, before the start of fuel injection, the combustion chamber is composed of the zone 1 only, and, after the start of fuel injection, the combustion chamber is composed of the zone 1 and the zone 2.

Notably, as described later, in the case where fuel injection continues after ignition of the gas mixture, the present apparatus handles the gas mixture while dividing it into a portion based on fuel injected before the ignition time (the above-described pre-ignition injected portion) and a portion based on fuel injected after the ignition time (the above-described post-ignition injected portion). In this case, a region occupied by the pre-ignition injected portion will be referred to as the "zone 2," and a region occupied by the post-ignition injected portion will be referred to as a "zone 3."

In the following description, suffixes "z1," "z2," and "z3" are added to variables, symbols, etc. associated with the zones 1, 2, and 3. Further, in order to facilitate description, even in the case where fuel injection continues after ignition of the gas mixture, the description will be continued under the assumption that the region occupied by the gas mixture is composed of the zone 2 only, without being divided into the pre-ignition injected portion and the post-ignition injected portion. The zone 3 will be described in detail later.

As shown in FIG. 4, the injected fuel (accordingly, the fuel vapor) is assumed to gradually take the cylinder interior gas therein (that is, gradually mixes with the cylinder interior gas), while conically spreading at a spray angle θ. Further, fuel (accordingly, fuel vapor) of a mass $Qz2$ is assumed to have already been injected and have spread in the form of a cone whose volume is $Vz2$ upon elapse of an arbitrary time after the fuel injection start timing CAinj (hereinafter referred to as "post injection time $tz2$").

Moreover, a gas mixture formed as a result of the fuel vapor mixing with the cylinder interior gas (hereinafter also referred to as a "gas-mixture-forming cylinder interior gas") having a mass $Gz2$ is assumed to have a mass $Mz2 (=Qz2+Gz2)$ and a volume $Vz2$ at the post injection time $tz2$. In other words, it is assumed that, at the post injection time $tz2$, the volume of the zone 2 is $Vz2$ and the total mass of the gas within the zone 2 is $Mz2$.

The present apparatus estimates the state of the gas mixture formed in the above-described manner (that is, the gas state within the zone 2). Specifically, before the start of fuel injection, the gas state within the zone 1 is estimated, and, after the start of fuel injection, the gas states within the zones 1 and 2 are individually estimated. Various physical quantities (gas temperature, gas volume, gas mass, etc.) which are required for estimation of the above-described heat generation rate are estimated as the gas state. Next, a method of estimating the gas state within the zone 1 and a method of estimating the gas state within the zone 2 will be described successively.

<Gas State Within the Zone 1>

First, there will be described the gas mass $Gz1$ within the zone 1 after IVC. After IVC, the zone 1 is composed of the cylinder interior gas only, irrespective of whether or not fuel injection has been performed. Therefore, the gas mass $Gz1$ within the zone 1 (=the mass of the cylinder interior gas within the zone 1) can be represented by the following Equation (1).

$$Gz1 = Gc - Gz2 \quad (1)$$

In Equation (1), $Gz2$ represents the mass of the cylinder interior gas taken into the zone 2 as described above (that is, the above-described gas-mixture-forming cylinder interior gas; hereinafter also referred to as the "zone 2 cylinder interior gas"). Before the start of fuel injection, the mass $Gz2$ of the zone 2 cylinder interior gas is maintained at "0." A method of acquiring the mass Gz2 of the zone 2 cylinder interior gas after the start of fuel injection will be described later.

In Equation (1), Gc represents the total mass of the cylinder interior gas confined within the combustion chamber after IVC (total cylinder interior gas mass). The total cylinder interior gas mass Gc can be obtained in accordance with the following Equation (2), which is based on the state equation of gas at IVC.

$$Gc = \frac{Pgivc \cdot Vc(CAivc)}{R \cdot Tgivc} \quad (2)$$

In Equation (2), Pgivc represents pressure of the cylinder interior gas at IVC. Since IVC is in the vicinity of compression bottom dead center as described above, at IVC, the cylinder interior gas pressure is considered to be approximately equal to the intake pipe pressure Pb. Accordingly, the intake pipe pressure Pb detected by the intake pipe pressure sensor 73 at IVC can be used as Pgivc. In Equation (2), Vc(CAivc) represents a cylinder interior volume corresponding to the crank angle CA (=CAivc) at IVC. Since the cylinder interior volume can be obtained as a function Vc(CA) of the crank angle CA on the basis of the design specifications of the engine 10, the value of Vc(CAivc) can be obtained.

In Equation (2), Tgivc represents a temperature of the cylinder interior gas at IVC. Since IVC is in the vicinity of compression bottom dead center, at IVC, the cylinder interior gas temperature is considered to be approximately equal to the intake gas temperature Tb. Accordingly, the intake gas temperature Tb detected by the intake gas temperature sensor 72 at IVC can be used as Tgivc. In Equation (2), R represents the gas constant of the cylinder interior gas. In actuality, the gas constant R is a value obtained by dividing a universal gas constant by the average molecular weight of the cylinder interior gas. However, in the present invention, the gas constant R is assumed to be constant.

Since all the values of the factors on the right side of Equation (2) can be obtained in the above-described manner, the total cylinder interior gas mass Gc can be obtained in accordance with Equation (2). Accordingly, all the values of the terms on the right side of Equation (1) can be obtained, and, thus, the gas mass Gz1 within the zone 1 after IVC can be obtained at appropriate intervals in accordance with Equation (1). Notably, before the start of fuel injection, the mass Gz2 of the zone 2 cylinder interior gas is zero as described above, and therefore, the gas mass Gz1 within the zone 1 becomes equal to the total cylinder interior gas mass Gc, as can be understood from Equation (1) (see FIGS. 3 and 4).

Next, the volume Vz1 of the zone 1 after IVC will be described. The volume Vz1 of the zone 1 can be represented by the following Equation (3).

$$Vz1 = Vc(CA) - Vz2 \quad (3)$$

In Equation (3), Vz2 represents the volume of the zone 2 as described above. Before the start of fuel injection, the volume Vz2 of the zone 2 is maintained at "0." A method of acquiring the volume Vz2 of the zone 2 after the start of fuel injection will be described later. Since all the values of the terms on the right side of Equation (3) can be obtained in the above-described manner, the volume Vz1 of the zone 1 after IVC can be obtained at appropriate intervals in accordance with Equation (3). Notably, before the start of fuel injection, the volume Vz2 of the zone 2 is zero as described above, and therefore, the volume Vz1 of the zone 1 becomes equal to the cylinder interior volume Vc(CA), as can be understood from Equation (3) (see FIGS. 3 and 4).

Next, the gas temperature Tz1 within the zone 1 after IVC will be described. The gas temperature Tz1 within the zone 1 can be represented by the following Equation (4).

$$Tz1 = Tgivc + \int \frac{dWz1}{Gz1 \cdot Cpz1} \quad (4)$$

In Equation (4), Cpz1 represents the constant-pressure specific heat of the gas within the zone 1 (accordingly, the cylinder interior gas). Below, there will be described a method of acquiring the constant-pressure specific heat Cpz1 of the gas within the zone 1. In general, when the ratio of specific heat of a certain gas is represented by κ, the constant-pressure specific heat of the gas is represented by Cp, and the gas constant is represent by R, the following Equation (5) stands. Accordingly, the constant-pressure specific heat of the gas depends on the ratio of specific heat of the gas.

$$\kappa = \frac{Cp}{Cp - R} \quad (5)$$

The ratio of specific heat of the gas depends on the compositional proportions of components which constitute the gas. The gas within the combustion chamber of the engine is composed of the cylinder interior gas only before the start of fuel injection, and is composed of the cylinder interior gas and the fuel vapor after the start of fuel injection. The cylinder interior gas is mainly composed of oxygen $O_2$, carbon dioxide $CO_2$, nitrogen $N_2$, and water $H_2O$. The compositional proportions of these components greatly depend on the oxygen concentration of the intake gas, the oxygen concentration of the exhaust gas in the previous exhaust stroke, and the temperature of the gas at the present point in time.

Accordingly, in general, the ratio of specific heat of the gas within the combustion chamber (accordingly, the constant-pressure specific heat of the gas within the combustion chamber) greatly depends on the oxygen concentration of the intake gas, the oxygen concentration of the exhaust gas in the previous exhaust stroke, the temperature of the gas at the present point in time, and the fuel concentration of the gas (the concentration of fuel injected this time). In view of the above, in general, the constant-pressure specific heat Cpc of the gas within the combustion chamber can be represented by the following Equation (6); i.e., by use of a function funcCp whose arguments are an intake-gas oxygen concentration [O2]in, an exhaust-gas oxygen concentration [O2]exb at a predetermined time during the previous exhaust stroke, a gas temperature Tg at the present point in time, and a fuel concentration [Fuel] of the gas.

$$Cpc = funcCp([O2]in, [O2]exb, Tg, [Fuel]) \quad (6)$$

Since the fuel vapor does not exist in the zone 1, the fuel concentration within the zone 1 is "0." Therefore, the constant-pressure specific heat Cpz1 of the gas within the zone 1 after IVC can be obtained at appropriate intervals in accordance with the following Equation (7). The intake-gas oxygen concentration RO2in associated with the intake of this time, which is obtained from the intake-gas oxygen concentration sensor 76, can be used as the intake-gas oxygen concentration [O2]in in Expression (7). The exhaust gas oxygen concentration RO2ex, which is obtained from the exhaust-gas oxygen concentration sensor 77 at a predetermined time during the previous exhaust stroke, can be used as the exhaust-gas oxygen concentration [O2]exb in Expression (7). In the above, the method of obtaining the constant-pressure specific heat Cpz1 of the gas within the zone 1 has been described.

$$Cpz1 = \mathrm{func}Cp([O2]\mathrm{in}, [O2]exb, Tz1, 0) \tag{7}$$

Referring back to Equation (4), dWz1 represents a minute energy which the gas within the zone 1 (accordingly, the cylinder interior gas) receives in a period during which the crank angle CA increases by a minute crank angle dCA. In the present embodiment, as indicated by the following Equation (8), the minute energy dWz1 is assumed to be equal to the work (minute piston work dWpistonz1) which is performed for the gas within the zone 1 by the piston in the period during which the crank angle CA increases by the minute crank angle dCA. Below, there will be described a method of obtaining the minute piston work dWpistonz1.

$$dWz1 = dWpistonz1 \tag{8}$$

The ratio of the volume Vz1 of the zone 1 to the cylinder interior volume Vc(CA) can be represented as "Vz1/Vc(CA)." Therefore, based on the assumption that the cylinder interior volume decreases by dV (>0) during the period in which the crank angle CA increases by the minute crank angle dCA, the volume Vz1 of the zone 1 decreases by "dV·Vz1/Vc(CA)" (>0). Accordingly, the minute piston work dWpistonz1 can be represented by the following Equation (9); i.e., by use of the combustion chamber internal pressure Pg at the present point in time.

$$dWpistonz1 = Pg \cdot dV \cdot \frac{Vz1}{Vc(CA)} \tag{9}$$

In the present embodiment, the combustion chamber internal pressure Pg in Equation (9) is assumed to be uniform within the combustion chamber. Before the start of fuel injection, during which time the combustion chamber is composed of the zone 1 only, the combustion chamber internal pressure Pg can be obtained from a relation "Pg=Gz1·R·Tz1/Vz1," on the basis of the gas mass Gz1 within the zone 1 at the present point in time, the gas temperature Tz1 within the zone 1 at the present point in time, the volume Vz1 of the zone 1 at the present point in time, and the state equation regarding the gas within the zone 1 at the present point in time. The combustion chamber internal pressure Pg generated by the zone 2 after the start of fuel injection will be described later with reference to flowcharts.

Since a value (dVc/dCA), which is a differentiated value of the cylinder interior volume Vc with respect to the crank angle CA, can be obtained as a function (dVc/dCA)(CA) of the crank angle CA, on the basis of the design specifications of the engine 10, dV can be represented by the following Equation (10). Accordingly, the minute piston work dWpistonz1 can be obtained at appropriate intervals in accordance with the following Equation (11), which is obtained from Equations (9) and (10). Accordingly, the minute energy dWz1 after IVC can be obtained at appropriate intervals in accordance with Equation (8).

$$dV = \frac{-dVc}{dCA}(CA) \cdot dCA \tag{10}$$

$$dWpistonz1 = Pg \cdot \frac{-dVc}{dCA}(CA) \cdot \frac{Vz1}{Vc(CA)} \cdot dCA \tag{11}$$

Since all the values of the variables on the right side of Equation (4) can be obtained in the above-described manner, the gas temperature Tz1 within the zone 1 after IVC can be obtained at appropriate intervals in accordance with Equation (4). The various physical quantities associated with the gas within the zone 1, which are obtained in the above-described manner, are values necessary for estimation of the above-described heat generation rate. The method of estimating the gas state within the zone 1 has been described above.

<Gas State Within the Zone 2>

Next, there will be described a method of estimating the gas state within the zone 2, which is generated after the start of fuel injection (that is, after the fuel injection timing CAinj). First, there will be described the volume Vz2 of the zone 2 (that is, a region occupied by the gas mixture) after the start of fuel injection (that is, at the post injection time tz2).

Figure 5:
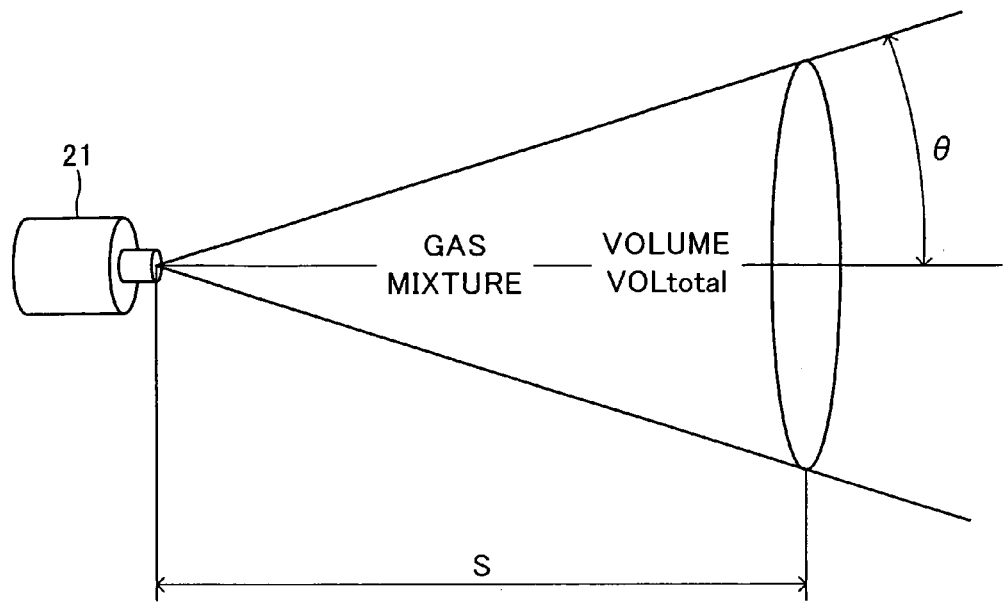
FIG. 5 is an illustration schematically showing a spray volume.

As shown in FIG. 4, the gas mixture formed as result of fuel injection spreads in the form of a cone at a spray angle θ. Hereinafter, the volume of this cone is referred to as the "spray volume VOLtotal," as shown in FIG. 5. The volume Vz2 of the zone 2 is equal to the spray volume VOLtotal. A method of obtaining the spray volume VOLtotal will be described below.

A reach distance S of a forefront portion of fuel (fuel vapor) injected from the fuel injection valve 21 at the post injection time tz2 can be obtained in accordance with, for example, the following Equation (12). In Equation (12), ΔP0 represents an effective injection pressure, which is obtained by subtracting the combustion chamber internal pressure Pg at the start of fuel injection (the post injection time tz2=0) from the fuel injection pressure (in the present embodiment, the base fuel injection pressure Pcrbase). ρf represents the density of liquid fuel, and ρa represents the density of air. d0 represents the injection hole diameter of the fuel injection valve 21. Equation (12) is described in "Reach Distance and Spray Angle of Diesel Spray," Hiroyuki Hiroyasu and Masataka Arai, Transaction of Society of Automotive Engineers of Japan, Inc. Nov. 21, 1980.

$$0 < tz2 \le tb \tag{12}$$

$$S = 0.39\sqrt{\frac{2\Delta P0}{\rho f} \cdot tz2}$$

$$t > tb$$

$$S = 2.95\left(\frac{\Delta P0}{\rho a}\right)^{\frac{1}{4}} \cdot \sqrt{d0 \cdot tz2}$$

where $$tb = 28.65 \frac{\rho f \cdot d0}{\sqrt{\rho a \cdot \Delta P0}}$$

Further, the spray angle θ is considered to change in accordance with the density of the cylinder interior gas at the start of fuel injection (the post injection time tz2=0) (accordingly, the gas density ρ0z1 (=Gz1/Vz1) within the zone 1 when the post injection time tz2=0), and the above-described effective injection pressure ΔP0. Therefore, the spray angle θ can be obtained by reference to a table Mapθ, which defines the relation between the spray angle $\theta$ and the above-described density $\rho 0z1$ and effective injection pressure $\Delta P0$.

Since the spray angle $\theta$ and the reach distance S of the forefront portion of the fuel vapor at the post injection time $tz2$ can be obtained in a manner as described above, the spray volume VOLtotal (see FIG. 5) at the post injection time $tz2$ can be obtained in accordance with the following Equation (13). Accordingly, the volume $Vz2$ (=VOLtotal) of the zone 2 at the post injection time $tz2$ can also be obtained.

$$VOLtotal = \frac{\pi}{3} \cdot \tan^2\theta \cdot S^3 \qquad (13)$$

Next, there will be described the mass $Gz2$ of the cylinder interior gas taken into the zone 2 during a period between the start of fuel injection and the post injection time $tz2$ (that is, the zone 2 cylinder interior gas). In the present embodiment, the volume of the cylinder interior gas taken into the zone 2 during the period in which the crank angle CA increases by the minute crank angle dCA is considered to be equal to an increase amount $dVz2$ of the volume $Vz2$ of the zone 2 during the period in which the crank angle CA increases by the minute crank angle dCA. In addition, the mass $dGz2$ of the cylinder interior gas taken into the zone 2 during the period in which the crank angle CA increases by the minute crank angle dCA can be represented by the following Equation (14).

$$dGz2 = \rho z1 \cdot dVz2 \qquad (14)$$

In Equation (14), $\rho z1$ represents the density (=$Gz1/Vz1$) of the gas within the zone 1 (that is, the cylinder interior gas itself). Accordingly, the mass $Gz2$ of the zone 2 cylinder interior gas after fuel injection can be obtained in accordance with the following Equation (15).

$$Gz2 = \int \rho z1 \cdot dVz2 \qquad (15)$$

Next, there will be described the gas mass $Mz2$ within the zone 2 after the start of fuel injection. As described above, the gas mass $Mz2$ within the zone 2 at the post injection time $tz2$ is the sum of the mass $Qz2$ of fuel having already been injected before the post injection time $tz2$ and the mass $Gz2$ of the zone 2 cylinder interior gas at the post injection time $tz2$ obtained in accordance with Equation (15). The mass $Qz2$ can be obtained from the above-described base fuel injection pressure Pcrbase, the injection period TAU, etc. Accordingly, the gas mass $Mz2$ (=$Gz2+Qz2$) within the zone 2 at the post injection time $tz2$ can also be obtained.

Next, there will be described the gas temperature $Tz2$ within the zone 2 (that is, the gas mixture temperature) after the start of fuel injection. The gas temperature $Tz2$ within the zone 2 can be represented by the following Equation (16). In Equation (16), $T0z2$ represents the gas temperature $Tz1$ within the zone 1 at the start of fuel injection (that is, the post injection time $tz2$=0), and can be obtained from the above-described Equation (4).

$$Tz2 = T0z2 + \int \frac{dWz2}{Mz2 \cdot Cpz2} \qquad (16)$$

In Equation (16), $Cpz2$ represents the constant-pressure specific heat of the gas within the zone 2 (accordingly, the gas mixture), and can be obtained at appropriate intervals in accordance with the following Equation (17), on the basis of the above-described Equation (6). In Equation (17), [Fuel]$z2$ represents the fuel concentration within the zone 2 (the mass concentration of the injected fuel; the residual fuel within the cylinder interior gas attributable to EGR or the like is not included). A method of obtaining the fuel concentration [Fuel]$z2$ within the zone 2 will be described later.

$$Cpz2 = \text{func}Cp([O2]\text{in}, [O2]exb, Tz2, [\text{Fuel}]z2) \qquad (17)$$

In Equation (16), $dWz2$ represents a minute energy which the gas within the zone 2 (accordingly, the gas mixture) receives during the period in which the crank angle CA increases by a minute crank angle dCA. In the present embodiment, the minute energy $dWz2$ is represented by the following Equation (18). In Equation (18), $dW\text{piston}z2$ represents the work which is performed for the gas within the zone 2 by the piston during the period in which the crank angle CA increases by the minute crank angle dCA. $Q\text{latent}z2$ is latent heat consumed when the liquid fuel injected during the period in which the crank angle CA increases by the minute crank angle dCA changes to fuel vapor within the zone 2; and $Hrz2$ represents a heat generation rate based on reaction of fuel within the zone 2 per unit crank angle. A method of obtaining this heat generation rate $Hrz2$ will be described later.

$$dWz2 = dW\text{piston}z2 - Q\text{latent}z2 + Hrz2 \cdot dCA \qquad (18)$$

In Equation (18), the minute piston work $dW\text{piston}z2$ can be obtained at appropriate intervals in accordance with the following Equation (19) in the same manner as for the minute piston work $dW\text{piston}z1$ obtained in accordance with the above-described Equation (11).

$$dW\text{piston}z2 = Pg \cdot \frac{-dVc}{dCA}(CA) \cdot \frac{Vz2}{Vc(CA)} \cdot dCA \qquad (19)$$

In Equation (18), the latent heat $Q\text{latent}z2$ is considered to assume a value corresponding to the mass q of liquid fuel injected during the period in which the crank angle CA increases by the minute crank angle dCA. Therefore, the latent heat $Q\text{latent}z2$ can be obtained at appropriate intervals by use of a function funcQlatent(q) whose argument is q. Notably, the mass q can be obtained from the base fuel injection pressure Pcrbase, the injection period TAU, etc. Since all the values of the terms the right side of Equation (18) can be obtained in the above-described manner, the minute energy $dWz2$ after the start of fuel injection can be obtained at appropriate intervals in accordance with Equation (18).

Since all the values of the variables on the right side of Equation (16) can be obtained in the above-described manner, the gas temperature $Tz2$ within the zone 2 after the start of fuel injection can be obtained at appropriate intervals in accordance with Equation (16). The various physical quantities associated with the gas within the zone 2, which are obtained in the above-described manner, are values necessary for estimation of the above-described heat generation rate. The method of estimating the gas state within the zone 2 (that is, the state of the gas mixture) has been described above. The above is the outline of the method of estimating the gas mixture state.

Heat Generation Rate Based on Reaction of Fuel Within the Zone 2:

Next, there will be described the heat generation rate $Hrz2$ (J/deg) based on reaction of fuel (fuel injected this time, the fuel remaining within the cylinder interior gas due to EGR or the like is not included) within the zone 2 (that is, the gas mixture) per unit crank angle. In the present embodiment, the gas mixture is assumed to ignite when the gas temperature Tz2 within the zone 2 exceeds a predetermined ignition temperature Tig (constant). In the following description, a stage during which the gas temperature Tz2 of the zone 2 is equal to or lower than the ignition temperature Tig may be referred to as a "pre ignition stage," and a stage after the gas temperature Tz2 has exceeded the ignition temperature Tig may be referred to as a "post ignition stage."

In order to obtain the heat generation rate Hrz2, the reaction speed (combustion speed) qrz2 (g/sec) of fuel within the zone 2 must be obtained. Since the mode of combustion of fuel varies between the pre ignition stage and the post ignition stage, in the present embodiment, the combustion speed qrz2 within the zone 2 is obtained independently for the pre-ignition stage and the post ignition stage.

In the pre-ignition stage, fuel combusts within the zone 2 in such a manner that premix combustion based on low-temperature oxidation reaction (that is, cool flame reaction) occurs predominantly. Therefore, the combustion speed qrz2 (g/sec) within the zone 2 in the pre ignition stage is considered to be determined by the premix combustion based on low-temperature oxidation reaction.

As is widely known, the premix combustion based on low-temperature oxidation reaction can be accurately simulated by a so-called Shell model (Shell Model M. P. Halstead, 1977, Reitz, SAE950278). In view of the above, in the present embodiment, the combustion speed qrz2 (g/sec) within the zone 2 in the pre-ignition stage is obtained by use of a function funcshell([O2]z2, [Fuel]z2, Tz2), which corresponds to the Shell model and whose arguments are the oxygen concentration [O2]z2 within the zone 2, the fuel concentration [Fuel]z2 within the zone 2, and the gas temperature Tz2 within the zone 2. A method of obtaining [O2]z2 and [Fuel]z2 will be described later.

Meanwhile, in the post ignition stage, fuel is considered to combust within the zone 2 in such a manner that premix combustion based on high-temperature oxidation reaction and diffusion combustion occur, for the following reason. That is, within a region within the zone 2, the region being associated with fuel which was injected a relatively long time before the time of injection (that is, within a region of the zone 2 relatively far away from the injection hole of the fuel injection valve 21), the fuel concentration is considered to be relatively uniform. Accordingly, in this region, conceivably, there occurs the premix combustion in which fuel within that region substantially ignites (combusts) simultaneously (or combustion close to the premix combustion).

Meanwhile, in a region within the zone 2, the region being associated with fuel which was injected a relatively short time before the time of injection (that is, in a region of the zone 2 relatively close to the injection hole of the fuel injection valve 21), the fuel concentration is considered to be relatively non-uniform. Accordingly, in this region, conceivably, there occurs the diffusion combustion in which the injected fuel is mixing with the cylinder interior gas and successively ignites (combusts) when its fuel concentration enters a combustible range.

Accordingly, the combustion speed qrz2 (g/sec) within the zone 2 in the post ignition stage is considered to be determined by the premix combustion based on high-temperature oxidation reaction and the diffusion combustion. The combustion speed qrz2 (g/sec) within the zone 2 in the post ignition stage can be obtained in accordance with the following Equation (20).

$$qrz2 = \frac{[Fuel]z2 \cdot Mz2}{\tau cz2} \quad (20)$$

In Equation (20), $\tau cz2$ represents a characteristic time associated with combustion of fuel within the zone 2 in the post ignition stage. As can be understood from Equation (20), the longer the characteristic time $\tau cz2$, the lower the combustion speed qrz2 within the zone 2. That is, the characteristic time $\tau cz2$ is a value indicating the slowness of the combustion speed qrz2 within the zone 2. The characteristic time $\tau cz2$ can be obtained in accordance with the following Equation (21).

$$\tau cz2 = \tau az2 + C3 \cdot \tau mz2 \quad (21)$$

In Equation (21), $\tau az2$ represents a characteristic time (laminar flow characteristic time) associated with premix combustion based on high-temperature oxidation reaction within the zone 2. In the present embodiment, the characteristic time $\tau az2$ is obtained in accordance with the following Equation (22), which is based on a so-called Arrehenius equation. In Equation (22), E represents an activation energy (constant in the present embodiment), and C1 is a constant. As can be understood from Equation (22), the greater the product of the oxygen concentration [O2]z2 and the fuel concentration [Fuel]z2 within the zone 2, or the higher the gas temperature Tz2 within the zone 2, the shorter the laminar flow characteristic time $\tau az2$ (accordingly, the shorter the characteristic time $\tau cz2$).

$$\tau az2 = \frac{C1}{[O2]z2 \cdot [Fuel]z2 \cdot \exp(-E/(R \cdot Tz2))} \quad (22)$$

In Equation (21), $\tau mz2$ represents a characteristic time (turbulent flow characteristic time) associated with diffusion combustion in the zone 2. In the present embodiment, the characteristic time $\tau mz2$ is obtained in accordance with the following Equation (23), which is based on a so-called Magnussenn equation. In Equation (23), C2 is a constant. k represents turbulent energy strength, and $\epsilon$ represents a turbulent energy dispersion factor. Since the value (k/$\epsilon$) greatly depends on the above-described effective injection pressure $\Delta P0$ and density $\rho f$ of liquid fuel, the value (k/$\epsilon$) can be obtained on the basis of the effective injection pressure $\Delta P0$, the liquid fuel density $\rho f$, and a function funck/$\epsilon$($\Delta P0$, $\rho f$) whose arguments are $\Delta P0$ and $\rho f$. A function funcTm is a function for obtaining a correction coefficient of the turbulent flow characteristic time $\tau m$ on the basis of the oxygen concentration [O2]z2 and the fuel concentration [Fuel]z2 within the zone 2.

$$\tau mz2 = C2 \cdot \frac{k}{\varepsilon} \cdot func\tau m([O2]z2, [Fuel]z2) \quad (23)$$

In Equation (21), C3 is a coefficient representing the degree of influence of the diffusion combustion on the characteristic time $\tau cz2$. The coefficient C3 is set such that it increases with the ratio (=sumqrz2/Qfin) of the quantity of combusted (consumed) fuel (consumed fuel quantity sumqrz2) to the fuel injection quantity Qfin. Thus, the degree of influence of the turbulent flow characteristic time $\tau mz2$ (accordingly, the diffusion combustion) on the characteristic time $\tau cz2$ increases with the progress of combustion of fuel in the post ignition stage (that is, with an increase in the value (sumqrz2/Qfin)).

This setting is performed in consideration of the tendency that, in the post ignition stage, the premix combustion based on high-temperature oxidation reaction predominantly occurs at the beginning, but with the progress of combustion, the diffusion combustion gradually becomes predominant. Notably, a method of obtaining the consumed fuel quantity sumqrz2 will be described later.

Through the above-described procedure performed in consideration that the mode of combustion of fuel changes between the pre-ignition stage and the post ignition stage, the combustion speed qrz2 (g/sec) within the zone 2 can be accurately determined at predetermined intervals irrespective of whether the present stage is in the pre-ignition stage or in the post ignition stage. Through use of this combustion speed qrz2, the heat generation rate Hrz2 (J/deg) of the zone 2 after the start of fuel injection can be obtained at predetermined intervals in accordance with the following Equation (24).

$$Hrz2 = Hf \cdot qrz2 \cdot \frac{dt}{dCA} \tag{24}$$

In Equation (24), Hf represents the amount of heat (J/g) generated per unit mass of fuel as a result of reaction of the fuel (constant value). dt/dCA is the inverse of an increase in the crank angle CA per unit time, and is determined by the engine speed NE.

<Obtainment of the Fuel Concentration [Fuel]z2>

Next, there will be described a method of obtaining the fuel concentration (mass concentration) [Fuel]z2 within the zone 2 after the start of fuel injection. The fuel concentration [Fuel]z2 within the zone 2 at the post injection time tz2 is the ratio of the "mass of fuel (vapor) present within the zone 2 at the post injection time tz2" to the gas mass Mz2 within the zone 2 at the post injection time tz2.

The "mass of fuel present within the zone 2 at the post injection time tz2" is a value obtained by subtracting the mass of fuel consumed through a chemical reaction (i.e., combustion) during the period between the start of injection and the post injection time tz2 (that is, the above-described consumed fuel quantity sumqrz2) from the mass of fuel having already been injected during the period between the start of injection and the post injection time tz2 (that is, the above-described mass Qz2). Accordingly, under the assumption that the fuel concentration is uniform within the zone 2, the fuel concentration [Fuel]z2 within the zone 2 at the post injection time tz2 can be represented by the following Equation (25).

$$[Fuel]z2 = \frac{Qz2 - sumqrz2}{Mz2} \tag{25}$$

Since the consumed fuel quantity sumqrz2 in Equation (25) is the accumulation of the combustion speed qrz2 (g/sec) within the zone 2 obtained in a manner as described above, the consumed fuel quantity sumqrz2 can be obtained in accordance with the following Equation (26). Accordingly, the values of the various variables on the right side of Equation (25) can be obtained. As a result, the fuel concentration [Fuel]z2 within the zone 2 obtained after the start of fuel injection under the assumption that the fuel concentration is uniform throughout the zone 2 can be obtained at appropriate intervals in accordance with Equation (25).

$$sumqrz2 = \int qrz2 \cdot dt \tag{26}$$

<Obtainment of the Oxygen Concentration [O2]z2>

Next, there will be described a method of obtaining the oxygen concentration (mass concentration) [O2]z2 within the zone 2 after the start of fuel injection. The oxygen concentration [O2]z2 within the zone 2 at the post injection time tz2 is the ratio of the "mass of oxygen present within the zone 2 at the post injection time tz2" to the gas mass Mz2 within the zone 2 at the post injection time tz2.

The "mass of oxygen present within the zone 2 at the post injection time tz2" is a value obtained by subtracting the "mass of oxygen consumed through-a chemical reaction (i.e., combustion) during the period between the start of injection and the post injection time tz2" from the "mass of oxygen contained in the zone 2 cylinder interior gas at the post injection time tz2"

The "mass of oxygen contained in the zone 2 cylinder interior gas at the post injection time tz2" is equal to a value obtained by multiplying the mass Gz2 of the zone 2 cylinder interior gas by the intake-gas oxygen concentration [O2]in. Further, the "mass of oxygen consumed through a chemical reaction during the period between the start of injection and the post injection time tz2" is equal to a value obtained by multiplying the above-described consumed fuel quantity sumqrz2 by the mass ratio Ho (the oxygen mass/the fuel mass; constant) at the time of the chemical reaction. Accordingly, the oxygen concentration [O2]z2 within the zone 2 after the start of fuel injection can be obtained at predetermined intervals in accordance with the following Equation (27).

$$[O2]z2 = \frac{Gz2 \cdot [O2]in - sumqrz2 \cdot Ho}{Mz2} \tag{27}$$

The above is the outline of the method of obtaining the heat generation rate Hrz2 (J/deg) of the zone 2 after the start of fuel injection. However, as described above, the heat generation rate Hrz2 (J/deg) of the zone 2 obtained by the method is a value obtained under the assumption that "even in the case where fuel injection continues after ignition of the gas mixture, the region occupied by the gas mixture is composed of the zone 2 only, not by the above-described pre-ignition injected portion and the above-described pos-ignition injected portion (hereinafter, this assumption will be referred to as 'assumption 1')" and under the assumption that the "fuel concentration [Fuel]z2 within the zone 2 used for obtaining the combustion speed qrz2 (g/sec) within the zone 2 (accordingly, the heat generation rate Hrz2 (J/deg) of the zone 2) is uniform within the zone 2 (hereinafter, this assumption will be referred to as 'assumption 2')."

Figure 6:
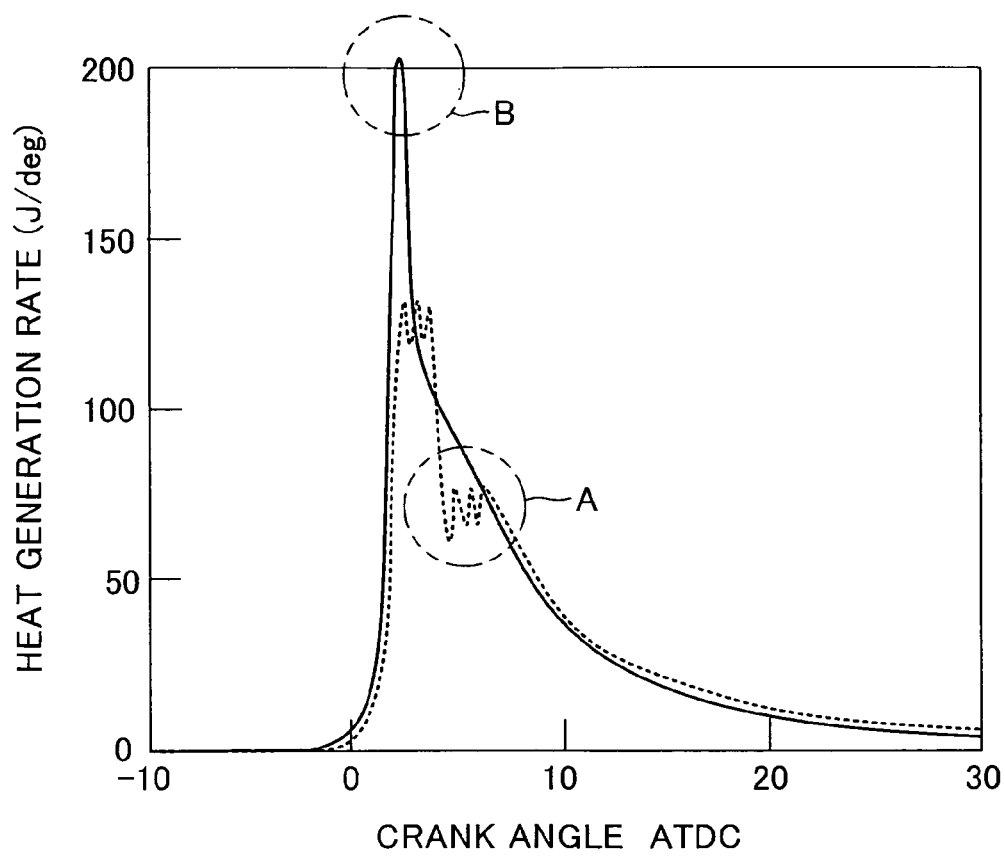
FIG. 6 is a graph showing, for comparison, results obtained through an experiment (broken line) and results of calculation performed by use of a conventional apparatus (solid line) on the relation between heat generation rate and crank angle for the case where fuel injection continues after ignition of a gas mixture.

FIG. 6 is a graph showing, for comparison, results obtained through an experiment (see the broken line) and results of calculation performed by use of the above-described method (that is, the heat generation rate Hrz2 of the zone 2; see the solid line) on the relation between the crank angle CA and the heat generation rate (J/deg) and for the case where fuel injection continues after ignition of a gas mixture.

As can be understood from FIG. 6, although the calculation results generally coincide with the experiment results, the calculation results considerably differ from the experiment results in the following two points. The first point (see an area indicated by A) is that, whereas a second, relatively small peak is generated after a first, relatively large peak in the experiment results, the second peak is not generated in the calculation results (hereinafter referred to as "problem 1"). The second point (see an area indicated by B) is that the peak (the first peak) in the calculation results is excessively large as compared with the first peak in the experiment results (hereinafter referred to as "problem 2").

The present inventor has found that problem 1 is caused by assumption 1, and that problem 2 is caused by assumption 2. That is, the present inventor has solved the problem 1 by separately handling the above-described pre-ignition injected portion and the above-described post-ignition injected portion in the case where fuel injection continues after ignition of the gas mixture. The present inventor has also solved problem 2 by taking into consideration the nonuniformity of fuel concentration within the gas mixture. Next, methods of solving the above-described problems 1 and 2 employed by the present apparatus will be described specifically.

Figure 7:
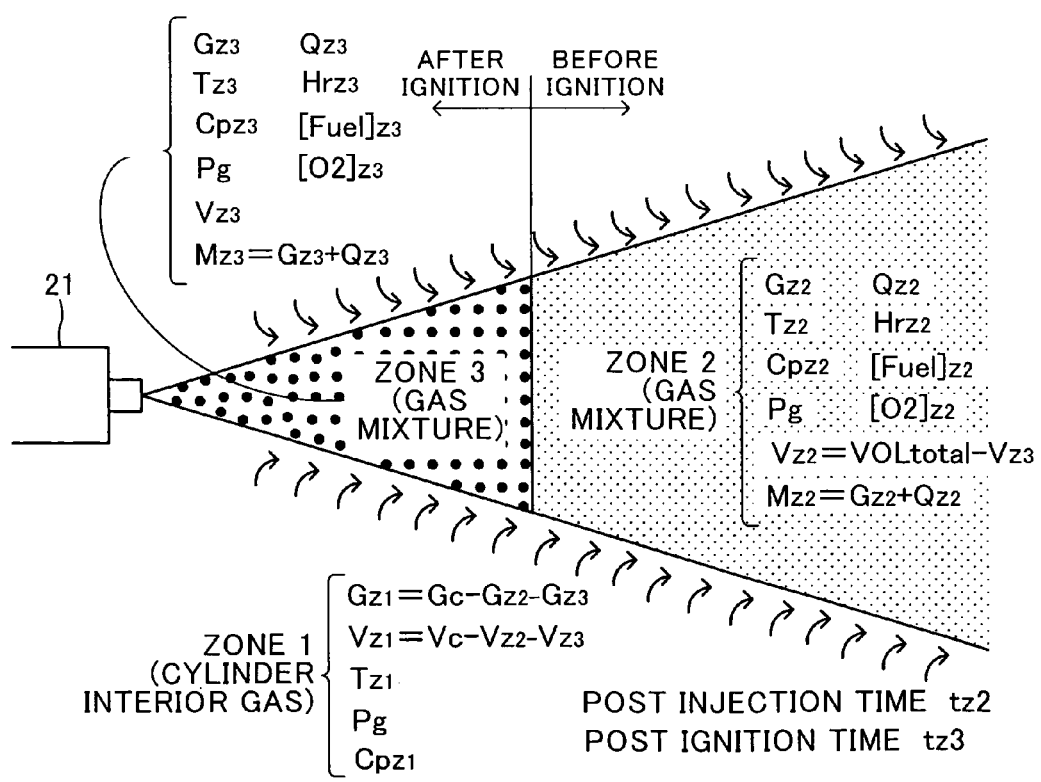
FIG. 7 is an illustration schematically showing a state in which a zone 2 and a zone 3 are spreading within the combustion chamber at a certain point in time after the ignition, the zone 2 representing a portion of a gas mixture based on fuel injected before the ignition and the zone 3 representing a portion of the gas mixture based on fuel injected after the ignition.

Method for Solving Problem 1:

As described above, in the present apparatus, the gas mixture is handled as being composed of a portion based on fuel injected before the time of ignition (the above-described pre-ignition injected portion) and a portion based on fuel injected after the time of ignition (the above-described post-ignition injected portion) as shown in FIG. 7 in the case where fuel injection continues after ignition of the gas mixture (hereinafter may be referred to as the "case of post-ignition continued injection"). The region occupied by the pre-ignition injected portion will be referred to as a "zone 2" and the region occupied by the post-ignition injected portion will be referred to as a "zone 3."

That is, in the case of post-ignition continued injection, the zone 3 is generated after the time of ignition. The injection of fuel is assumed to be performed for the zone 2 before the time of injection, and for the zone 3 instead of the zone 2 after the time of injection. In other words, in the case of post-ignition continued injection, supply of fuel (vapor) to the zone 2, which has continued up to the time of injection, is stopped after the time of injection.

After the time of injection, a heat generation rate $Hrz3$ (J/deg) based on reaction of fuel (fuel injected this time, the fuel remaining within the cylinder interior gas due to EGR or the like is not included) within the zone 3 (that is, the gas mixture) per unit crank angle is calculated at predetermined intervals. As will be described later, this calculation is performed in accordance with a calculation method different from that for the above-described heat generation rate $Hrz2$ (J/deg) of the zone 2, in parallel with and independently of calculation of the heat generation rate $Hrz2$ of the zone 2.

As described above, the zone 3 is generated at the time of ignition. Various physical quantities within the zone 3 at an arbitrary time after the time of ignition (hereinafter referred to as "post ignition time $tz3$"), excluding the above-described heat generation rate $Hrz3$, can be obtained by methods similar to the methods for obtaining the various physical quantities within the zone 2 at the post injection time $tz2$. Acquisition of the various physical quantities within the zone 3 will be described later with reference to flowcharts.

Notably, after the point in time when the zone 3 is generated (that is, after the time of ignition in the case where the injection continues after the ignition), the zone 3 has a volume $Vz3$, and the cylinder interior gas taken into the zone 3 during a period between the time of ignition and the post ignition time $tz3$ (hereinafter referred to as the "zone 3 cylinder interior gas) has a mass $Gz3$. Therefore, after the point in time when the zone 3 is generated, the volume $Vz2$ of the zone 2 is calculated in accordance with the following Equation (28), rather than the above-described "$Vz2=VOLtotal$," and the gas mass $Gz1$ within the zone 1 and the volume $Vz1$ of the zone 1 are calculated in accordance with the following Equations (29) and (30), respectively, rather than the above-described Equations (1) and (3) (see FIGS. 4 and 7).

$$Vz2 = VOLtotal - Vz3 \quad (28)$$

$$Gz1 = Gc - Gz2 - Gz3 \quad (29)$$

$$Vz1 = Vc(CA) - Vz2 - Vz3 \quad (30)$$

<Heat Generation Rate Based on Reaction of Fuel Within the Zone 3>

Next, there will be described the heat generation rate $Hrz3$ (J/deg) within the zone 3 (that is, the gas mixture). As in the case of the heat generation rate $Hrz2$, the reaction speed (combustion speed) $qrz3$ (g/sec) of fuel within the zone 3 must be obtained in order to obtain the heat generation rate $Hrz3$.

As previously described, after ignition within the zone 2, fuel is combusted within the zone 2 in such a manner that premix combustion based on high-temperature oxidation reaction and diffusion combustion occur. However, in the case of post-ignition continued injection, diffusion combustion occurs predominantly within the region (that is, within the zone 3) occupied by the portion based on fuel injected after the time of ignition (the post-ignition injected portion), for the following reason.

That is, since the zone 3 is generated after the time of ignition, the gas temperature $Tz3$ within the zone 3 is higher than the above-mentioned ignition temperature $Tig$ from the beginning of generation of the zone 3. Accordingly, the fuel (vapor) injected into the zone 3 is mixing with the cylinder interior gas and successively ignites immediately after its fuel concentration enters a combustible range (after elapse of a very short period of time following the injection).

In other words, only diffusion combustion occurs in the zone 3 (after the ignition), and the combustion speed $qrz3$ (g/sec) in the zone 3 depends only on the speed at which the fuel mixes with the cylinder interior gas. Accordingly, the combustion speed $qrz3$ (g/sec) within the zone 3 (after the ignition) can be obtained in accordance with the following Equation (31), which corresponds to the above-described Equation (20).

$$qrz3 = \frac{[Fuel]z3 \cdot Mz3}{\tau mz3} \quad (31)$$

In Equation (31), $\tau mz3$ represents a characteristic time (turbulent flow characteristic time) associated with diffusion combustion within the zone 3. As can be understood from Equation (31), the longer the turbulent flow characteristic time $\tau mz3$, the lower the combustion speed $qrz3$ within the zone 3. The turbulent flow characteristic time $\tau mz3$ is obtained in accordance with the following Equation (32), which is based on the so-called Magnussenn equation as in the case of the above-described Equation (23).

$$\tau mz3 = C2 \cdot \frac{k}{\varepsilon} \cdot func\tau m([O2]z3, [Fuel]z3) \quad (32)$$

As described above, in the case of post-ignition continued injection, the present apparatus individually handles the zone 2 and the zone 3 after the ignition (after generation of the zone 3), and obtains the combustion speeds (reaction speeds) $qrz2$ and $qrz3$ (g/sec) within these zones (accordingly, the respective heat generation rates $Hrz2$ and $Hrz3$ (J/deg)) individually and in parallel. At that time, the mode of combustion which serves as the basis of calculation (accordingly, equations used for calculation) is switched between the zone 2 and the zone 3.

After the ignition, the heat generation rate (J/deg) in relation to the crank angle CA is calculated by adding the heat generation rates Hrz2 and Hrz3 together. The present inventor has found that the above-described problem 1 is solved by this procedure. The effect of this procedure will be described later with reference to FIG. 14. The above is the method for solving the problem 1 employed by the present apparatus.

Method for Solving the Problem 2:

In order to solve the problem 2, the present apparatus takes into consideration the nonuniformity of fuel concentration within the gas mixture. In order to take into consideration the nonuniformity of fuel concentration within the gas mixture, there are obtained the nonuniformities of the above-described fuel concentrations [Fuel]z2 and [Fuel]z3, which are used for calculation of the above-described combustion speeds qrz2 and qrz3 (g/sec) (accordingly, the heat generation rates Hrz2 and Hrz3 (J/deg)). Various papers and the like introduce methods for obtaining the nonuniformities of the fuel concentrations [Fuel]z2 and [Fuel]z3 themselves.

However, all the methods require solving a complicated differential equation using a probability density function or the like, and involve a huge calculation load. In order to overcome such a drawback, the present invention uses values of the fuel concentrations [Fuel]z2 and [Fuel]z3, which are used for calculation of the above-described combustion speeds qrz2 and qrz3 (g/sec) (accordingly, the heat generation rates Hrz2 and Hrz3 (J/deg)), the values being obtained under the assumption that the fuel concentrations are uniform within the gas mixture as in the above-described case; and obtains the nonuniformity (standard deviation $\sigma$ to be described later) of the fuel concentration within the gas mixture through a relatively simple calculation which will be described below and which does not require solving a complicated differential equation or the like.

This nonuniformity is then reflected in the calculation of the above-described combustion speeds qrz2 and qrz3 (g/sec) (accordingly, the heat generation rates Hrz2 and Hrz3 (J/deg)), whereby the nonuniformity of the fuel concentration within the gas mixture is taken into consideration. Next, there will be described a method of obtaining the nonuniformity (standard deviation $\sigma$) of the fuel concentration within the gas mixture according to the present invention.

Method of Obtaining the Nonuniformity of the Gas Mixture According to the Present Invention:

In the present invention, in order to obtain the nonuniformity (standard deviation $\sigma$) of the fuel concentration within the gas mixture, the gas mixture is assumed to be an aggregate of spherical gas volumes which differ in fuel mass fraction (fuel mass ratio, fuel mass concentration). The "fuel mass fraction" of a gas volume refers to the ratio of the mass of fuel (vapor) contained in the gas mass to the total mass of the gas volume. The term "fuel" used here refers to fuel which has been newly supplied into the combustion chamber through fuel injection and which does not include fuel previously included in the cylinder interior gas (e.g., unburned fuel remaining in the cylinder interior gas due to EGR or the like).

Further, the aggregate of spherical gas volumes which constitute a gas mixture is assumed to include volumes of the cylinder interior gas itself (not containing fuel vapor) and volumes of fuel vapor itself (not containing cylinder interior gas). The fuel mass fraction of each volume of the cylinder interior gas is zero, and the fuel mass fraction of each volume of the fuel vapor is 1.

During a period after the start of fuel injection in which the gas mixture is being formed, every time a minute time $\Delta t$ elapses (every time the crank angle CA increases by a minute angle $\Delta CA$), a "collision reaction," which will be described below, is assumed to repeatedly take place in the gas mixture for all combinations each formed by two arbitrary gas volumes of a plurality of gas volumes which are present (that is, whose mass is not zero) at that point in time and which differ in fuel mass fraction. Thus, the distribution of masses of the gas volumes within the gas mixture is obtained and updated, whereby the nonuniformity of the gas mixture is obtained and updated.

The "collision reaction" refers to a series of the following reactions 1 to 3.

1. Two gas volumes which differ in fuel mass fraction collide with each other.
2. Portions of the two collided gas volumes are partially mixed.
3. The mixed portions separate from the corresponding gas volumes, and form a portion or the entirety of another gas volume whose fuel mass fraction differs from those of the two gas volumes.

In the following description, two gas volumes to be collided may be referred to as "to-be-collided gas volumes," and a gas volume whose mass increases as a result of the "collision reaction" (that is, the above-described another gas volume) may be referred to as a "mix-formed gas volume."

Figure 8:
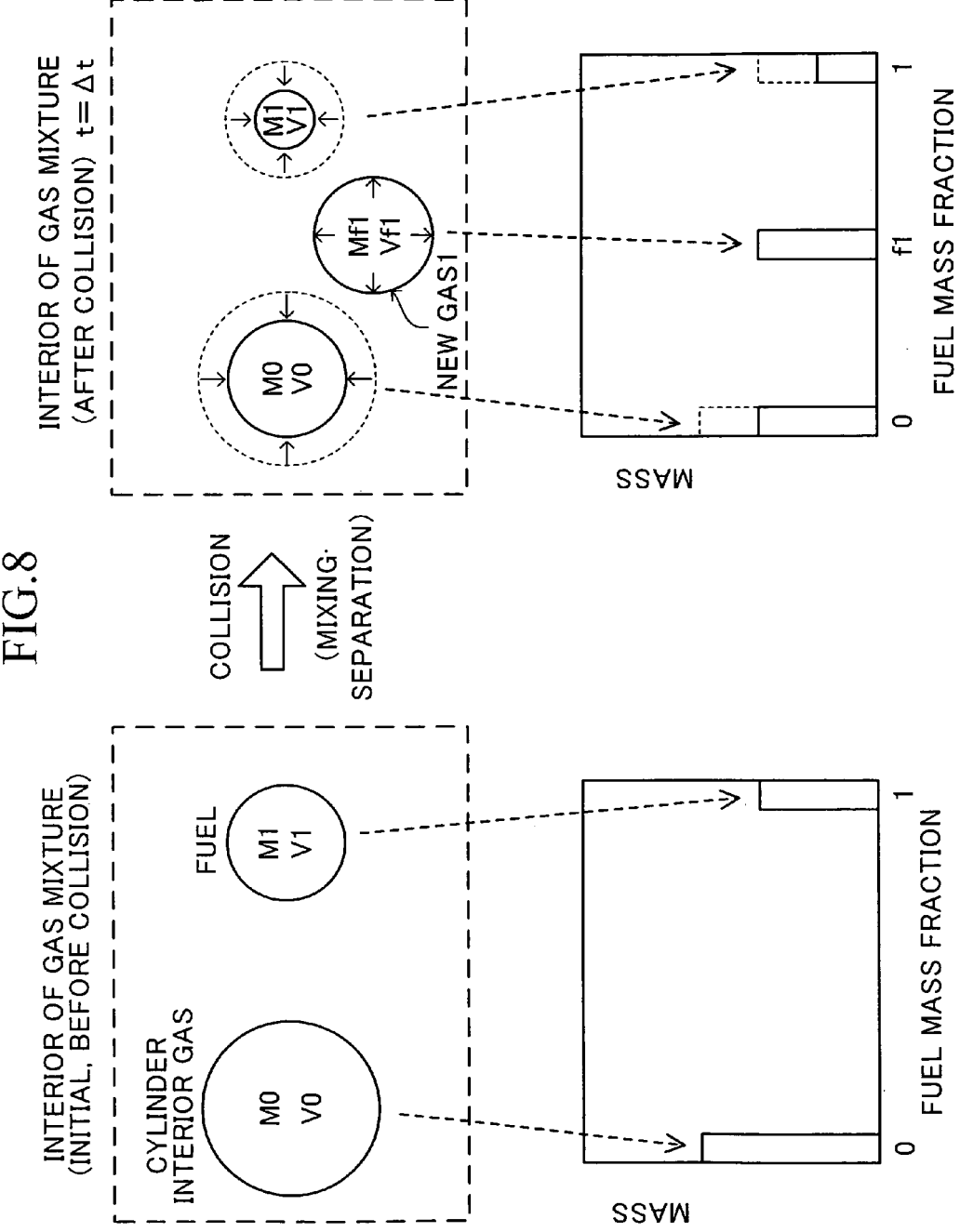
FIG. 8 is an illustration schematically showing states before and after a "collision reaction" occurs when a minute time $\Delta t$ has elapsed after the start of fuel injection (post injection time $t=\Delta t$)
Figure 9:
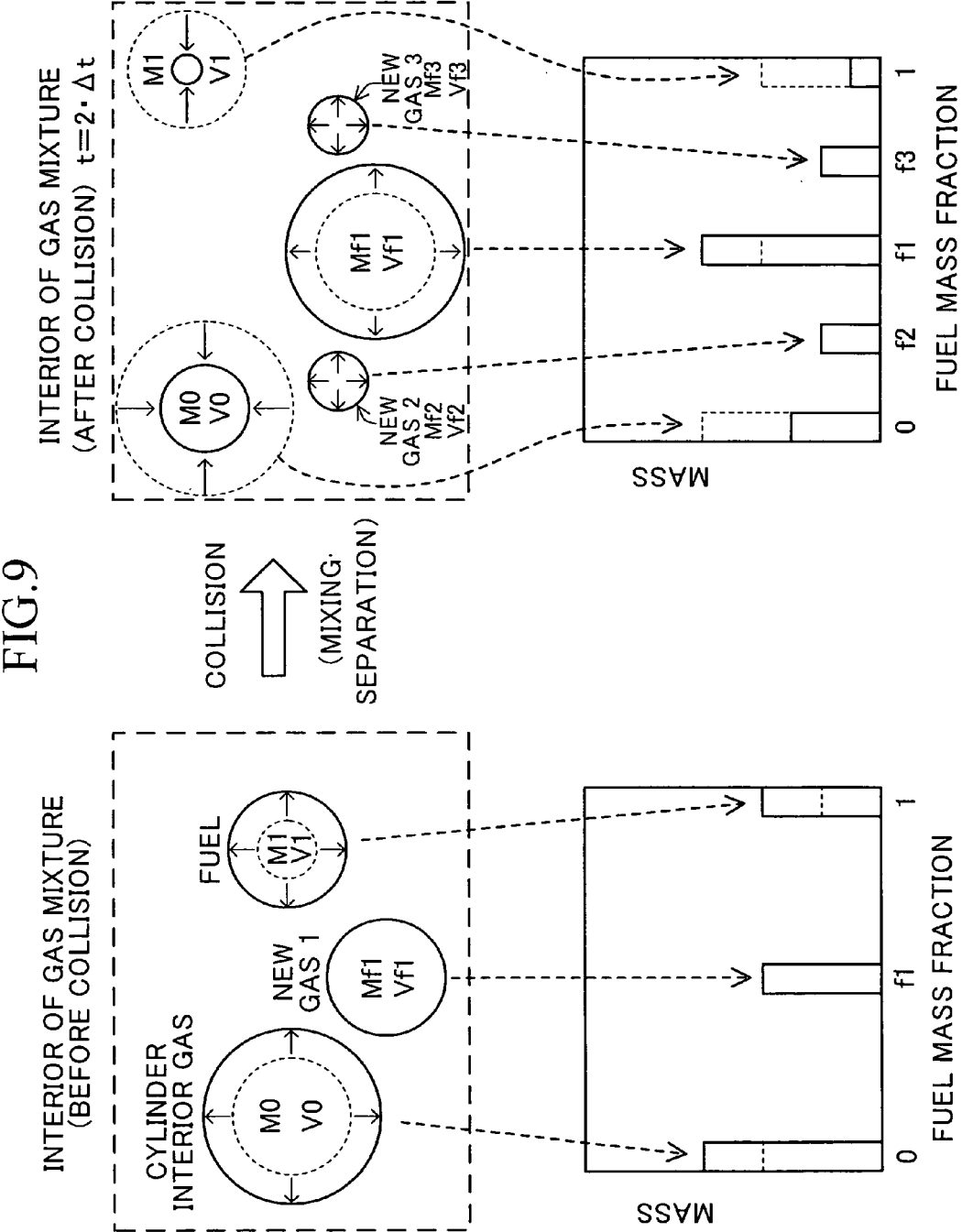
FIG. 9 is an illustration schematically showing states before and after a "collision reaction" occurs when the minute time $\Delta t$ has elapsed after the state shown in FIG. 8 (post injection time $t=2\Delta t$)

With reference to FIGS. 8 and 9, there will be described a specific method of obtaining and updating the mass distribution of the gas volumes within the gas mixture by making use of the "collision reaction." Notably, the diameter of each circle and the length of each bar of a bar graph shown in these drawings represent the quantity (mass, volume, etc.) of a corresponding gas volume.

FIG. 8 schematically shows states before and after the "collision reaction" which occurs when the minute time $\Delta t$ has elapsed after the start of fuel injection (the post injection time $t=\Delta t$). As shown in an illustration on the left side of FIG. 8, when the post injection time t is $\Delta t$ (before collision), only a volume of the fuel vapor (mass M1, volume V1, fuel mass fraction=1) and a volume of the cylinder interior gas (mass M0, volume V0, fuel mass fraction=0) are present within the gas mixture (corresponding to the above-described zone 2).

The mass M1 of the volume of the fuel vapor at this point in time is equal to the mass of fuel injected over the minute time $\Delta t$ following the start of fuel injection (the post injection time t: 0 to $\Delta t$). The mass M0 of the volume of the cylinder interior gas at this point in time is equal to the mass of cylinder interior gas taken into an increased portion of the above-described spray volume VOLtotal (see the above-described Equation (13)), the increased portion corresponding to an increase in spray volume VOLtotal over the minute time $\Delta t$ following the start of fuel injection (the post injection time t: 0 to $\Delta t$) (at this point in time, the portion is equal to the entirety of the spray volume VOLtotal at the post injection time $t=\Delta t$). The mass M0 of the volume of the cylinder interior gas can be obtained by multiplying the volume of the "increased portion of the spray volume VOLtotal" by the density of the cylinder interior gas (=the density $\rho z\mathbf{1}$ of the gas within the zone 1) at the post injection time $t=\Delta t$.

Further, in the present embodiment, under the assumption that the density of each gas volume within the gas mixture is equal to the average density ROave of the gas mixture, the volume (accordingly, the diameter) of each gas volume within the gas mixture is obtained by dividing the mass of the gas volume by the average density ROave of the gas mixture. Accordingly, in an example shown in FIG. 8, the volume V1 of the volume of the fuel vapor is M1/ROave, and the volume V0 of the volume of the cylinder interior gas is M0/ROave. The volume Vf1 of a new gas volume 1 (mass: Mf1) to be described later is Mf1/ROave. When the total sum of the masses of the gas volumes present within the gas mixture is represented by MAStotal, the average density ROave of the gas mixture can be obtained in accordance with the following Equation (33). As described above, once the mass of a gas volume is obtained, the volume (accordingly, the diameter) of the gas volume can be obtained.

$$ROave = MAStotal/VOLtotal \quad (33)$$

An illustration on the right side of FIG. 8 shows the distribution (mass distribution) of the gas volumes within the gas mixture (at the post injection time $t=\Delta t$ (after collision) after occurrence of the above-described "collision reaction" for all combinations each formed by two arbitrary gas volumes of a plurality (two in the illustrated example) of gas volumes which are present in this state (that is, a state at the post injection time $t=\Delta t$ (before collision) and which differ in fuel mass fraction.

In this case, since only the volume of the cylinder interior gas and the volume of the fuel vapor are present within the gas mixture before collision, only a "collision reaction between the volume of the cylinder interior gas and the volume of the fuel vapor" occurs. In this "collision reaction between the volume of the cylinder interior gas and the volume of the fuel vapor," first, a portion of the volume of the cylinder interior gas and a portion of the volume of the fuel vapor mix together. A method of calculating the volumes of the portions associated with this mixing (hereinafter referred to as the "mixing volume VOLmix") will be described later. This mixing volume VOLmix is calculated for every collision reaction.

Next, a portion corresponding to the mixing volume VOLmix separates from the volume of the cylinder interior gas shown in the illustration on the left side of FIG. 8, and a portion corresponding to the mixing volume VOLmix separates from the volume of the fuel vapor shown in the illustration on the left side of FIG. 8. In the following description, a portion which separates from a gas mass as a result of a collision reaction will also be referred to as a "separated portion." Subsequently, the respective (two) separated portions" mix together to thereby form a volume of new gas 1 (that is, the above-described mix-formed gas volume) whose fuel mass fraction is f1 (0<f1<1). Notably, a method of acquiring the fuel mass fraction of a mix-formed gas volume, such as the fuel mass fraction f1, will be described later (fuel mass fractions f2 and f3 shown in FIG. 9 to be described later are also obtained in the same manner).

Accordingly, the mass M0 of the volume of the cylinder interior gas and the mass M1 of the volume of the fuel vapor after the collision reaction (see an illustration on the right side of FIG. 8) decrease from those before the collision reaction (see the illustration on the left side of FIG. 8) by respective amounts corresponding to the separated portions. Meanwhile, the mass Mf1 of the volume of the new gas 1, whose fuel mass fraction is f1, is the sum of the masses corresponding to the separated portions. As is apparent from the above, at the post injection time $t=\Delta t$ (after collision), three gas volumes which differ in fuel mass fraction are present within the gas mixture as shown in the illustration on the right side of FIG. 8.

FIG. 9 schematically shows states before and after the "collision reaction" which occurs when the minute time $\Delta t$ has further elapsed after the state shown in FIG. 8 (the post injection time $t=2\Delta t$). As shown in an illustration on the left side of FIG. 9, at the post injection time $t=2\Delta t$ (before collision), in addition to the volume of the fuel vapor and the volume of the cylinder interior gas, the above-described volume of the new gas 1 whose fuel mass fraction is f1 is present within the gas mixture as in the case of the post injection time $t=\Delta t$ (after collision).

The mass Mf1 of the volume of the new gas 1 at this point in time is equal to the corresponding value on the illustration on the right side of FIG. 8. The mass M1 of the volume of the fuel vapor at this point in time is equal to a value obtained by adding, to the corresponding value on the illustration on the right side of FIG. 8, the "mass of fuel injected during a period in which the post injection time t is between $\Delta t$ and $2\Delta t$." The mass M0 of the volume of the cylinder interior gas at this point in time is equal to a value obtained by adding, to the corresponding value on the illustration on the right side of FIG. 8, "the mass of cylinder interior gas taken into an increased portion of the above-described spray volume VOLtotal," the increased portion corresponding to an increase in spray volume VOLtotal in a period in which the post injection time t is between $\Delta t$ and $2\Delta t$ (=a value obtained by multiplying the volume of the "increased portion of the spray volume VOLtotal" by the density of the cylinder interior gas at the post injection time $t=2\Delta t$).

An illustration on the right side of FIG. 9 shows the distribution (mass distribution) of the gas volumes within the gas mixture (at the post injection time $t=2\Delta t$ (after collision) after occurrence of the above-described "collision reaction" for all combinations each formed by two arbitrary gas volumes of a plurality (three in the illustrated example) of gas volumes which are present in this state (that is, a state at the post injection time $t=2\Delta t$ (before collision)) and which differ in fuel mass fraction.

In this case, since three gas volumes; i.e., the volume of the cylinder interior gas, the volume of the fuel vapor, and the volume of the new gas 1, are present within the gas mixture before collision, three collision reactions occur; i.e., a "collision reaction between the volume of the cylinder interior gas and the volume of the fuel vapor," a "collision reaction between the volume of the cylinder interior gas and the volume of the new gas 1," and a "collision reaction between the volume of the fuel vapor and the volume of the new gas 1."

Of the three collision reactions, the "collision reaction between the volume of the cylinder interior gas and the volume of the fuel vapor" occurs in the same manner as the "collision reaction between the volume of the cylinder interior gas and the volume of the fuel vapor" shown in FIG. 8. Therefore, the mass M0 of the volume of the cylinder interior gas and the mass M1 of the volume of the fuel vapor decrease by respective amounts corresponding to the portions separated from the corresponding gas volumes; and the mass Mf1 of the volume of the new gas 1, whose fuel mass fraction is f1, increases by the sum of the masses corresponding to the portions separated from the volume of the cylinder interior gas and the volume of the fuel vapor, respectively.

In the "collision reaction between the volume of the cylinder interior gas and the volume of the new gas 1," a separated portion of the volume of the cylinder interior gas and a separated portion of the volume of the new gas 1 mix together, so that a volume of a new gas 2 whose fuel mass fraction is f2 (0<f2<f1) is newly produced. As a result of this collision reaction, the mass M0 of the volume of the cylinder interior gas and the mass Mf1 of the volume of the new gas 1 decrease by respective amounts corresponding to the portions separated from the corresponding gas volumes; and the mass Mf2 of the volume of the new gas 2, whose fuel mass fraction is f2, becomes the sum of the masses corresponding to the portions separated from the volume of the cylinder interior gas and the volume of the new gas 1, respectively.

In the "collision reaction between the volume of the fuel vapor and the volume of the new gas 1," a separated portion of the volume of the fuel vapor and a separated portion of the volume of the new gas 1 mix together, so that a volume of a new gas 3 whose fuel mass fraction is f3 (f1<f3<1) is newly produced. As a result of this collision reaction, the mass M1 of the volume of the fuel vapor and the mass Mf1 of the volume of the new gas 1 decrease by respective amounts corresponding to the portions separated from the corresponding gas volumes; and the mass Mf3 of the volume of the new gas 3, whose fuel mass fraction is f3, becomes the sum of the masses corresponding to the portions separated from the volume of the fuel vapor and the volume of the new gas 1, respectively. As is apparent from the above, as a result of the three collision reactions, at the post injection time t=2Δt (after collision), five gas volumes which differ in fuel mass fraction are present within the gas mixture as shown in the illustration on the right side of FIG. 9.

After that time as well, each time the minute time Δt elapses (every time the crank angle CA increases by the minute crank angle ΔCA), the following series of processing steps (processing steps 1 and 2) are performed in the same manner as in the above-described case.

Processing step 1: a mass of fuel newly injected during the minute time Δt is added to the mass M1 of the volume of the fuel vapor, and a mass of the cylinder interior gas newly taken into the gas mixture during the minute time Δt is added to the mass M0 of the volume of the cylinder interior gas.

Processing step 2: after the processing step 1, the above-described collision reaction is successively performed within the gas mixture for all combinations each formed by two arbitrary gas volumes of a plurality of gas volumes which are present at that point in time and which differ in fuel mass fraction (including the volume of the cylinder interior gas and the volume of the fuel vapor).

This processing increases the number of gas volumes which are present within the gas mixture (whose masses are not zero) and which differ in fuel mass fraction (e.g., three in the illustration on the right side of FIG. 8, and five in the illustration on the right side of FIG. 9), whereby the mass distribution of the gas volumes within the gas mixture is acquired and updated. The above is a specific method of acquiring and updating the mass distribution of the gas volumes within the gas mixture by making use of the "collision reaction."

Next, there will be described a method of acquiring various values associated with the "collision reaction," which are necessary for calculation of the mass distribution of the gas volumes within the gas mixture. In order to facilitate the following description, it is assumed that two gas volumes A and B within a gas mixture serve as to-be-collided gas volumes, and a gas volume C serves as a mix-formed gas volume for a certain collision reaction Z. In addition, the mass of the gas volume A before the collision reaction Z is represented by MASA, its speed is represented by VELA, its volume is represented by VOLA (its diameter is represented by DIAA), and its fuel mass fraction is represented by FRACmasA. Similarly, the mass of the gas volume B before the collision reaction Z is represented by MASB, its speed is represented by VELB, its volume is represented by VOLB (its diameter is represented by DIAB), and its fuel mass fraction is represented by FRACmasB. Further, the mass of the gas volume C before the collision reaction Z is represented by MASC, its speed is represented by VELC, its volume is represented by VOLC (its diameter is represented by DIAC), and its fuel mass fraction is represented by FRACmasC (also referred to as "FRACmix").

<Fuel Mass Fraction FRACmix of the Mix-Formed Gas Volume>

First, there will be described a method of calculating (specifying) the fuel mass fraction FRACmasC (=FRACmix) of the mix-formed gas volume in the collision reaction Z. The fuel mass fraction FRACmix of this mix-formed gas volume can be obtained in accordance with the following Equation (34) by making use of the law of conservation of mass regarding fuel that "the sum of the masses of fuels contained in the separated portions of the to-be-collided gas volumes A and B is equal to a value obtained by multiplying the sum of the masses of the separated portions of the to-be-collided gas volumes A and B by the fuel mass fraction FRACmix of the mix-formed gas volume C."

$$FRACmix = \frac{dMASA \cdot FRACmasA + dMASB \cdot FRACmasB}{dMASA + dMASB} \quad (34)$$

In Equation (34), dMASA and dMASB represent the mass of the separated portion of the gas volume A and the mass of the separated portion of the gas volume B, respectively. The masses dMASA and dMASB of the separated portions of the gas volumes A and B can be obtained by multiplying the above-described mixing volume VOLmix by the above-mentioned average density ROave of the gas mixture. In Equation (34), "dMASA·FRACmasA" corresponds to the mass of fuel contained in the separated portion of the gas volume A, and "dMASB·FRACmasB" corresponds to the mass of fuel contained in the separated portion of the gas volume B. From Equation (34), the fuel mass fraction FRACmix of the mix-formed gas volume is calculated for each collision reaction.

<Mass MAS of Each Gas Volume>

Next, there will be described a method of updating the mass MAS of each gas volume.

<<Masses of Gas Volumes Associated with the Collision Reaction>>

As a result of the above-described collision reaction Z, the above-described portion having the mass dMASA separates from the gas volume A, and the above-described portion having the mass dMASB separates from the gas volume B. Meanwhile, both the separated portions of the gas volumes A and B are added to the gas volume C to form a portion (or the entirety) of the gas volume C. Accordingly, the masses MASA', MASB', and MASC' of the gas volumes A, B, and C after the collision reaction Z can be obtained in accordance with the following Equation (35). Equation (35) enables update of the masses MAS (accordingly, volumes VOL) of the gas volumes associated with the collision reaction Z. Therefore, the masses of the gas volumes associated with the collision reaction can be updated by means of applying Equation (35) each time the collision reaction occurs.

$$MASA'=MASA-dMASA$$

$$MASB'=MASB-dMASB$$

$$MASC'=MASC+(dMASA+dMASB) \quad (35)$$

<<Masses of the Volume of the Cylinder Interior Gas and the Volume of the Fuel Vapor>>

The masses of gas volumes within the gas mixture, excluding the volume of the cylinder interior gas (that is, a gas volume whose fuel mass fraction FRACmas is zero) and the volume of the fuel vapor (that is, a gas volume whose fuel mass fraction FRACmas is 1); i.e., gas volumes whose fuel mass fractions FRACmas are greater than zero but less than 1, change in accordance with Equation (35) only when these gas volumes take part in the collision reaction.

Meanwhile, the mass of the volume of the cylinder interior gas changes not only when the volume of the cylinder interior gas takes part in the collision reaction but also when a cylinder interior gas which is newly taken into the gas mixture every time the minute time Δt elapses (every time the crank angle CA increases by the minute crank angle ΔCA) (hereinafter referred to as the "new cylinder interior gas") is added to the volume of the cylinder interior gas to form a portion thereof.

That is, when the mass of the volume of the cylinder interior gas before addition of the new cylinder interior gas is represented by MAS0, the mass of the new cylinder interior gas is represented by ΔGm, and the mass of the volume of the cylinder interior gas after addition of the new cylinder interior gas is represented by MAS0', the mass MAS0' of the volume of the cylinder interior gas after addition of the new cylinder interior gas can be obtained in accordance with the following Equation (36). Accordingly, every time the minute time Δt elapses, the mass of the volume of the cylinder interior gas can be updated for addition of the new cylinder interior gas to the volume of the cylinder interior gas, by means of applying Equation (36) every time the minute time Δt elapses.

$$MAS0' = MAS0 + \Delta Gm \qquad (36)$$

Similarly, as in the case of the mass of the volume of the cylinder interior gas, the mass of the volume of the fuel vapor changes not only when the volume of the fuel vapor takes part in the collision reaction but also when fuel which is newly injected every time the minute time Δt elapses (every time the crank angle CA increases by the minute crank angle ΔCA) (hereinafter referred to as the "new fuel") is added to the volume of the fuel vapor to form a portion thereof.

That is, when the mass of the volume of the fuel vapor before addition of the new fuel is represented by MAS1, the mass of the new fuel is represented by q, and the mass of the volume of the fuel vapor after addition of the new fuel is represented by MAS1', the mass MAS1' of the volume of the fuel vapor after addition of the new fuel can be obtained in accordance with the following Equation (37). Accordingly, every time the minute time Δt elapses, the mass of the volume of the fuel vapor can be updated for addition of the new fuel to the volume of the fuel vapor, by means of applying Equation (37) every time the minute time Δt elapses.

$$MAS1' = MAS1 + q \qquad (37)$$

In the above-described manner, the mass distribution of the gas volumes within the gas mixture can be acquired and updated by means of applying Equations (36) and (37) every time the minute time Δt elapses, and applying Equation (35) every time the collision reaction occurs.

<Mixing Volume VOLmix>

Next, there will be described a method of calculating the mixing volume VOLmix, which is necessary for acquisition of the mass distribution of the gas volumes within the gas mixture. The mixing volume VOLmix can be considered to be equal to a volume through which the two collided gas volumes A and B interact. Here, it is assumed that, of the two collided gas volumes A and B, the gas volume which is smaller in volume (diameter) (the small gas volume) passes in its entirety through the gas volume which is larger in volume (diameter) (the large gas volume).

Figure 10:
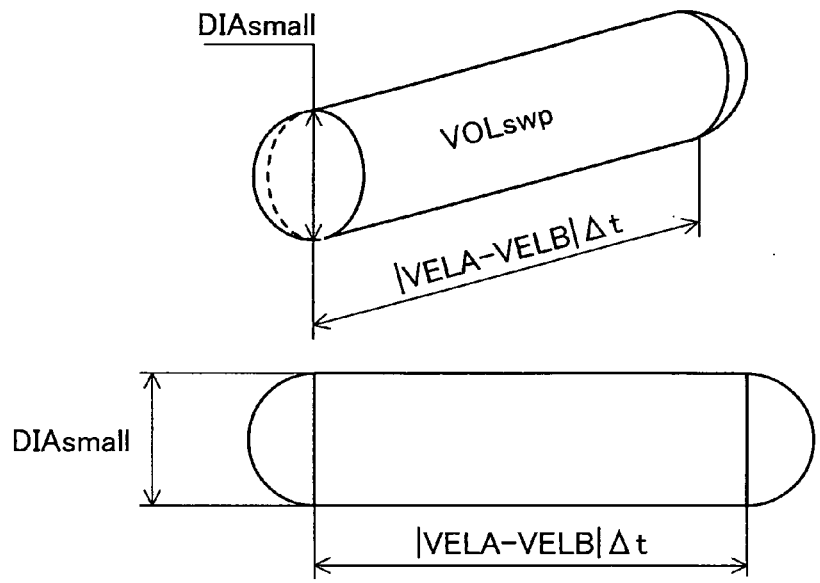
FIG. 10 is an illustration schematically showing a capsule-shaped passage volume.

In this case, a volume (hereinafter referred to as a "passage volume VOLswp") through which the two collided gas volumes A and B interact during the minute time Δt (the minute crank angle ΔCA) assumes a capsule-like shape as shown in FIG. 10, and can be calculated in accordance with the following Equation (38). In Equation (38), DIAsmall represents the diameter of the small gas volume. |VELA-VELB| corresponds to a relative speed of the gas volumes A and B.

$$VOLswp = \frac{\pi}{4} \cdot DIAsmall^2 \cdot |VELA - VELB| \cdot \Delta t + \frac{\pi}{6} \cdot DIAsmall^3 \qquad (38)$$

The mixing volume VOLmix is considered to greatly depend on the passage volume VOLswp. Meanwhile, the ratio (probability) at which the entire small gas passes through the large gas volume can be assumed to be equal to the ratio of the volume VOLbig (=greater one of VOLA and VOLB) of the large gas volume to the volume of the entire gas mixture (that is, the spray volume VOLtotal).

Moreover, the greater the engine speed NE (that is, the shorter the minute time Δt corresponding to the minute crank angle ΔCA), the shorter the time provided for mixture of the gas volumes A and B. Therefore, the mixing volume VOLmix can be considered to decrease as the engine speed NE increases.

Therefore, the mixing volume VOLmix can be represented by the following Equation (39). In Equation (39), α is a coefficient which is set such that the greater the engine speed NE, the smaller the coefficient α. The mixing volume VOLmix is calculated in accordance with the following Equation (39) every time the collision reaction occurs.

$$VOLmix = \alpha \cdot VOLswp \cdot \frac{VOLbig}{VOLtotal} \qquad (39)$$

<Velocities VEL of the Gas Volumes>

Next, there will be described a method of acquiring and updating the velocities VEL of the gas volumes, which are necessary for calculation of the mixing volume VOLmix.

<<Velocity of the Mix-Formed Gas Volume>>

Due to the above-described collision reaction Z, the separated portions of the gas volumes A and B are added to the gas volume C. As a result, the velocity of the gas volume C, which is the mix-formed gas volume, changes from the value VELC before the collision reaction Z. The velocity VELC' of the gas volume C after the collision reaction Z can be obtained in accordance with the following Equation (40), by making use of the law of conservation of momentum that the "sum of the momentum of the mix-formed gas volume C before the collision reaction Z and the respective momentums of the separated portions of the to-be-collided gas volumes A and B before the collision reaction Z is equal to the momentum of the mix-formed gas volume C after the collision reaction Z."

$$VELC' = \frac{MASC \cdot VELC + dMASA \cdot VELA + dMASB \cdot VELB}{MASC + (dMASA + dMASB)} \qquad (40)$$

In Equation (40), the entire denominator is the mass (=MASC') of the gas volume C after the collision reaction Z (see the above-described Equation (35)). In the numerator, "MASC·VELC" corresponds to the momentum of the gas volume C before the collision reaction Z. "dMASA·VELA" corresponds to the momentum of the separated portion of the gas volume A before the collision reaction Z, and "dMASB·VELB" corresponds to the momentum of the separated portion of the gas volume B before the collision reaction Z. Equation (40) enables update of the velocity VELC of the mix-formed gas volume C at the time of the collision reaction Z. Accordingly, by means of applying Equation (40) every time the collision reaction occurs, the velocity of the gas volume having become the mix-formed gas volume can be updated every time the collision reaction occurs.

<<Velocities of the Volume of the Cylinder Interior Gas and the Volume of the Fuel Vapor>>

The velocities of gas volumes within the gas mixture, excluding the volume of the cylinder interior gas and the volume of the fuel vapor; i.e., gas volumes whose fuel mass fraction FRACmas are greater than zero but less than 1, change in accordance with the above-described Equation (40) only when the gas volumes become the mix-formed gas volume in the collision reaction.

Meanwhile, the velocity of the volume of the cylinder interior gas changes not only when the volume of the cylinder interior gas becomes the mix-formed gas volume in the collision reaction but also when a cylinder interior gas which is newly taken into the gas mixture every time the minute time Δt elapses (every time the crank angle CA increases by the minute crank angle ΔCA) (that is, the above-mentioned new cylinder interior gas) is added to the volume of the cylinder interior gas to form a portion thereof.

When the mass and velocity of the volume of the cylinder interior gas before addition of the new cylinder interior gas are represented by MAS0 and VEL0, respectively, the mass and velocity of the new cylinder interior gas are represented by ΔGm and VELgas, respectively, and the velocity of the volume of the cylinder interior gas after addition of the new cylinder interior gas is represented by VEL0', the velocity VELS0' of the volume of the cylinder interior gas after addition of the new cylinder interior gas can be obtained in accordance with the following Equation (41), by making use of the law of conservation of momentum that the "sum of the momentum of the volume of the cylinder interior gas before addition of the new cylinder interior gas and the momentum of the new cylinder interior gas is equal to the momentum of the volume of the cylinder interior gas after addition of the new cylinder interior gas."

$$VEL0' = \frac{MAS0 \cdot VEL0 + \Delta Gm \cdot VELgas}{MAS0 + \Delta Gm} \quad (41)$$

In Equation (41), the entire denominator is the mass of the volume of the cylinder interior gas after addition of the new cylinder interior gas. In the numerator, "MAS0·VEL0" corresponds to the momentum of the volume of the cylinder interior gas before addition of the new cylinder interior gas, and "ΔGm·VELgas" corresponds to the momentum of the new cylinder interior gas. Notably, in the present embodiment, the velocity VELgas of the new cylinder interior gas is assumed to be zero, because it can be considered that the cylinder interior gas is taken into the gas mixture due to expansion of the region of the fuel spray (accordingly, the region of the gas mixture) within the cylinder interior gas, which stands still within the combustion chamber.

By means of applying Equation (41) every time the minute time Δt elapses, the velocity of the volume of the cylinder interior gas can be updated for addition of the new cylinder interior gas to the volume of the cylinder interior gas every time the minute time Δt elapses.

Meanwhile, as in the case of the velocity of the volume of the cylinder interior gas, the velocity of the volume of the fuel vapor changes not only when the volume of the fuel vapor becomes the mix-formed gas volume in the collision reaction but also when fuel which is newly injected every time the minute time Δt elapses (every time the crank angle CA increases by the minute crank angle ΔCA) (that is, the above-described "new fuel") is added to the volume of the fuel vapor to form a portion thereof.

When the mass and velocity of the volume of the fuel vapor before addition of the new fuel are represented by MAS1 and VEL1, respectively, the mass and velocity of the new fuel are represented by q and VELinj, respectively, and the velocity of the volume of the fuel vapor after addition of the new fuel is represented by VEL1', the velocity VEL1' of the volume of the fuel vapor after addition of the new fuel can be obtained in accordance with the following Equation (42), by making use of the law of conservation of momentum that the "sum of the momentum of the volume of the fuel vapor before addition of the new fuel and the momentum of the new fuel is equal to the momentum of the volume of the fuel vapor after addition of the new fuel."

$$VEL1' = \frac{MAS1 \cdot VEL1 + q \cdot VELinj}{MAS1 + q} \quad (42)$$

In Equation (42), the entire denominator is the mass of the volume of the fuel vapor after addition of the new fuel. In the numerator, "MAS1·VEL1" corresponds to the momentum of the volume of the fuel vapor before addition of the new fuel interior gas, and "q·VELinj" corresponds to the momentum of the new fuel. The velocity VELinj of the new fuel can be considered to be equal to the velocity of the injected fuel, and the velocity of the injected fuel greatly depends on the above-described effective injection pressure ΔP0 and the density ρf of liquid fuel. Accordingly, the velocity VELinj of the new fuel can be obtained by making use of a function funcVELinj for obtaining the velocity VELinj of the new fuel while using ΔP0 and ρf as arguments.

By means of applying Equation (42) every time the minute time Δt elapses, the velocity of the volume of the fuel vapor can be updated for addition of the new fuel to the volume of the fuel vapor every time the minute time Δt elapses. In the above, there have been described methods of obtaining the various values associated with the "collision reaction," which are necessary for calculation of the mass distribution of the gas volumes within the gas mixture.

<Coping with Discrete Setting of the Fuel Mass Fractions>

Next, there will be described the setting of the fuel mass fractions FRACmas of the gas volumes which constitute the gas mixture. As can be understood from the above-described Equation (34), the fuel mass fraction FRACmix of the mix-formed gas volume is a value which can be calculated as an arbitrary rational number within the range of "0" to "1." However, if the fuel mass fraction FRACmas of each of the gas volumes which constitute the gas mixture is permitted to be set to an arbitrary rational number within the range of "0" to "1," the number of the gas volumes which constitute the gas mixture increases infinitely, so that calculation load may become very large.

Figure 11:
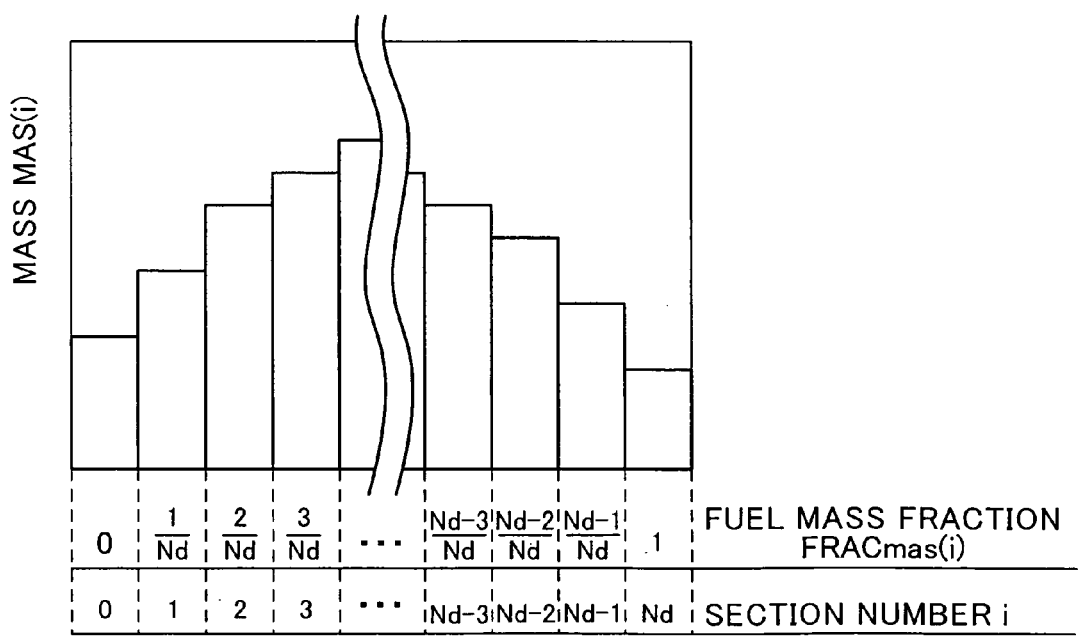
FIG. 11 is a graph showing an example distribution of masses of gas volumes within a gas mixture, the distribution being obtained by the apparatus of FIG. 1 through repetition of calculations associated with the "collision reaction" every time the minute time $\Delta t$ elapses after the start of fuel injection.

In view of the above, in the present apparatus, the fuel mass fractions FRACmas of the gas volumes which constitute the gas mixture are discretely set at constant intervals within the range of "0" to "1." This will be described with reference to FIG. 11. FIG. 11 shows an example mass distribution of the gas volumes within the gas mixture which is obtained when the present apparatus repeatedly performs the above-described processing every time the minute time Δt elapses (every time the crank angle CA increases by the minute crank angle ΔCA) after the start of fuel injection.

As shown in FIG. 11, in the present apparatus, the number of gas volumes which can exist within the gas mixture is limited to "Nd+1" (Nd is a natural number), and section number i (i=0, 1, 2, ..., Nd−1, Nd) is assigned to each of the "Nd+1" gas volumes. In the following description, a gas volume whose section number is i will be referred to as the "gas volume (i)," and the fuel mass fraction of the gas volume (i) will be referred to as the fuel mass fraction "FRACmas(i). The fuel mass fraction "FRACmas(i) of the gas volume (i) is set to a value "i/Nd" (i=0, 1, 2, ..., Nd−1, Nd). In this manner, the fuel mass fractions FRACmas of the gas volumes which constitute the gas mixture are discretely set at intervals of "1/Nd" within the range of "0" to "1."

When the fuel mass fractions FRACmas of the gas volumes which constitute the gas mixture are discretely set within the range of "0" to "1," there may arise a case where the gas mixture does not contain a gas volume whose fuel mass fraction FRACmas completely coincides with the value of the fuel mass fraction FRACmix of the mix-formed gas volume calculated in accordance with the above-described Equation (34).

When such a case arises, in the present apparatus, two fuel mass fractions FRACmas(md) and FRACmas(mu) which sandwich the value of the fuel mass fraction FRACmix of the mix-formed gas volume calculated in accordance with the above-described Equation (34) are specified (mu=md+1). The two gas volumes; i.e., the gas volume (md) and the gas volume (mu), are used as the mix-formed gas volume. This will be described more specifically with reference to FIG. 12.

Figure 12:
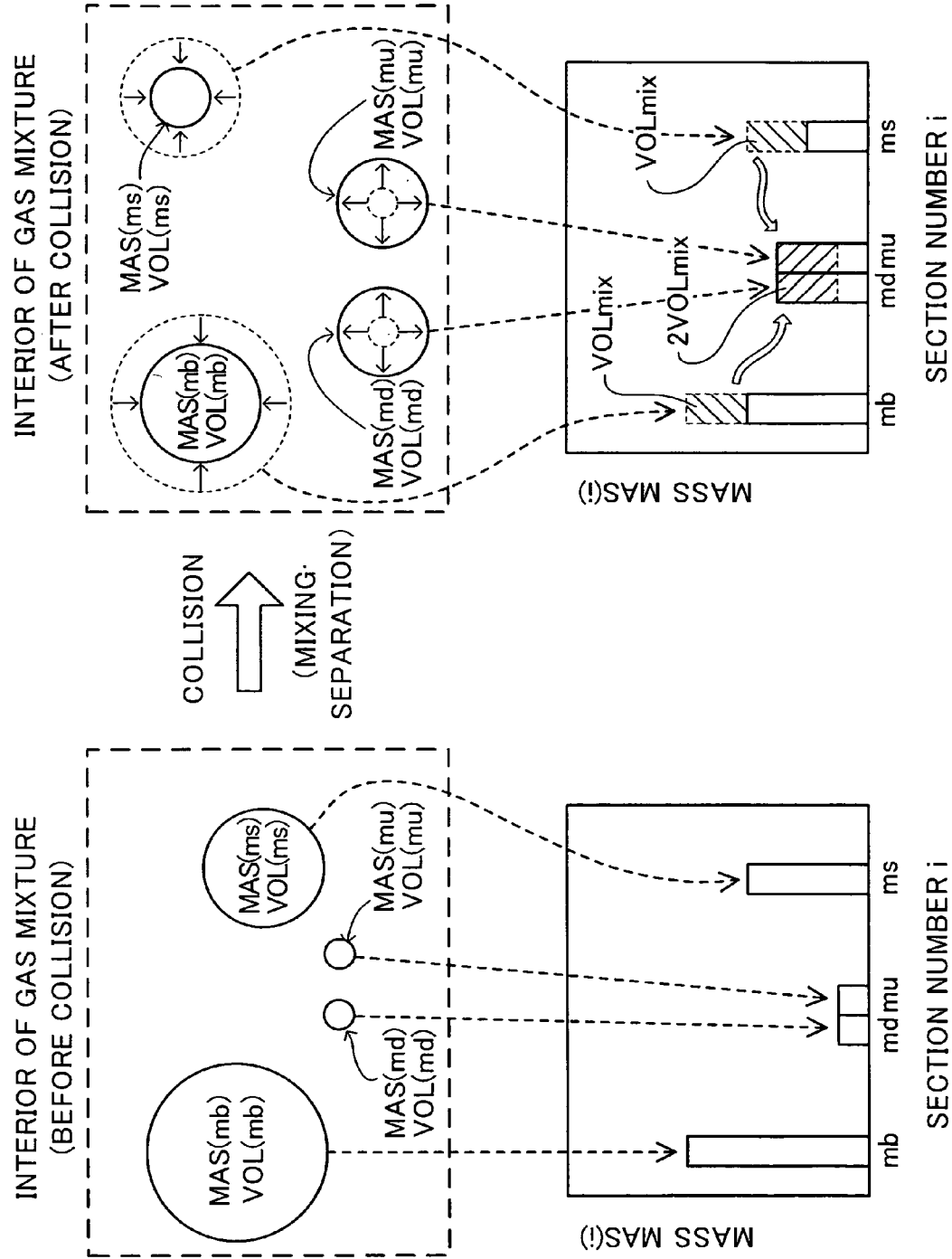
FIG. 12 is an illustration showing states before and after a "collision reaction" in the case where fuel mass fractions of gas volumes are set discretely and two gas volumes are used as mix-formed gas volumes.

FIG. 12 schematically shows states before and after a "collision reaction between the gas volume (mb) and the gas volume (ms)" (mb, ms: integers which are not less than 0 but are not greater than Nb). The value of the fuel mass fraction FRACmas of the mix-formed gas volume which is calculated for this collision reaction in accordance with the above-described Equation (34) is assumed to be located between the fuel mass fractions FRACmas(md) and FRACmas(mu). Notably, in order to facilitate understanding, gas volumes other than the four gas volumes related to this collision reaction (the gas volume (mb), the gas volume (ms), the gas volume (md), and the gas volume (mu)), are not shown in FIG. 12. MAS(i) and VOL(i) represent the mass and volume of the gas volume (i), respectively (i=0, 1, 2, ..., Nd−1, Nd).

In this case, as shown in FIG. 12, the respective separated portions from the gas volume (mb) and the gas volume (ms) are converted to two gas volumes which serve as mix-formed gas volumes (i.e., the gas volume (md) and the gas volume (mu)) at a predetermined distribution ratio. This distribution ratio (the ratio between the distribution to the gas volume (md) and the distribution to the gas volume (mu)) is determined to be (the value FRACmas(mu)—the value FRACmix):(the value FRACmix—the value FRACmas(md)). The details of such processing will be described later with reference to flowcharts.

<Standard Deviation σ of the Fuel Mass Fractions Which Represents the Nonuniformity of the Gas Mixture>

By the above-described methods, the present apparatus acquires and updates the mass distribution of the gas volumes within the gas mixture every time the minute time Δt elapses (every time the crank angle CA increases by the minute crank angle ΔCA) after the start of fuel injection. In addition, every time the minute time Δt elapses after the start of fuel injection, the present apparatus acquires and updates the "standard deviation σ of the fuel mass fractions within the gas mixture" in accordance with the following Equation (43) on the basis of the above-described, acquired mass distribution of the gas volumes within the gas mixture.

$$\sigma = \sqrt{\sum_{i=0}^{Nd}\left\{(FRACmasave - FRACmas(i))^2 \cdot \frac{MAS(i)}{MAStotal}\right\}} \quad (43)$$

In Equation (43), FRACmasave is the average of the fuel mass fractions within the gas mixture, and can be obtained in accordance with the following Equation (44).

$$FRACmasave = \frac{\sum_{i=0}^{Nd}(MAS(i) \cdot FRACmas(i))}{MAStotal} \quad (44)$$

The standard deviation σ obtained in this manner represents the nonuniformity of fuel concentration within the gas mixture. Accordingly, the above-described problem 2 can be solved by reflecting the nonuniformity of the gas mixture represented by the standard deviation σ in the calculation of the above-described combustion speeds qrz2 and qrz3 (g/sec) (accordingly, the heat generation rates Hrz2 and Hrz3 (J/deg)).

Figure 13:
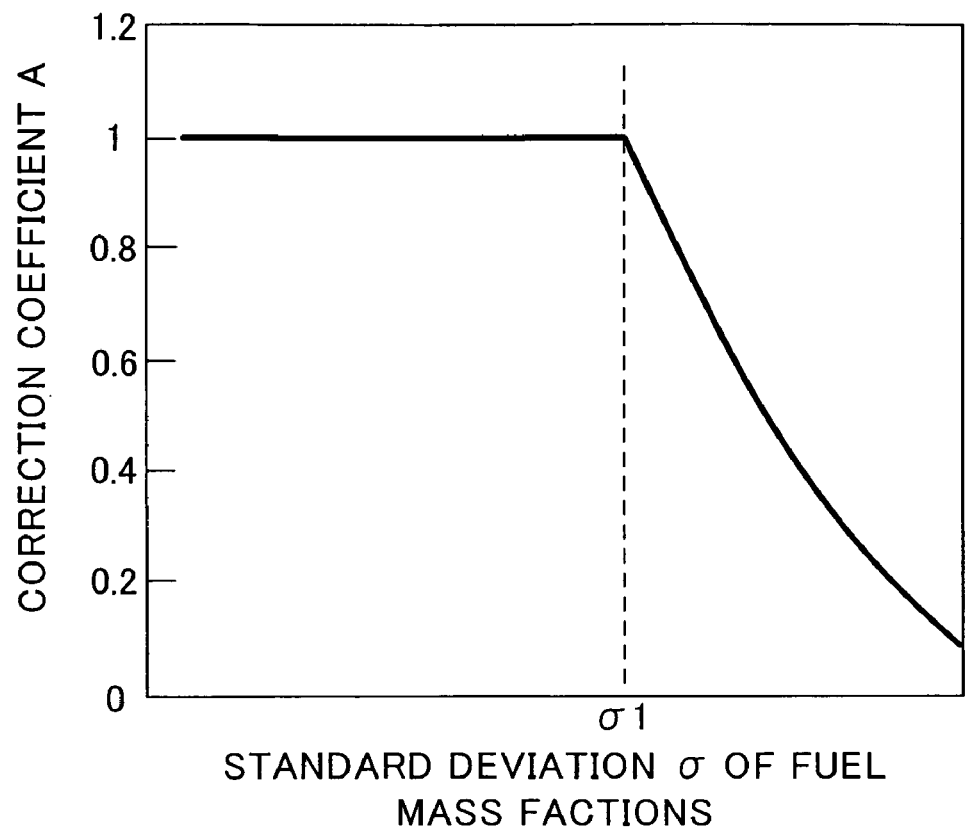
FIG. 13 is a graph showing a table which is referred by a CPU shown in FIG. 1 and which defines the relation between standard deviation of fuel mass fractions of gas volumes and correction coefficient for correcting heat generation rate.

Therefore, the present apparatus introduces a correction coefficient A which is set as shown in FIG. 13. When the standard deviation σ is equal to or less than a value σ1 (constant), the coefficient A is fixed to "1." When the standard deviation σ is greater than the value σ1, the coefficient A is set such that the greater the standard deviation σ, the smaller the correction coefficient A.

The present apparatus calculates the combustion speed qrz2 (g/sec) (accordingly, the heat generation rate Hrz2 (J/deg)) in accordance with the following Equation (45) which corresponds to the above-described Equation (20) and in which the correction coefficient A is incorporated, and calculates the combustion speed qrz3 (g/sec) (accordingly, the heat generation rate Hrz3 (J/deg)) in accordance with the following Equation (46) which corresponds to the above-described Equation (31) and in which the correction coefficient A is incorporated.

$$qrz2 = \frac{[Fuel]z2 \cdot Mz2}{\tau cz2/A} \quad (45)$$

$$qrz3 = \frac{[Fuel]z3 \cdot Mz3}{\tau mz3/A} \quad (46)$$

By virtue of incorporation of the correction coefficient A, the combustion speeds qrz2 and qrz3 (g/sec) (accordingly, the heat generation rates Hrz2 and Hrz3 (J/deg)) are calculated such that these values decrease as the standard deviation σ increases (accordingly, the nonuniformity of the gas mixture increases). The present inventor has found that the above-described problem 2 is solved by these calculations.

Figure 14:
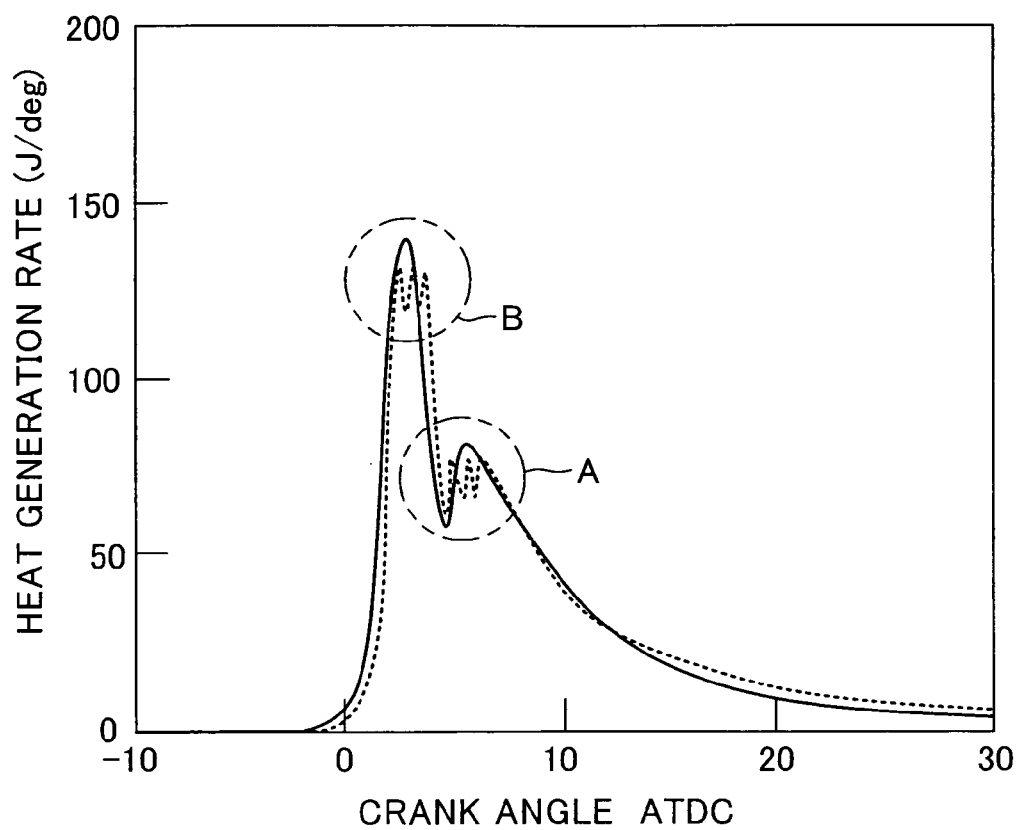
FIG. 14 is a graph showing, for comparison, results obtained through an experiment (broken line) and results of calculation performed by use of the apparatus of FIG. 1 (solid line) on the relation between heat generation rate and crank angle for the case where fuel injection continues after ignition of a gas mixture.

FIG. 14 is a graph corresponding to the above-described FIG. 6 and showing the results of calculation (see the solid line) performed after solving the above-described problem 1 by "separately handling the pre-ignition injected portion (the zone 2) and the post-ignition injected portion (the zone 3) in the case of post-ignition continued injection)" and solving the above-described problem 2 by "taking into consideration the nonuniformity (the standard deviation σ) of the fuel concentration within the gas mixture."

As can be understood from FIG. 14, in the calculation results, a second, relatively small peak is generated after a first, relatively large peak as in the experiment results (see an area indicated by A). That is, the problem 1 has been solved. In the calculation results, conceivably, the first, large peak corresponds to the peak of the combustion speed qrz2 (g/sec) (accordingly, the heat generation rate Hrz2 (J/deg)) in the zone 2, and the second, small peak corresponds to the peak of the combustion speed qrz3 (g/sec) (accordingly, the heat generation rate Hrz3 (J/deg)) in the zone 3.

In addition, as can be understood from FIG. 14, the first peak in the calculation results is not excessively large as compared with the first peak in the experimental results (see an area indicated by B). That is, the above-described problem 2 has been solved. Conceivably, this is done as a result of the nonuniformity of the gas mixture represented by the standard deviation σ being reflected in the calculation of the combustion speeds qrz2 and qrz3 (g/sec) (accordingly, the heat generation rates Hrz2 and Hrz3 (J/deg)). In the above, there have been described the method of estimating the gas mixture state, the method of estimating the heat generation rate in relation to the crank angle CA, and the method of estimating the nonuniformity of the gas mixture, which methods are employed by the present apparatus.

Actual Operation:

Next, there will be described actual operation of the gas-mixture-state acquisition apparatus, which includes the gas-mixture-nonuniformity acquisition apparatus for an internal combustion engine having the above-described configuration.

Figure 15:
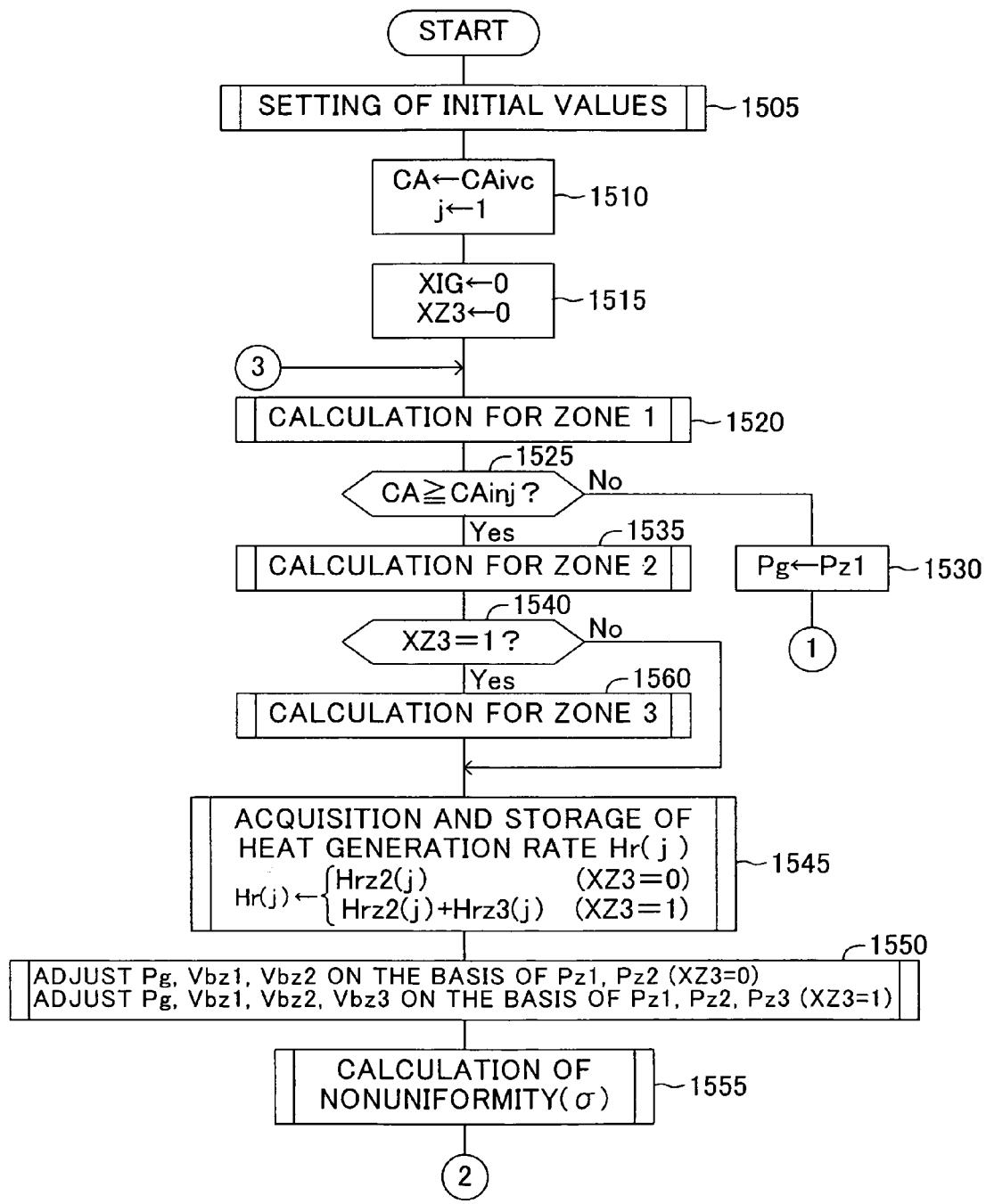
FIG. 15 is a flowchart showing a first half of a main routine executed by the CPU shown in FIG. 1.
Figure 16:
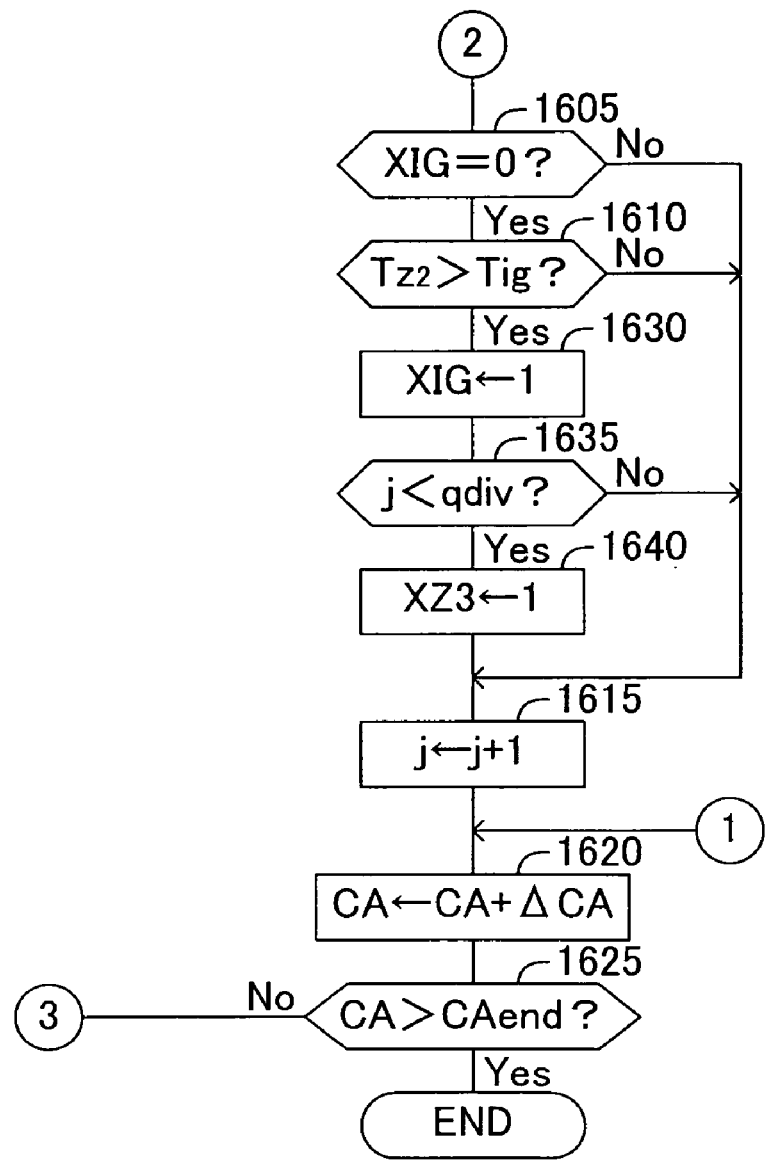
FIG. 16 is a flowchart showing a second half of the main routine executed by the CPU shown in FIG. 1.

Every time the intake valve Vin is closed (that is, every time IVC comes), the CPU 61 executes a series of routines (a main routine) shown in FIGS. 15 and 16 in the form of flowcharts for a cylinder with which IVC comes. As a result of execution of the main routine, a heat regeneration rate Hr(j) (j=1, 2, . . . ) is calculated for a crank angle CA (CA=CAinj+j·ΔCA) between a crank angle CAinj and a crank angle CAend (e.g., near the expansion bottom dead center). Since the execution of this main routine ends immediately after IVC, the above-described heat generation rates Hr(j) (j=1, 2, . . . ) can also be obtained immediately before IVC (accordingly, before the actual fuel injection timing CAinj comes). Below, this operation will be described in detail.

When IVC comes for a certain cylinder, the CPU 61 starts the processing of the main routine, and proceeds to step 1505. In step 1505, the CPU 61 starts a series of routines (sub routine) shown in FIGS. 17 and 18 in the form of flowcharts from step 1700 in order to perform "setting of initial values."

When the CPU 61 proceeds from step 1700 to step 1705, it sets an IVC-time crank angle CAivc to the actual crank angle CAact at the present point in time detected from the crank position sensor 74; sets an IVC-time cylinder interior gas pressure Pgivc to the intake pipe pressure Pb at the present point in time detected from the intake-pipe pressure sensor 73; sets an IVC-time cylinder interior gas temperature Tgivc to the intake gas temperature Tb at the present point in time detected from the intake-gas temperature sensor 72; and sets the intake-gas oxygen concentration [O2]in to the intake-gas oxygen concentration RO2in at the present point in time detected from the intake-gas oxygen temperature 76.

Subsequently, the CPU 61 proceeds to step 1710, and obtains the total mass Gc of the cylinder interior gas on the basis of the set IVC-time cylinder interior gas pressure Pgivc, the set IVC-time cylinder interior gas temperature Tgivc, and the above-described Equation (2).

Figure 30:
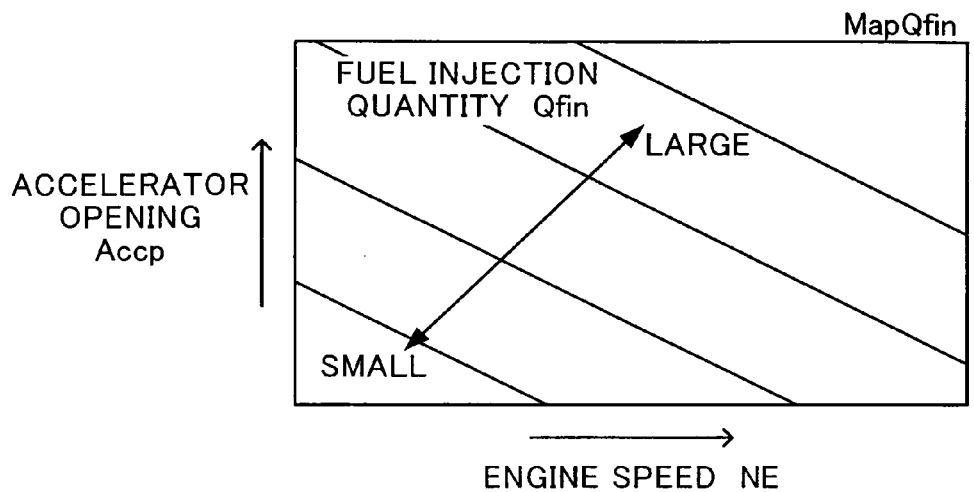
FIG. 30 is a table for determining a fuel injection quantity, to which the CPU shown in FIG. 1 refers during execution of the routine shown in FIG. 17.

Next, the CPU 61 proceeds to step 1715, and obtains the fuel injection quantity Qfin (g) (that is, the fuel injection period TAU) from the accelerator opening Accp at the present point in time obtained from the accelerator opening sensor 75, the engine speed NE at the present point in time obtained from the crank position sensor 74, and a table (map) MapQfin shown in FIG. 30. The table MapQfin is a table which defines the relation between the accelerator opening Accp and the engine speed NE and the fuel injection quantity Qfin, and is stored n the ROM 62.

Figure 31:
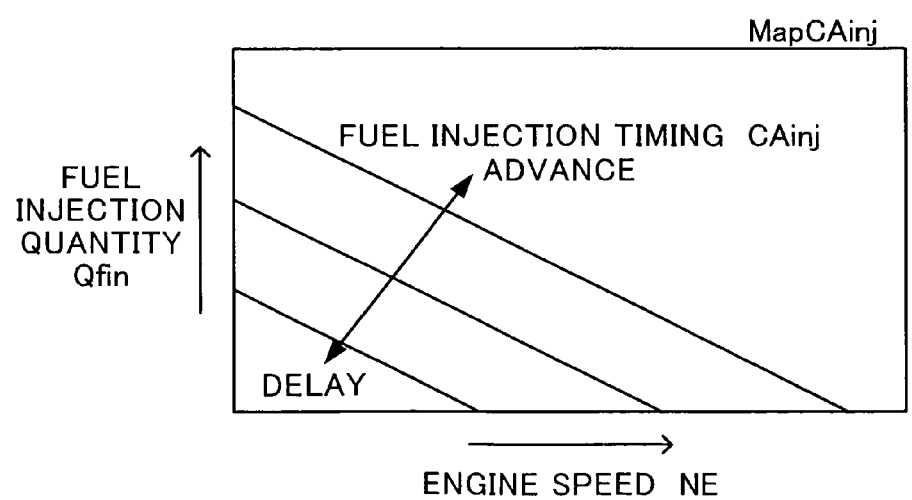
FIG. 31 is a table for determining a fuel injection timing, to which the CPU shown in FIG. 1 refers during execution of the routine shown in FIG. 17.

Next, the CPU 61 proceeds to step 1720, and determines the fuel injection timing CAinj from the fuel injection quantity Qfin, the engine speed NE, and a table (map) MapCAinj shown in FIG. 31. The table MapCAinj is a table which defines the relation between the fuel injection quantity Qfin and the engine speed NE and the fuel injection timing CAinj, and is stored n the ROM 62.

Figure 32:
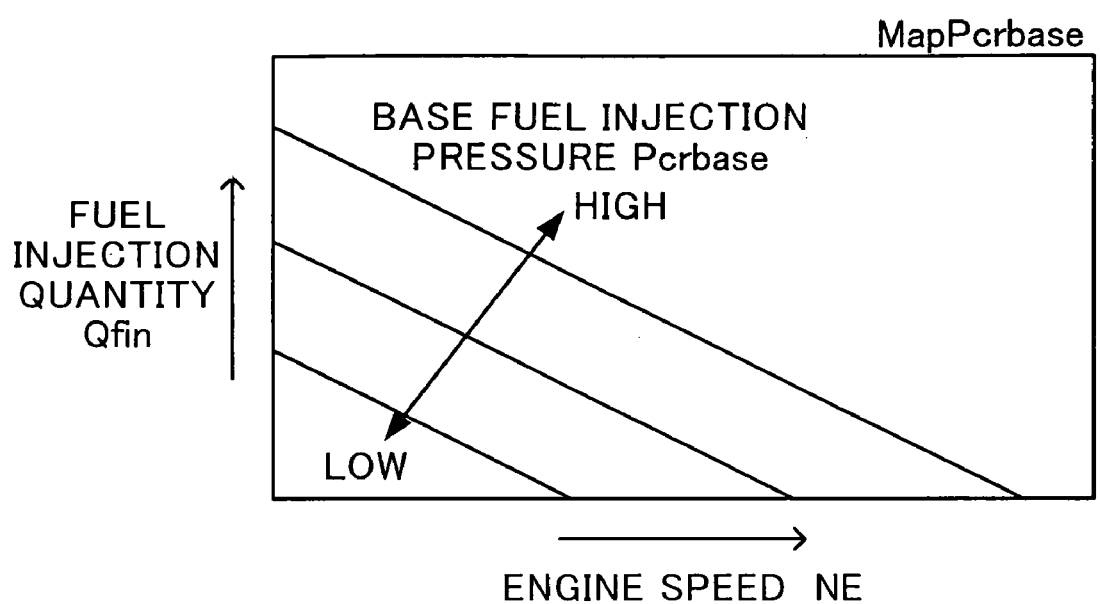
FIG. 32 is a table for determining a base fuel injection pressure, to which the CPU shown in FIG. 1 refers during execution of the routine shown in FIG. 17.

Subsequently, the CPU 61 proceeds to step 1725, and determines the base fuel injection pressure Pcrbase from the fuel injection quantity Qfin, the engine speed NE, and a table (map) MapPcrbase shown in FIG. 32. The table MapPcrbase is a table which defines the relation between the fuel injection quantity Qfin and the engine speed NE and the base fuel injection pressure Pcrbase, and is stored n the ROM 62.

Next, the CPU 61 proceeds to step 1730, and determines a division number qdiv for the case where the fuel injection period TAU is divided by the minute time Δt (depending on the engine speed NE) corresponding to the minute crank angle ΔCA (constant), from the above-described, obtained fuel injection period TAU and the engine speed NE.

Subsequently, the CPU 61 proceeds to step 1735, and obtains the distribution of the fuel injection pressure for each minute crank angle ΔCA over the fuel injection period TAU; specifically, Pcr(j) (j=1, 2, . . . , qdiv) from the division number qdiv and the above-described base fuel injection pressure Pcrbase. The Pcr(j) (j=1, 2, . . . , qdiv) is the average value of the injection pressure of fuel injected during the period between the crank angle (CAinj+(j−1)·ΔCA) and the crank angle (CAinj+j·ΔCA).

Next, the CPU 61 proceeds to step 1740, and obtains the distribution of the fuel injection quantity for each minute crank angle ΔCA over the fuel injection period TAU; specifically, q(j) (j=1, 2, . . . , qdiv) from the above-described division number qdiv and the above-described base fuel injection pressure Pcrbase. The q(j) (j=1, 2, . . . , qdiv) is the quantity (g) of fuel injected during the period between the crank angle (CAinj+(j−1)·ΔCA) and the crank angle (CAinj+j·ΔCA). Notably, the relation "Qfin=q(1)+ . . . +q(qdiv)" stands.

Next, the CPU 61 proceeds to step 1745, and determines the minute time Δt corresponding to the minute crank angle ΔCA (a time which the crank angle CA takes to increase by the minute crank angle ΔCA) from the engine speed NE and the minute crank angle ΔCA.

Subsequently, the CPU 61 proceeds to step 1750, and sets the combustion chamber internal pressure Pg (the initial value thereof) to a value equal to the above-mentioned IVC-time cylinder interior gas pressure Pgivc, and sets the gas temperature Tz1 (the initial value thereof) within the zone 1 to a value equal to the above-mentioned IVC-time cylinder interior gas temperature Tgivc. In step 1755 subsequent thereto, the CPU 61 sets the fuel mass faction FRACmas (i) of the gas volume (i) to the value "i/Nd" (i=1, 2, . . . , Nd−1, Nd).

Figure 18:
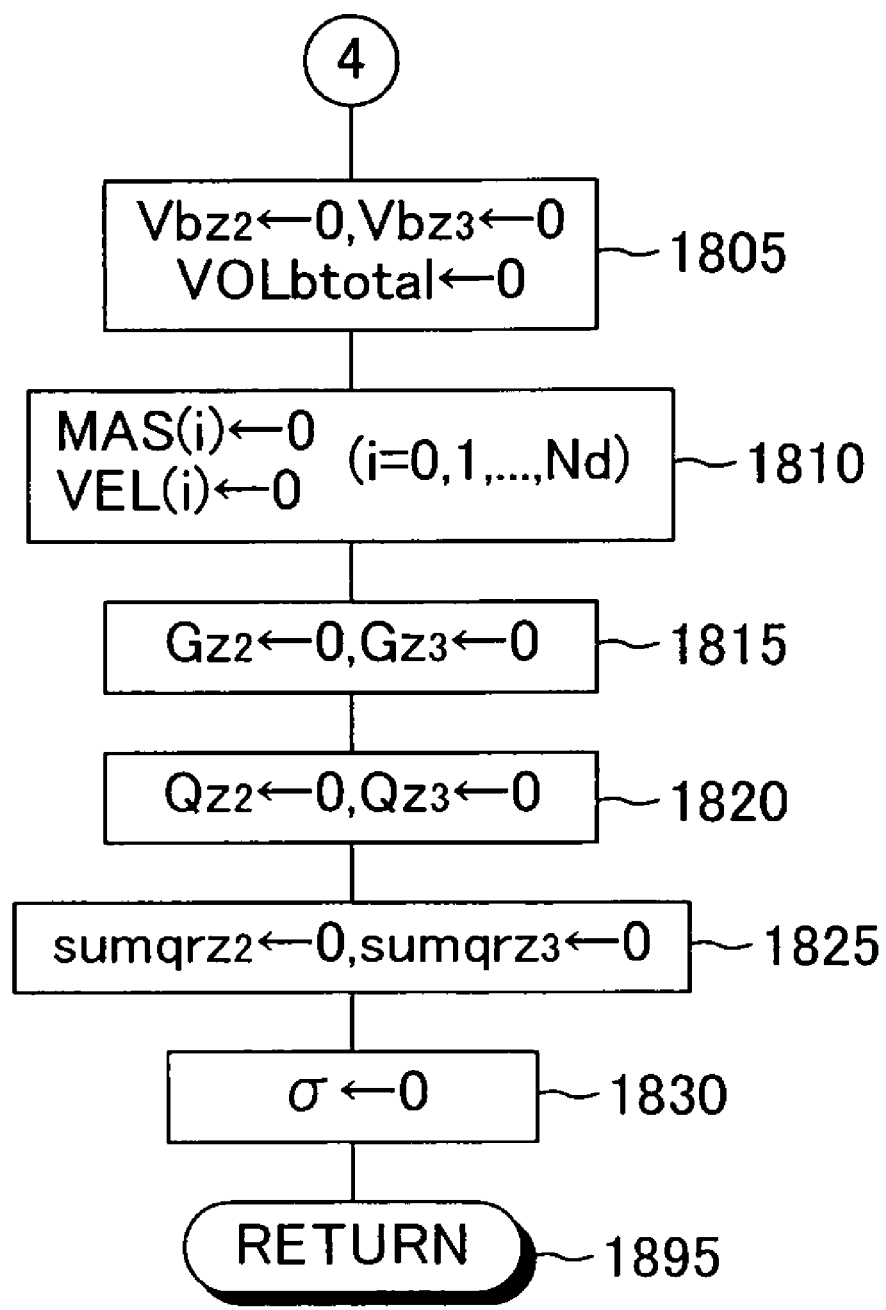
FIG. 18 is a flowchart showing a second half of the sub routine for setting initial values, which is executed by the CPU shown in FIG. 1.

Next, the CPU 61 proceeds to step 1805 of FIG. 18, and sets the previous value Vbz2 (the initial value thereof) of the volume of the zone 2, the previous value Vbz3 (the initial value thereof) of the volume of the zone 3, and the previous value VOLbtotal (the initial value thereof) of the spray volume to zero. In step 1810 subsequent thereto, the CPU 61 sets the mass MAS(i) (the initial value thereof) of the gas volume (i) and the velocity VEL(i) (the initial value thereof) of the gas volume (i) to zero (i=1, 2, ..., Nd−1, Nd).

Next, the CPU 61 proceeds to step 1815, and sets the zone 2 cylinder interior gas mass Gz2 (the initial value thereof) and the zone 3 cylinder interior gas mass Gz3 (the initial value thereof) to zero. In step 1820 subsequent thereto, the CPU 61 sets the quantity of fuel already injected into the zone 2 (the zone 2 injected fuel quantity Qz2) (the initial value thereof) and the quantity of fuel already injected into the zone 3 (the zone 3 injected fuel quantity Qz3) (the initial value thereof) to zero.

Next, the CPU 61 proceeds to step 1825, and sets the consumed fuel quantity sumqrz2 within the zone 2 (the initial value thereof) and the consumed fuel quantity sumqr3 within the zone 3 (the initial value thereof) to zero. In step 1830 subsequent thereto, the CPU 61 sets the standard deviation $\sigma$ (the initial value thereof) to zero. After that, the CPU 61 returns to step 1510 of FIG. 15 via step 1895. Through the above-described procedure, setting of the initial values of variables and the like used in calculations is completed.

When the CPU 61 proceeds to step 1510, it sets a crank angle CA on calculation (hereinafter may be simply referred to as the "crank angle CA" to the above-described IVC-time crank angle CAinj, and sets the value of the variable j (natural number) to "1." The value of the variable j represents the number of times the crank angle CA on calculation increases by the minute angle $\Delta$CA from the fuel injection timing CAinj (CA=CAinj+j·$\Delta$CA).

Next, the CPU 61 proceeds to step 1515, and sets the values of a flag XIG and a flag XZ3 to "0." The flag XIG represents "after ignition" when its value is "1" and "before ignition" when its value is "0." The flag XZ3 represents a state in which the zone 3 is generated after the ignition (that is, the case of post-ignition continued injection) when its value is "1" and a state in which the zone 3 is not generated after the ignition (that is, not the case of post-ignition continued injection) when its value is "0."

Figure 19:
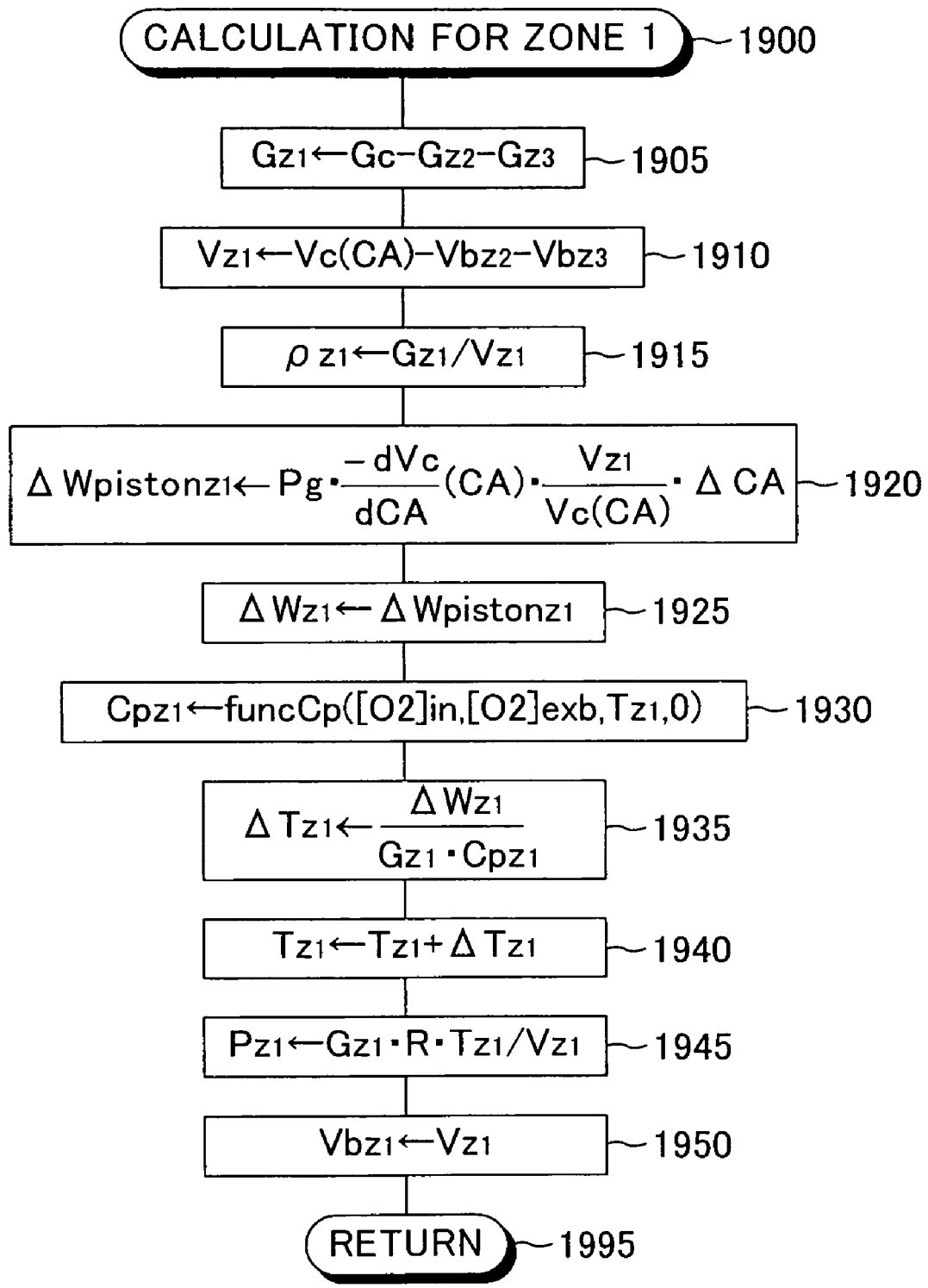
FIG. 19 is a flowchart showing a sub routine for performing calculations associated with the zone 1, which is executed by the CPU shown in FIG. 1.

Subsequently, the CPU 61 proceeds to step 1520, in which the CPU 61 starts the processing of a routine (sub routine) shown in FIG. 19 in the form of a flowchart from step 1900 so as to perform "calculation for the zone 1."

When the CPU 61 proceeds from step 1900 to step 1905, it obtains the gas mass Gz1 within the zone 1 on the basis of the total mass Gc of the cylinder interior gas obtained in the above-mentioned step 1710; the zone 2 cylinder interior gas masse Gz2 and the zone 3 cylinder interior gas masse Gz3 (at the present point in time, these values are zero because of the processing of the above-described step 1815); and the above-described Equation (29). Accordingly, at the present point in time, the gas mass Gz1 within the zone 1 is set to a value equal to the total mass Gc of the cylinder interior gas.

Next, the CPU 61 proceeds to step 1910, and obtains the volume Vz1 of the zone 1 on the basis of the previous value Vbz2 of the volume of the zone 2 and the previous value Vbz3 of the volume of the zone 3 (at the present point in time, these values are zero because of the processing of the above-described step 1805); and an equation corresponding to the above-described Equation (30). Accordingly, at the present point in time, the volume Vz1 of the zone 1 is set to a value equal to the cylinder interior volume Vc(CA).

Subsequently, the CPU 61 proceeds to step 1915, and obtains the gas density $\rho$z1 within the zone 1 by dividing the gas mass Gz1 within the zone 1 by the volume Vz1 of the zone 1. Next, the CPU 61 proceeds to step 1920, and obtains the micro piston work $\Delta$Wpistonz1 for the zone 1 on the basis of the combustion chamber internal pressure Pg (at the present point in time, the above-described IVC-time cylinder interior gas pressure Pgivc because of the processing of the above-described step 1750), the above-described volume Vz1 of the zone 1, and an equation corresponding to the above-described Equation (11).

Next, the CPU 61 proceeds to step 1925, and sets the minute energy $\Delta$Wz1 for the zone 1 to a value equal to the micro piston work $\Delta$Wpistonz1 for the zone 1. The CPU 61 then proceeds to step 1930, and obtains the constant-pressure specific heat C$\rho$z1 of the gas within the zone 1 on the basis of the intake-gas oxygen concentration [O2]in set in the above-described step 1705, the exhaust-gas oxygen concentration [O2]exb at a predetermined time during the previous exhaust stroke obtained from the exhaust-gas oxygen concentration sensor 77, the gas temperature Tz1 within the zone 1, and the above-described Equation (7). Only in the present time (first time), a value equal to IVC-time cylinder interior gas temperature Tgivc is used as the gas temperature Tz1 because of the processing of the above-described step 1750. However, from the next time, the value updated in step 1940 (which will be described later) during immediately previous execution of the present routine.

Subsequently, the CPU 61 proceeds to step 1935, and obtains an increase amount $\Delta$Tz1 of the gas temperature within the zone 1 on the basis of the minute energy $\Delta$Wz1 obtained in the previously-described step 1925, the gas mass Gz1 within the zone 1 obtained in the previously-described step 1905, and the above-described constant-pressure specific heat Cpz1 of the gas within the zone 1. The increase amount $\Delta$Tz1 of the gas temperature within the zone 1 corresponds to the second term of the right side of the above-described Equation (4). The CPU 61 then proceeds to step 1940 so as to update the gas temperature Tz1 within the gas zone 1 by adding the increase amount $\Delta$Tz1 to the value at the present point in time.

Next, the CPU 61 proceeds to step 1945, and obtains the gas pressure Pz1 within the zone 1 on the basis of the above-described gas mass Gz1 within the zone 1, the above-described updated gas temperature Tz1 within the zone 1, the volume Vz1 of the zone 1 obtained in the previously-described step 1910, and the state equation of the gas within the zone 1 (see an equation in the block of step 1945).

The CPU 61 then proceeds to step 1950 so as to set the previous value Vbz1 of the volume of the zone 1 to the above-described volume Vz1 of the zone 1, and returns to step 1525 of FIG. 15 via step 1995. Through the above-described procedure, various physical quantities of the gas within the zone 1 at the crank angle CA (at the present point time, equal to the IVC-time crank angle CAivc because of the processing of the previously-described step 1510) are calculated and updated.

In step 1525, the CPU 61 determines whether or not the crank angle CA is equal to or after the fuel injection timing CAinj set in the previously-described step 1720. Since the crank angle CA is equal to IVC-time crank angle CAivc at the present point in time, the crank angle CA is before the fuel injection timing CAinj. Therefore, the CPU 61 makes a "No" determination in step 1525, and proceeds to step 1530 so as to set the combustion chamber internal pressure Pg to a value equal to the gas pressure Pz1 within the zone 1 obtained in the previously-described step 1945.

Next, the CPU 61 proceeds to step 1620 of FIG. 16, and updates the crank angle CA by adding the minute crank angle $\Delta$CA to the value at the present point in time (=CAinv). Subsequently, the CPU 61 proceeds to step 1625, and determines whether or not the crank angle CA updated in step 1620 is after a calculation end crank angle CAend (e.g., near the expansion bottom dead center).

Since the crank angle CA is equal to the IVC-time crank angle CAivc at the present point in time, the crank angle CA is before the calculation end crank angle CAend. Therefore, the CPU 61 makes a "No" determination in step 1625, and returns to step 1520 of FIG. 15 so as to execute the routine of FIG. 19 again. Thus, the various physical quantities of the gas within the zone 1 at the crank angle CA (=CAivc+ΔCA) are calculated and updated.

Such processing (the processing in steps 1520, 1525, 1530, 1620, and 1625) is repeatedly executed unless the crank angle CA updated in step 1620 reaches the fuel injection timing CAinj. As a result, through repeated execution of the routine of FIG. 19, the physical quantities of the gas within the zone 1 are calculated and updated in response to update of the crank angle CA.

Subsequently, there will be described a case where the crank angle CA updated in step 1620 has reached the fuel injection timing CAinj. In this case, the CPU 61 starts to operate in such a manner that it makes a "Yes" determination when it proceeds to step 1525, and proceeds to step 1535, in which the CPU 61 starts the processing of a series of routines (sub routine) shown in FIGS. 20 to 22 in the form of flowcharts from step 2000 so as to perform "calculation for the zone 2."

When the CPU 61 proceeds from step 2000 to step 2005, it determines whether or not the value of the variable j is "1." At the present point in time, the variable j is 1 because of the processing of the previously described step 1510. Accordingly, the CPU 61 makes a "Yes" determination in step 2005, and proceeds to step 2010 so as to set the gas temperature Tz2 (the initial value thereof) within the zone 2 to a value equal to the gas temperature Tz1 within the zone 1 updated in the previously-described step 1940 (that is, the gas temperature within the zone 1 at the start of fuel injection).

Subsequently, the CPU 61 proceeds to step 2015 so as to set the gas density ρ0z1 within the zone 1 at the start of fuel injection (that is, the density of the cylinder interior gas at the start of fuel injection) to a value equal to the gas density ρz1 within the zone 1 updated in the previously-described step 1915.

The CPU 61 then proceeds to step 2020, and obtains the effective injection pressure ΔP0 by subtracting the combustion chamber internal pressure Pg (at the present point in time, equal to the gas pressure Pz1 within the zone 1 because of the process of the previously-described step 1530) from the base fuel injection pressure Pcrbase obtained in the previously-described step 1725).

Next, the CPU 61 proceeds to step 2025, and obtains the spray angle θ on the basis of the above-described effective injection pressure ΔP0, the above-described gas density ρ0z1 within the zone 1, and the above-described table Mapθ. Subsequently, the CPU 61 proceeds to step 2030 so as to set the post injection time tz2 to the minute time Δt, and then proceeds to step 2035 so as to obtain the value (k/ε) on the basis of the above-described effective injection pressure ΔP0, the density ρf of liquid fuel, and the above-described function funck/ε. As described above, various values necessary for starting calculation for zone 2 are calculated in steps 2010 to 2035.

Next, the CPU 61 proceeds to step 2040, and obtains the reach distance Sz2 on the basis of the above-described effective injection pressure ΔP0, the post injection time tz2 (at the present point in time, the minute time Δt), and a function func corresponding to the above-described Equation (12). In step 2045 subsequent thereto, the CPU 61 obtains the spray volume VOLtotal on the basis of the above-described, obtained spray angle θ, the reach distance Sz2, and an equation corresponding to the above-described Equation (13).

Next, the CPU 61 proceeds to step 2050, and determines whether or not the value of the flag XZ3 is "0." At the present point in time, the flag XZ3=0 (that is, a state in which the zone 3 is not generated) because of the process of the previously-described step 1515. Accordingly, the CPU 61 makes a "Yes" determination in step 2050, and proceeds to step 2055 so as to set the volume Vz2 of the zone 2 to a value equal to the above-described spray volume VOLtotal.

Subsequently, the CPU 61 proceeds to step 2060, and obtains an increase amount ΔVz2 of the volume of the zone 2 during the minute time Δt by subtracting the previous value Vbz2 of the volume of the zone 2 from the volume Vz2 of the zone 2. Only in the present time (first time), "0" is used as Vbz2 because of the processing of the above-described step 1805. However, from the next time, the value updated in step 2240 (which will be described later) during immediately previous execution of the present routine is used.

Next, the CPU 61 proceeds to step 2065, and obtains an increase amount ΔGz2 of the zone 2 cylinder interior gas mass during the minute time Δt by multiplying the gas density ρz1 within the zone 1 updated in the previously-described step 1915 by the above-described increase amount ΔVz2 of the volume of the zone 2. Subsequently, the CPU 61 proceeds to step 2070, and updates the zone 2 cylinder interior gas mass Gz2 by adding the above-described increase amount ΔGz2 to the value at the present point in time (this time (first time), "0" because of the processing of the previously-described step 1815).

Subsequently, the CPU 61 proceeds to step 2105 of FIG. 21, and determines whether or not the value of the flag XZ3 is "0." As described above, the flag XZ3 is "0" at the present point in time. Therefore, the CPU 61 makes a "Yes" determination, and proceeds to step 2110 so as to determine whether or not the value of the variable j is equal to or less than the division number qdiv. The relation "j≦qdiv" corresponds to the state in which fuel injection continues, and the relation "j>qdiv" corresponds to the state after completion of the fuel injection.

At the present point in time, the variable j=1, and the relation "j≦qdiv" stands (fuel injection continues). Therefore, the CPU 61 makes a "Yes" determination step 2110, and proceeds to step 2115 so as to update the zone 2 injected fuel quantity Qz2 by adding the fuel quantity q(j) during the minute time Δt obtained in the previously-described step 1740 (at the present point in time, q(1)) to the value at the present point in time (this time (first time), "0" because of the processing of the previously-described step 1820).

Next, the CPU 61 proceeds to step 2120, and obtains the latent heat Qlatentz2 on the basis of the above-described fuel quantity q(j) and a function funcQlatent for obtaining the latent heat by using q(j) as an argument. In step 2125 subsequent thereto, the CPU 61 obtains the gas mass Mz2 within the zone 2 by adding the zone 2 injected fuel quantity Qz2 obtained in the previously-described step 2115 to the zone 2 cylinder interior gas mass Gz2 obtained in the previously-described step 2070.

Subsequently, the CPU 61 proceeds to step 2130, and obtains the fuel concentration [Fuel]z2 within the zone 2 on the basis of the above-described zone 2 injected fuel quantity Qz2, the zone 2 consumed fuel quantity sumqrz2, the above-described gas mass Mz2 within the zone 2, and the above-described Equation (25). Only in the present time (first time), "0" is used as sumqrz2 because of the processing of the above-described step 1825. However, from the next time, the value updated in step 2235 (which will be described later) during immediately previous execution of the present routine is used.

The CPU 61 then proceeds to step 2135, and obtains the oxygen concentration [O2]z2 within the zone 2 on the basis of the above-described zone 2 cylinder interior gas mass Gz2, the intake-gas oxygen concentration [O2]in set in the previously-described step 1705, the above-described consumed fuel quantity sumqrz2, the above-described gas mass Mz2 within the zone 2, and the above-described Equation (27). For sumqrz2, the same value as that used in step 2130 is used.

Next, the CPU 61 proceeds to step 2140, and determines whether or not the value of the flag XIG is "0" (accordingly, whether or not the present point in time is "before ignition"). At the present point in time, the value of the flag XIG is "0" because of the processing of the previously-described step 1515. Accordingly, the CPU 61 makes a "Yes" determination in step 2140, and proceeds to step 2145 so as to obtain the combustion speed qrz2 (g/sec) within the zone 2 (the speed of premixed combustion based on low-temperature oxidation reaction) on the basis of the above-described oxygen concentration [O2]z2 within the zone 2, the above-described fuel concentration [Fuel]z2 within the zone 2, the gas temperature Tz2 within the zone 2, and a function funcshell corresponding to the above-described Shell model. Only in the present time (first time), "Tz1" is used as Tz2 because of the processing of the above-described step 2010. However, from the next time, the value updated in step 2245 (which will be described later) during immediately previous execution of the present routine is used.

Subsequently, the CPU 61 proceeds to step 2150, and obtains the heat generation rate Hrz2($j$) of the zone 2 on the basis of the above-described, obtained combustion speed qrz2 and an equation corresponding to the above-described Equation (24). The heat generation rate Hrz2($j$) is a value at the crank angle CA (=CAinj+j·ΔCA).

Figure 22:
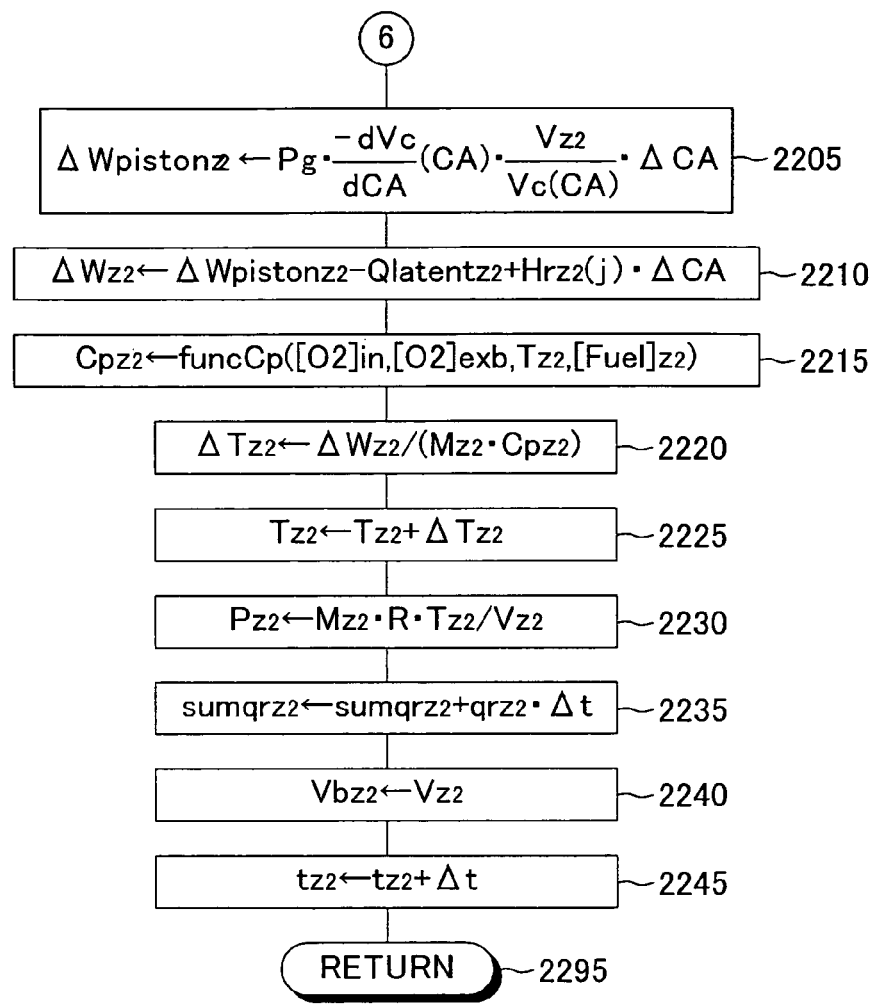
FIG. 22 is a flowchart showing a third portion of the sub routine for performing calculations associated with the zone 2, which is executed by the CPU shown in FIG. 1.

Next, the CPU 61 proceeds to step 2205 of FIG. 22, and obtains the minute piston work ΔWpistonz2 for the zone 2 on the basis of the combustion chamber internal pressure Pg, the above-described volume Vz2 of the zone 2, and an equation corresponding to the above-described Equation (19).

Next, the CPU 61 proceeds to step 2210, and obtains the minute energy ΔWz2 for the zone 2 on the basis of the above-described minute piston work ΔWpistonz2 for the zone 2, the latent heat Qlatentz2 obtained in the previously-described step 2120, the heat generation rate Hrz2($j$) obtained in the previously-described step 2150, and an equation corresponding to the above-described Equation (18).

Next, the CPU 61 proceeds to step 2215, and obtains the constant-pressure specific heat Cpz2 of the gas within the zone 2 on the basis of the above-described intake-gas oxygen concentration [O2]in, the above-described exhaust-gas oxygen concentration [O2]exb, the gas temperature Tz2 within the zone 2, and the fuel concentration [Fuel]z2 within the zone 2 obtained in the previously-described step 2130, and the above-described Equation (17). For Tz2, the same value as that used in the previously-described step 2145 is used.

Subsequently, the CPU 61 proceeds to step 2220, and obtains an increase amount ΔTz2 of the gas temperature within the zone 2 on the basis of the minute energy ΔWz2 obtained in the previously-described step 2210, the gas mass Mz2 within the zone 2 obtained in the previously-described step 2125, and the above-described constant-pressure specific heat Cpz2 of the gas within the zone 2. This increase amount ΔTz2 of the gas temperature within the zone 2 corresponds to the second term of the right side of the above-described Equation (16). The CPU 61 then proceeds to step 2225 so as to update the gas temperature Tz2 within the zone 2 by adding the above-described increase amount ΔTz2 to the value at the present point in time.

Next, the CPU 61 proceeds to step 2230, and obtains the gas pressure Pz2 within the zone 2 on the basis of the above-described gas mass Mz2 within the zone 2, the above-described, updated gas temperature Tz2 within the zone 2, the volume Vz2 of the zone 2 obtained in the previously-described step 2055, and the state equation of the gas within the zone 2 (see an equation in the block of step 2230). In principle, the gas pressure Pz2 within the zone 2 is calculated to have a value different from the gas pressure Pz1 within the zone 1 updated in the previously-described step 1945.

The CPU 61 then proceeds to step 2235 so as to update the consumed fuel quantity sumqrz2 within the zone 2 by adding a value "qrz2·Δt" to the value at the present point in time. For qrz2, the same value as that used in the previously-described step 2145 (or step 2190 to be described later) is used. The calculation in this step corresponds to the calculation of the above-described Equation (26).

The CPU 61 then proceeds to step 2240 so as to set the previous value Vbz2 of the volume of the zone 2 to the above-described volume Vz2 of the zone 2. In step 2245 subsequent thereto, the CPU 61 updates the post injection time tz2 by adding the minute time Δt to the value at the present point in time (=Δt). After that, the CPU 61 returns to step 1540 of FIG. 15 via step 2295.

Through the above-described procedure, after the point in time when the crank angle CA has reached the fuel injection timing CAinj, the various physical quantities of the gas within the zone 2 at the crank angle CA (=CAinj+j·ΔCA) are calculated and updated. In this stage, the combustion speed qrz2 (g/sec) within the zone 2 (the speed of premix combustion based on low-temperature oxidation reaction) (accordingly, the heat generation rate Hrz2($j$)) is calculated.

When the CPU 61 proceeds to 1540, it determines whether or not the value of the flag XZ3 is "1." As described above, at the present point in time, the value of the flag XZ3 is "0" because of the processing of the previously-described step 1515. Therefore, the CPU 61 makes a "No" determination in 1540, and proceeds to step 1545. In step 1545, the CPU 61 sets the heat generation rate Hr(j) for the crank angle CA (=CAinj+j·ΔCA) to a value equal to the heat generation rate Hrz2($j$) of the zone 2 obtained in the above-described step 2150, and stores the value of the heat generation rate Hr(j) in the backup RAM 64, while relating it to the value of the variable j.

Subsequently, the CPU 61 proceeds to 1550 adjusts and sets the combustion chamber internal pressure Pg, the volume Vz1 of the zone 1 (accordingly, its previous value Vbz1), and the volume Vz2 of the zone 2 (accordingly, its previous value Vbz2) such that the relation "Pz1=Pz2=Pg" holds, on the basis of the gas pressure Pz1 within the zone 1 updated in the previously-described step 1945 and the gas pressure Pz2 within the zone 2 updated in the previously-described step 2230. This processing is based on the premise that the combustion chamber internal pressure is uniform within the combustion chamber.

Next, the CPU 61 proceeds to step 1555, in which the CPU 61 starts the processing of a series of routines (sub routine) shown in FIGS. 26 to 29 in the form of flowcharts from step 2600 so as to perform "calculation of nonuniformity (σ)."

When the CPU 61 proceeds from step 2600 to step 2605, it obtains an increase amount ΔVm of the spray volume by subtracting the previous value VOLbtotal of the spray volume from the spray volume VOLtotal updated in the previously-described step 2045. Only in the present time (first time), "0"

is used as VOLbtotal because of the processing of the above-described step 1805. However, from the next time, the value updated in step 2950 (which will be described later) during immediately previous execution of the present routine is used.

Next, the CPU 61 proceeds to step 2610, and obtains the mass ΔGm of the cylinder interior gas taken into the gas mixture during the minute time Δt (that is, the above-described new cylinder interior gas) by multiplying the gas density ρz1 within the zone 1 updated in the previously-described step 1915 by the above-described increase amount ΔVm of the spray volume.

Subsequently, the CPU 61 proceeds to step 2615, and, as in the case of the previously-described step 2110, determines whether or not the value of the variable j is equal to or less than the above-described division number qdiv (that is, whether or not fuel injection continues). As described above, the variable j=1, and the relation "j≦qdiv" stands at the present point in time. Therefore, the CPU 61 makes a "Yes" determination step 2615, and proceeds to step 2620 so as to obtain the effective injection pressure ΔPm by subtracting the combustion chamber internal pressure Pg from the fuel injection pressure Pcr(j) set in the previously-described step 1735.

The CPU 61 then proceeds to step 2625, and obtains the velocity VELinj of fuel injected during the minute time Δt (that is, the above-described new fuel) on the basis of the above-described effective injection pressure ΔPm, the density ρf of liquid fuel, and the above-described function funcVELinj.

Next, the CPU 61 proceeds to step 2630, and updates the velocity VEL(0) of a gas volume (0) (that is, a volume of cylinder interior gas) on the basis of the mass MAS(0) and velocity VEL(0) of the gas volume (0) (that is, the volume of the cylinder interior gas), the mass ΔGm of the above-described new cylinder interior gas, the velocity VELgas of the new cylinder interior gas ("0" in the present example), and an equation corresponding to the above-described Equation (41). Only in the present time (first time), "0" is used as MAS(0) because of the processing of the above-described step 1810. However, from the next time, the value updated in step 2765 or step 2855 (which will be described later) during immediately previous execution of the present routine is used. Only in the present time (first time), "0" is used as VEL(0) because of the processing of the above-described step 1810. However, from the next time, the value updated in step 2630 or step 2845 (which will be described later) during immediately previous execution of the present routine is used.

Subsequently, the CPU 61 proceeds to step 2635, and updates the velocity VEL(Nd) of a gas volume (Nd) (that is, the volume of fuel vapor) on the basis of the mass MAS(Nd) and velocity VEL(Nd) of the gas volume (Nd) (that is, the volume of the fuel vapor), the fuel quantity q(j) set in the previously-described step 1740, the velocity VELinj of the new fuel obtained in the previously-described step 2625, and an equation corresponding to the above-described Equation (42). Only in the present time (first time), "0" is used as MAS(Nd) because of the processing of the above-described step 1810. However, from the next time, the value updated in step 2765 or step 2855 (which will be described later) during immediately previous execution of the present routine is used.

Further, only in the present time (first time), "0" is used as VEL(Nd) because of the processing of the above-described step 1810. However, from the next time, the value updated in step 2635 or step 2850 (which will be described later) during immediately previous execution of the present routine is used.

Next, the CPU 61 proceeds to step 2640, and updates the mass MAS(0) of the volume of the cylinder interior gas in accordance with the above-described Equation (36); i.e., by adding the above-described mass ΔGm of the new cylinder interior gas to the value at the present point in time. In step 2645 subsequent thereto, the CPU 61 updates the mass MAS (Nd) of the volume of the fuel vapor in accordance with the above-described Equation (37); i.e., by adding the above-described fuel quantity q(j) to the value at the present point in time.

Subsequently, the CPU 61 proceeds to step 2650 so as to obtain the total sum of the masses MAS(i) of gas volumes (i) (i=0, 1, . . . , Nd−1, Nd) within the gas mixture (the total gas volume mass MAStotal), and then proceeds to step 2655 so as to obtain the average density ROave of the gas mixture in accordance with the above-described Equation (33); i.e., by dividing the above-described total gas volume mass MAStotal by the above-described spray volume VOLtotal.

The CPU 61 then proceeds to step 2660, and obtains the volumes VOL(i) of the gas volumes (i) (i=0, 1, . . . , Nd−1, Nd) by dividing the masses MAS(i) of the gas volumes (i) by the average density ROave of the gas mixture. In step 2665 subsequent thereto, the CPU 61 obtains the diameters DIA(i) of the gas volumes (i) (i=0, 1, . . . , Nd−1, Nd) from the above-described volumes VOL(i) and an equation described in the block of step 2665.

Next, the CPU 61 proceeds to step 2705 of FIG. 27, and sets a section number m1 to "0" and a section number m2 to "m1+1." Subsequently, the CPU 61 proceeds to step 2710 so as to determine whether or not both the volume VOL(m1) of a gas volume (m1) and the volume VOL(m2) of a gas volume (m2) are not zero. When the CPU 61 makes a "No" determination, the CPU 61 proceeds directly to step 2905 of FIG. 29, which will be described later. In the case where the volume (according, the mass) of at least one of the gas volumes (m1) and (m2) is zero, collision reaction does not occur (cannot be considered). Accordingly, in such a case, unnecessary calculations associated with the collision reaction can be omitted.

Here, the description will be continued under the assumption that neither the volume VOL(m1) of the gas volume (m1) nor the volume VOL(m2) of the gas volume (m2) is zero. In this case, the CPU 61 makes a "Yes" determination in step 2710, and proceeds to step 2715 so as to determine whether or not the volume VOL(m1) is greater than the volume VOL (m2). In the case where the CPU 61 makes a "Yes" determination, it proceeds to step 2720, and sets a section number mb to the value m1 and a section number ms to the value m2. Meanwhile, in the case where the CPU 61 makes a "No" determination in step 2715, it proceeds to step 2725, and sets the section number mb to the value m2 and the section number ms to the value m1. As a result, the two gas volumes to be collided are set such that they are treated as a gas volume (mb) and a gas volume (ms), which are a "large gas volume" and a "small gas volume," respectively.

Next, the CPU 61 proceeds to step 2730, and obtains the passage volume VOLswp on the basis of the diameter DIA (ms) of the small gas volume (ms), the velocities VEL(ms) and VEL(mb) of the gas volumes (ms) and (mb), and an equation corresponding to the above-described Equation (38).

Subsequently, the CPU 61 proceeds to step 2735, and obtains a coefficient α on the basis of the engine speed NE and a function funcα which uses NE as an argument. Thus, the coefficient α is set such that the higher the engine speed NE, the smaller the coefficient α.

Next, the CPU 61 proceeds to step 2740, and obtains a provisional mixing volume VOLmix1 on the basis of the above-described coefficient α, the above-described passage volume VOLswp, the volume VOL(mb) of the large gas volume (mb), the above-described spray volume VOLtotal, and an equation corresponding to the above-described Equation (39). In step 2745 subsequent thereto, the CPU 61 sets the mixing volume VOLmix to a smaller one of the provisional mixing volume VOLmix1 and the volume VOL(ms) of the small gas volume (ms). This setting prevents occurrence of a case where the volumes VOL(ms) and VOL(mb) of the gas volumes (ms) and (mb) become negative (that is, the volumes of the to-be-collided gas volumes become negative after the collision reaction) in the next step 2750.

Subsequently, the CPU 61 proceeds to step 2750 so as to obtain the volume VOL(ms) of the small gas volume (ms) after the collision reaction by subtracting the above-described mixing volume VOLmix from the volume VOL(ms) of the small gas volume (ms) at the present point in time, and obtain the volume VOL(mb) of the large gas volume (mb) after the collision reaction by subtracting the above-described mixing volume VOLmix from the volume VOL(mb) of the large gas volume (mb) at the present point in time.

Next, the CPU 61 proceeds to step 2755, and obtains the diameters DIA(mb) and DIA(ms) of the gas volumes (mb) and (ms), respectively, from the volumes VOL(mb) and VOL(ms) after the collision reaction and equations described in the block of step 2755.

The CPU 61 then proceeds to step 2760, and obtains the mass dMASmb of a separated portion of the large gas volume (mb) and the mass dMASms of a separated portion of the small gas volume (ms), respectively, by multiplying the above-described mixing volume VOLmix by the average density ROave of the gas mixture obtained in the previously-described step 2655.

Subsequently, the CPU 61 proceeds to step 2765 so as to obtain the mass MAS(ms) of the small gas volume (ms) after the collision reaction and the mass MAS(mb) of the large gas volume (mb) after the collision reaction in accordance with the first and second equations of the above described Equation (35); i.e., by subtracting the mass dMASms of the separated portion of the small gas volume (ms) from the mass MAS(ms) of the small gas volume (ms) at the present point in time, and by subtracting the mass dMASmb of the separated portion of the large gas volume (mb) from the mass MAS(mb) of the large gas volume (mb) at the present point in time, respectively.

Figure 28:
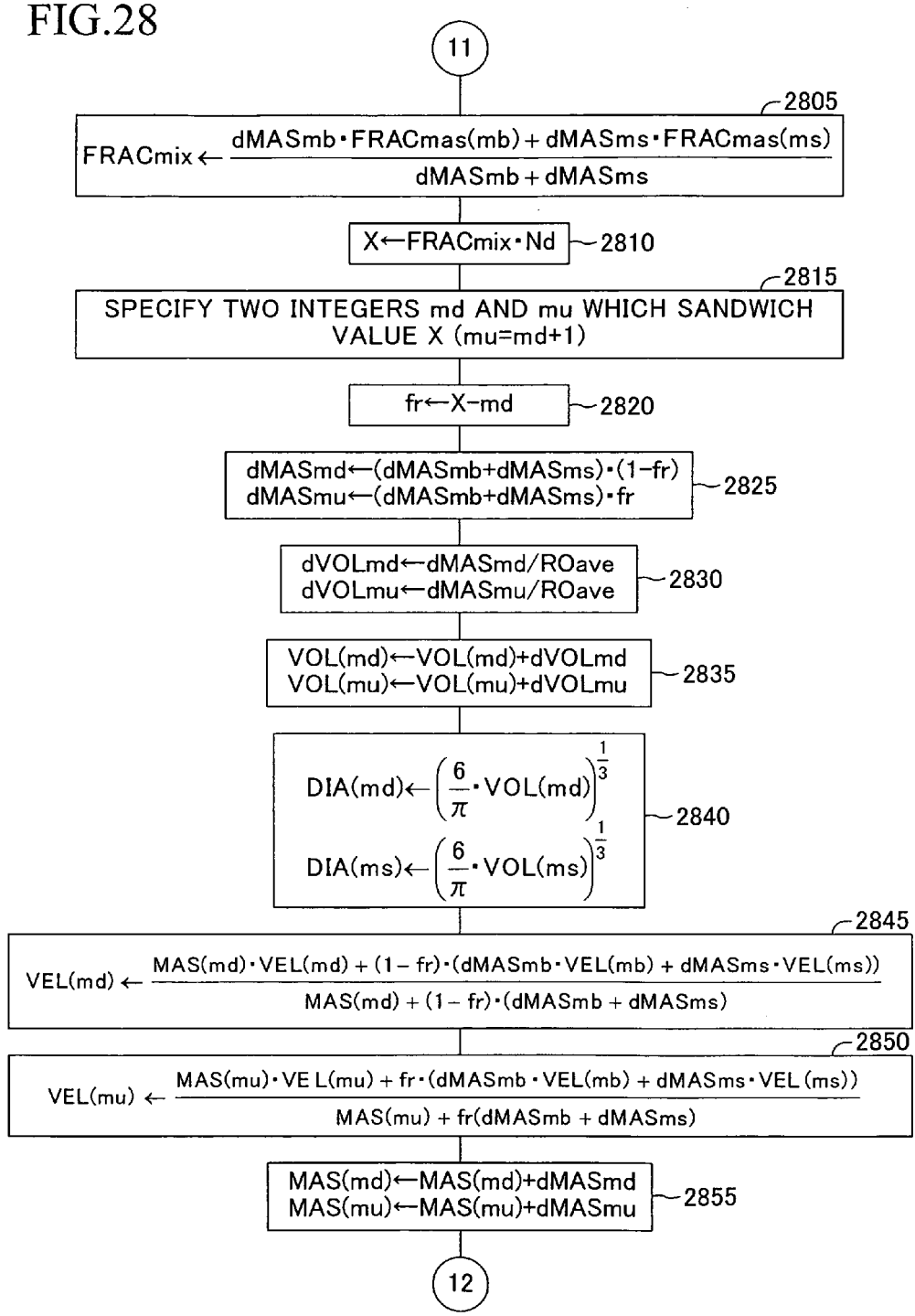
FIG. 28 is a flowchart showing a third portion of the sub routine for calculating the nonuniformity, which is executed by the CPU shown in FIG. 1.

The CPU 61 then proceeds to step 2805 of FIG. 28, and obtains the fuel mass fraction FRACmix of a mix-formed gas volume on the basis of the masses dMASmb and dMASms of the respective separated portions of the large and small gas volumes (mb) and (ms) obtained in the previously-described step 2760, the respective fuel mass fractions FRACmas(mb) and FRACmas(ms) of the large and small gas volumes (mb) and (ms) set in the previously-described step 1755, and an equation corresponding to the above-described Equation (34).

Next, the CPU 61 proceeds to step 2810, and sets the value X to a value obtained by multiplying the obtained fuel mass fraction FRACmix of the mix-formed gas volume by the value Nd. In step 2815 subsequent thereto, the CPU 61 specifies two integers md and mu (=md+1) between which the value X is located. Thus, the mix-formed gas volume produced as a result of the "collision reaction between the gas volume (m1) and the gas volume (m2) is handled such that the mix-formed gas volume is composed of a gas volume (md) and a gas volume (mu).

Subsequently, the CPU 61 proceeds to step 2820, and sets a value fr to a value obtained by subtracting a value md from the value X. This value fr is used when the ratio of distribution of the above-described separated portions between the gas volume (md) and the gas volume (mu) is determined. That is, the CPU 61 proceeds to 2825 so as to obtain an increase amount dMASmd of the gas volume (md) and an increase amount dMASmu of the gas volume (mu) in accordance with equations described in the block of step 2825. Thus, a portion of the separated portions (the sum of the masses (dMASmb+dMASms)) corresponding to a ratio (1−fr) is distributed to the gas volume (md), and the remaining portion corresponding to the ratio fr is distributed to the gas volume (mu).

Next, the CPU 61 proceeds to step 2830, and obtains an increase amount dVOLmd of the volume of the gas volume (md) and an increase amount dVOLmu of the volume of the gas volume (mu) by dividing the increase amounts dMASmd of the mass of the gas volume (md) and the increase amounts dMASmu of the mass of the gas volume (mu) by the average density ROave of the gas mixture, respectively.

Subsequently, the CPU 61 proceeds to step 2835 so as to obtain the volume VOL(md) of the gas volume (md) after the collision reaction by adding the increase amount dVOLmd of the volume of the gas volume (md) to the value at the present point in time, and obtain the volume VOL(mu) of the gas volume (mu) after the collision reaction by adding the increase amount dVOLmu of the volume of the gas volume (mu) to the value at the present point in time.

Next, the CPU 61 proceeds to step 2840, and obtains the diameters DIA(md) and DIA(mu) of the gas volumes (md) and (mu), respectively, from the volumes VOL(md) and VOL(mu) after the collision reaction and equations described in the block of step 2840.

The CPU 61 then proceeds to step 2845 so as to update the velocity VEL(md) of the gas volume (md) in accordance with an equation described in the block of step 2845 and corresponding to the above-described Equation (40). This equation can be obtained by making use of the law of conservation of momentum that the "sum of the momentum of the mix-formed gas volume (md) before the collision reaction and the respective momentums of respective portions of the separated portions of the to-be-collided gas volumes (mb) and (ms) before the collision reaction, the respective portions being to be distributed to the mix-formed gas volume (md), is equal to the momentum of the mix-formed gas volume (md) after the collision reaction."

Similarly, the CPU 61 proceeds to step 2850 so as to update the velocity VEL(mu) of the gas volume (mu) in accordance with an equation described in the block of step 2850 and corresponding to the above-described Equation (40). This equation can be obtained by making use of the law of conservation of momentum that the "sum of the momentum of the mix-formed gas volume (mu) before the collision reaction and the respective momentums of respective portions of the separated portions of the to-be-collided gas volumes (mb) and (ms) before the collision reaction, the respective portions being to be distributed to the mix-formed gas volume (mu), is equal to the momentum of the mix-formed gas volume (mu) after the collision reaction."

The CPU 61 then proceeds to step 2855, and obtains the mass MAS(md) of the gas volume (md) after the collision reaction and the mass MAS(mu) of the gas volume (mu) after the collision reaction in accordance with the third equation of the above described Equation (35); i.e., by adding the increase amount dMASmd of the mass of the gas volume (md) obtained in the above-described step 2825 to the mass MAS(md) of the gas volume (md) at the present point in time, and by adding the increase amount dMASmu of the mass of the gas volume (mu) obtained in the above-described step 2825 to the mass MAS(mu) of the gas volume (mu) at the present point in time. Through the above-described procedure, calculation of various physical quantities which change in accordance with the "collision reaction between the gas volumes (m1) and (m2)" is completed.

Figure 29:
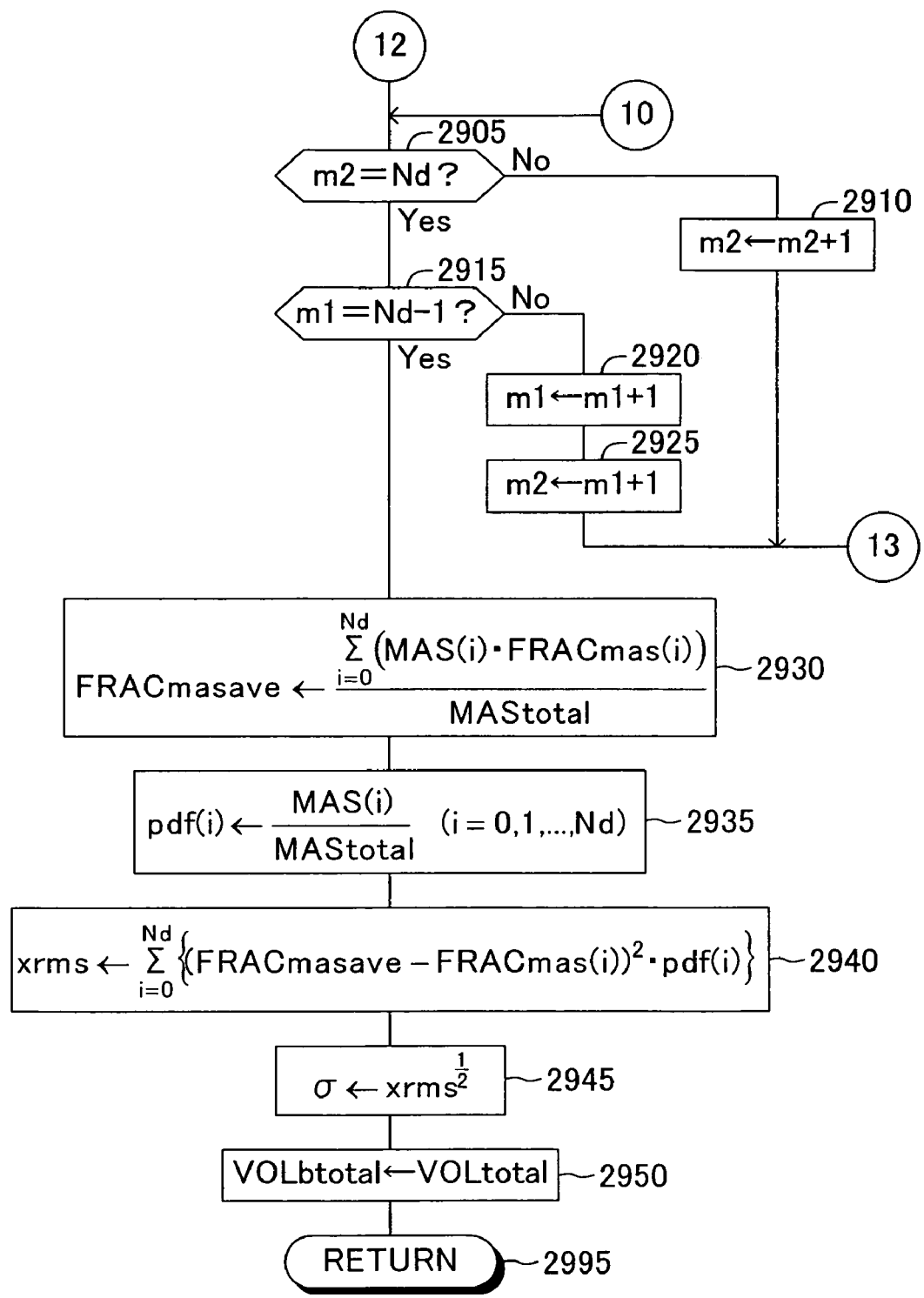
FIG. 29 is a flowchart showing a fourth portion of the sub routine for calculating the nonuniformity, which is executed by the CPU shown in FIG. 1.

Next, the CPU 61 proceeds to step 2905 of FIG. 29, and determines whether or not the section number m2 is equal to the value Nd. At the present point in time, the section number m2 is one because of the processing of the previously-described step 2705 and is smaller than the value Nd. Therefore, the CPU 61 makes a "No" determination in step 2905, and proceeds to step 2910 so as to increment the value of the section number m2 by one. After that, the CPU 61 returns to the step 2710 of FIG. 27.

In the case where the CPU 61 makes a "Yes" determination in step 2710, it executes the processing of steps 2715 to 2855 for the "collision reaction between the gas volumes (m1) and (m2)" of a new combination. Thus, the calculation of various physical quantities which change in accordance with the "collision reaction between the gas volumes (m1) and (m2)" of the new combination is completed. Such processing is repeatedly executed until the section number m2, which increases as a result of repeated execution of step 2910, reaches the value Nd.

Here, the section number m2 is assumed to have reached the value Nd in this state. In such a case, the CPU 61 makes a "Yes" determination in step 2905, and proceeds to step 2915 so as to determine whether or not the section number m1 is equal to the value "Nd−1." At the present point in time, the section number m1 is zero because of the processing of the previously-described step 2705 and is smaller than the value "Nd−1." Therefore, the CPU 61 makes a "No" determination in step 2915, and proceeds to step 2920 so as to increment the value of the section number m1 by one. In step 2925 subsequent thereto, the CPU 61 sets the section number m2 to a value "m1+1," and the CPU 61 returns to the step 2710 of FIG. 27.

Such processing is repeatedly executed until the section number m1, which increases as a result of repeated execution of step 2920, reaches the value "Nd−1." As a result, the calculations associated with the collision reaction is successively executed for all combinations each formed by two gas volumes of the plurality of gas volumes (i) which are present (that is, whose volume VOL(i) is not zero) in the gas mixture at the present point in time.

Here, the section number ml is assumed to have reached the value "Nd−1" in this state. In such a case, the CPU 61 makes a "Yes" determination in step 2915, and proceeds to step 2930 so as to obtain the average value FRACmasave of the fuel mass fractions within the gas mixture on the basis of the mass MAS(i) of the gas volume (i) at the present point in time (i=0, 1, . . . , Nd), the total gas volume mass MAStotal obtained in the previously-described step 2650, and the above-described Equation (44).

The CPU 61 then proceeds to step 2935, and obtains the ratio (mass fraction pdf(i)) of the mass MAS(i) of the gas volume (i) to the total gas volume mass MAStotal (i=0, 1, . . . , Nd). In step 2940 subsequent thereto, the CPU 61 obtains the variance xrms of the fuel mass fractions on the basis of the average value of FRACmasave of the fuel mass fractions, the mass fraction pdf(i) (i=0, 1, . . . , Nd), and an equation described in the block of step 2940.

The CPU 61 then proceeds to step 2945 so as to obtain the standard deviation σ of the fuel mass fractions by calculating the square root of the above-described variance xrms. After that, the CPU 61 proceeds to step 2950 so as to set the previous value VOLbtotal of the spray volume to a value equal to the spray volume VOLtotal updated in the previously-described step 2045, and then proceeds to step 1605 of FIG. 16 via step 2995.

The series of calculations in steps 2935, 2940, and 2945 correspond to the calculation of the above-described Equation (43). Through the above-described processing, the standard deviation σ of the fuel mass fractions within the gas mixture at the present point in time is calculated. The standard deviation σ is reflected in the calculation of the combustion speed qrz2 within the zone 2 after ignition (steps 2180 and 2185 of FIG. 21) and the calculation of the combustion speed qrz3 within the zone 3 (steps 2440 of FIG. 24), which calculations will be described later.

When the CPU 61 proceeds to step 1605 of FIG. 16, it determines whether or not the value of the flag XIG is "0." At the present point in time, the value of the flag XIG is "0" because of the processing of the previously-described step 1515. Accordingly, the CPU 61 makes a "Yes" determination in step 1605, and proceeds to step 1610 so as to determine whether or not the gas temperature Tr2 within the zone 2, which is updated/increased in the previously-described step 2225, is higher than a predetermined ignition temperature Tig (that is, whether or not ignition has occurred).

Since the crank angle CA is immediately after the fuel injection timing CAinj at the present point in time, the gas temperature Tr2 within the zone 2 is sufficiently lower than the ignition temperature Tig. Accordingly, the CPU 61 makes a "No" determination in step 1610, and proceeds to step 1615 so as to increment the value of the variable j by one. After that, the CPU 61 performs the processings of steps 1620 and 1625. As a result, the crank angle CA on calculation is increased by the minute crank angle ΔCA in response to the increment of the variable j.

In the case where the CPU 61 makes a "No" determination in step 1625, it returns to step 1520 of FIG. 15 and again executes the processings of steps 1520 (the routine of FIG. 19), 1525, 1535 (the routine of FIGS. 20 to 22), 1540, 1545, 1550, and 1555 (the routine of FIGS. 26 to 29); and steps 1605, 1610, 1615, 1620, and 1625 of FIG. 16 successively.

Thus, the various physical quantities of the gas within the zone 1, the various physical quantities of the gas within the zone 2, and the standard deviation σ of the fuel mass fractions within the gas mixture are calculated and updated in response to the increase of the crank angle CA (=CAinj+j·ΔCA). Further, at this stage, the heat generation rate Hr(j) for the crank angle CA (=CAinj+j·ΔCA) is calculated such that it becomes equal to the heat generation rate Hrz2(j) obtained from the combustion speed qrz2 (g/sec) within the zone 2 (the speed of premix combustion based on low-temperature oxidation reaction).

Figure 21:
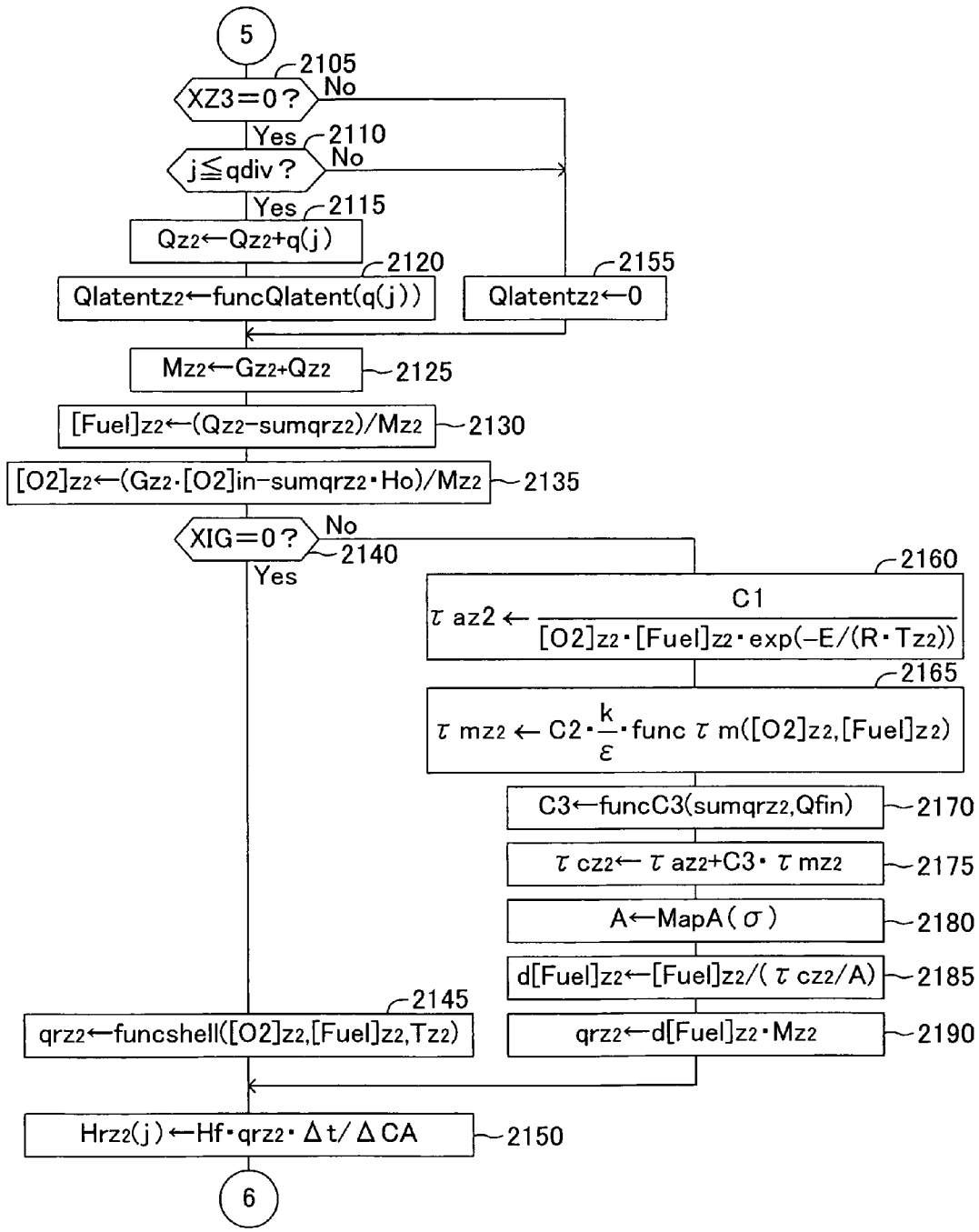
FIG. 21 is a flowchart showing a second portion of the sub routine for performing calculations associated with the zone 2, which is executed by the CPU shown in FIG. 1.

Such processing is repeatedly executed as long as a "Yes" determination is made in step 2140 of FIG. 21 (so long as the gas temperature Tz2 within the zone 2 is equal to or lower than the ignition temperature Tig).

First, there will be described the case where the fuel injection ends in the state in which the gas temperature Tz2 within the zone 2 is equal to or lower than the ignition temperature Tig (that is, the fuel injection does not continue after the ignition; the zone 3 is not generated). In such a case, the CPU 61 starts to operate such that it makes a "No" determination when it proceeds to step 2110 of FIG. 21, and then proceeds to step 2155. Therefore, after that point in time, the latent heat Qlatentz2 (used in step 2210 of FIG. 22) is set to zero. In addition, since the processing of step 2115 is not executed, after that point in time, the zone 2 injected fuel quantity Qz2 (used in step 2130) is fixed to the value at the present point in time (=q(1)+q(2)+ . . . +q(qdiv)=Qfin).

Figure 26:
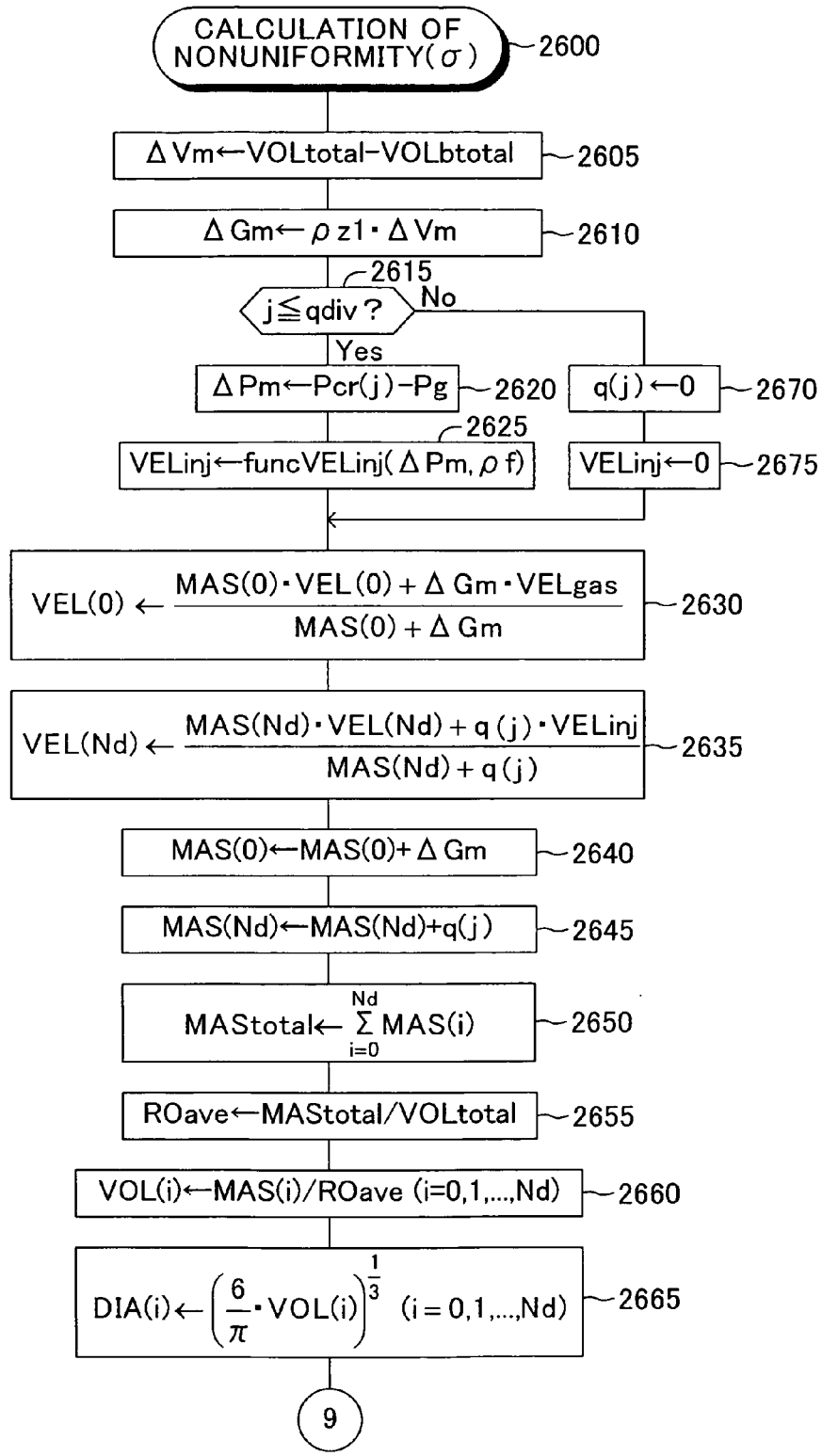
FIG. 26 is a flowchart showing a first portion of a sub routine for calculating a nonuniformity, which is executed by the CPU shown in FIG. 1.

Further, the CPU 61 starts to operate such that it makes a "No" determination when it proceeds to step 2615 of FIG. 26, proceeds to step 2670 so as to set the value of the fuel quantity q(j) to zero, and then proceeds to step 2675 so as to set the velocity VELinj of the new fuel to zero. Accordingly, after that point in time, even when the processing of step 2635 is executed, the velocity VEL(Nd) of the gas volume (Nd) (accordingly, the volume of fuel vapor) does not change.

When the gas temperature Tz2 within the zone 2 exceeds to the ignition temperature Tig (that is, ignition has occurred), the CPU 61 makes a "Yes" determination when it proceeds to step 1610 of FIG. 16, and proceeds to step 1630 so as to update the value of the flag XIG from "0" to "1." In step 1635 subsequent thereto, the CPU 61 determines whether or not the value of the variable j is smaller than the division number qdiv (that is, whether or not the fuel injection continues).

At the present point in time, the fuel injection has ended as described above. Therefore, the CPU 61 makes a "No" determination in step 1635, and proceeds to step 1615 without executing step 1640. As a result, after that point in time, the CPU 61 starts to operate such that the CPU 61 makes a "No" determination when it proceeds to step 1605 of FIG. 16, and proceeds directly to step 1615. As a result, the value of the flag XIG is maintained at "1," and the value of the flag XZ3 is maintained at "0."

Accordingly, after that point in time, the CPU 61 makes a "NO" determination every time it proceeds to step 1540 of FIG. 15. AS a result, the "calculation for the zone 3" of the step 1560 (the routine of FIGS. 23 to 25) is not executed.

Meanwhile, after that point in time, the CPU 61 starts to operate in such a manner that it makes a "NO" determination when it proceeds to step 2140 of FIG. 21, and then proceeds to step 2160 so as to obtain the laminar flow characteristic time $\tau az2$ on the basis of the oxygen concentration [O2]z2 within the zone 2 obtained in the previously-described step 2135, the fuel concentration [Fuel]z2 within the zone 2 obtained in the previously-described step 2130, the gas temperature Tz2 within the zone 2 updated in the step 2225 of FIG. 22 during the previous execution of the present routine, and the above-described Equation (22).

Subsequently, the CPU 61 proceeds to step 2165, and obtains the turbulent flow characteristic time $\tau mz2$ on the basis of the value (k/ϵ) obtained in step 2035 of FIG. 20, the above-described the oxygen concentration [O2]z2 within the zone 2, the above-described fuel concentration [Fuel]z2 within the zone 2, the above-described function func$\tau$m, and the above-described Equation (23).

Figure 17:
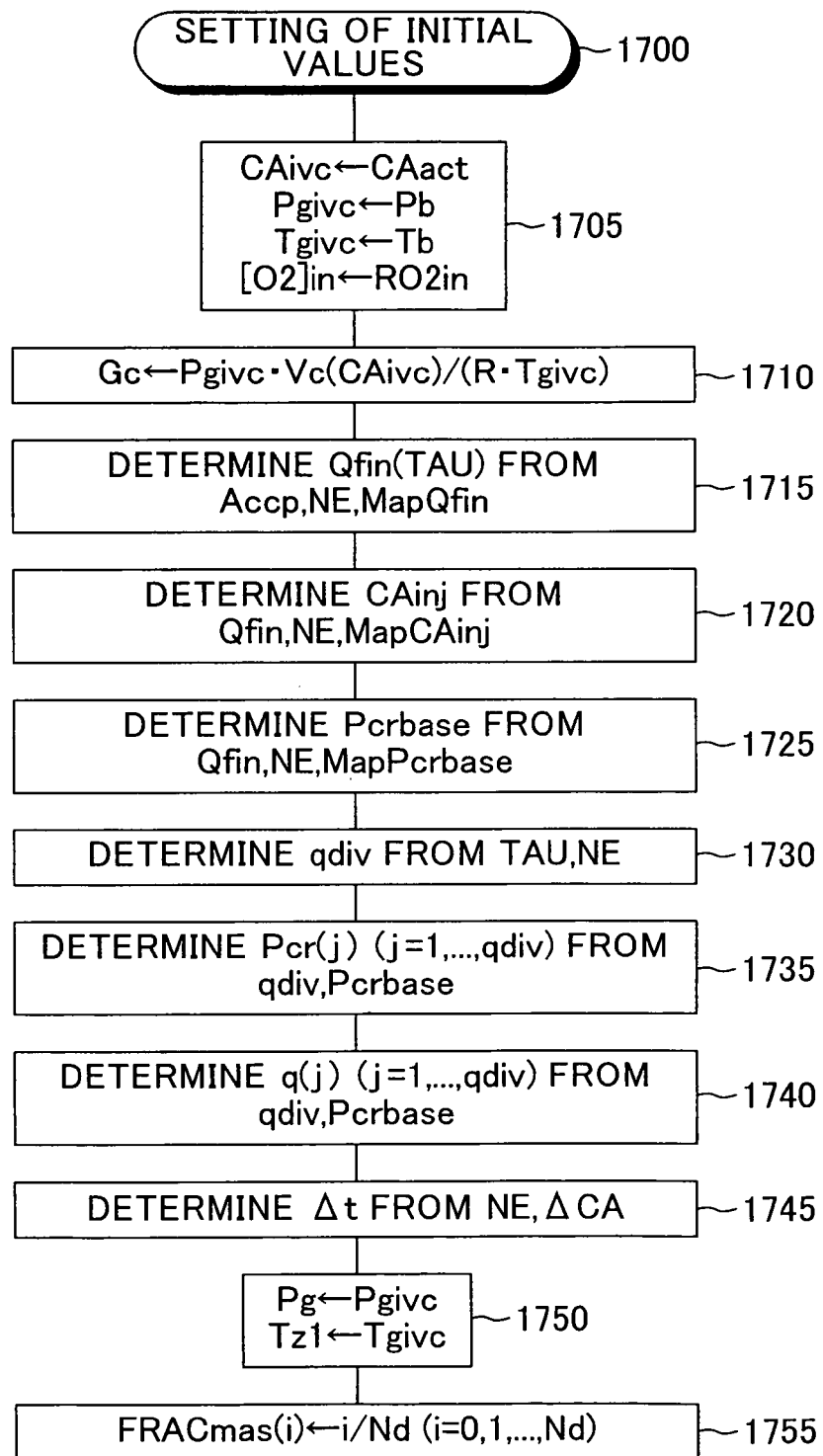
FIG. 17 is a flowchart showing a first half of a sub routine for setting initial values, which is executed by the CPU shown in FIG. 1.

The CPU 61 then proceeds to step 2170, and obtains a coefficient C3 on the basis of the consumed fuel quantity sumqrz2 of the zone 2 updated in step 2235 of FIG. 22 during the previous execution of the present routine, the fuel injection quantity Qfin calculated in step 1715 of FIG. 17, and a function funcC3. With this calculation, the coefficient C3 is set such that the greater the value (sumqrz2/Qfin), the greater the coefficient C3.

Next, the CPU 61 proceeds to step 2175, and obtains a characteristic time $\tau cz2$ associated with the combustion within the zone 2 on the basis of the above-described, obtained laminar flow characteristic time $\tau az2$, the turbulent flow characteristic time $\tau mz2$, the coefficient C3, and the above-described Equation (21). The CPU 61 then proceeds to step 2180 so as to obtain a correction coefficient A on the basis of the standard deviation σ updated in step 2945 of FIG. 29 and the table shown in FIG. 13.

Subsequently, the CPU 61 proceeds to step 2185, and obtains a fuel concentration decrease speed d[Fuel]z2 on the basis of the above-described fuel concentration [Fuel]z2 within the zone 2, the above-described characteristic time $\tau cz2$, the above-described correction coefficient A, and an equation in described in the block of step 2185. In step 2190 subsequent thereto, the CPU 61 obtains the combustion speed qrz2 (g/sec) of the zone 2 on the bases of the above-described fuel concentration decrease speed d[Fuel]z2, the gas mass Mz2 within the zone 2 obtained in step 2125, and an equation in described in the block of step 2190. The calculations in steps 2185 and 2190 correspond to the calculation of the above-described Equation (45).

As described above, after the ignition (that is, the flag XIG=1; the flag XZ3=0) in the case where the fuel injection does not continue after the ignition (that is, the zone 3 is not generated), the heat generation rate Hr(j) for the crank angle CA (=CAinj+j·ΔCA) is calculated such that it is equal to the heat generation rate Hrz2(j) obtained from the combustion speed qrz2 (g/sec) determined in consideration of diffusion combustion and premix combustion based on high-temperature oxidation reaction within the zone 2 (see step 2150 of FIG. 21 and step 1545 of FIG. 15).

When the crank angle CA on calculation, which is increased by the minute crank angle ΔCA each time through repeated execution of step 1620 of FIG. 16, reaches the above-described calculation end crank angle CAend, the CPU 61 makes a "Yes" determination in step 1625, and ends the main routine shown in FIGS. 15 and 16.

As described above, the processing of the main routine ends immediately after IVC. Accordingly, in this case, for the case where the fuel injection does not continue after the ignition, the heat generation rate Hr(j) (j=1, 2, . . . ) for the crank angle CA (=CAinj+j·ΔCA) during the period between the crank angel CAinj and the crank angle CAend for the cylinder into which fuel is injected this time can be obtained immediately after IVC (accordingly, before the actual fuel injection timing CAinj comes).

Accordingly, combustion noise, torque, etc., which may be generated from the combustion of fuel injected this time, can be predicted immediately after IVC. Therefore, the manner of fuel injection (fuel injection pressure, fuel injection timing, etc.) for the fuel injection of this time can be feedback-controlled on the basis of the prediction results such that the combustion noise, the generated torque, etc. are maintained at proper values.

Next, there will be described the case of post-ignition continued injection (the zone 3 is generated). In this case, the gas temperature Tz2 within the zone 2 exceeds the ignition temperature Tig during the period in which the fuel injection continues (that is, the period of the variable j<qdiv). Accordingly, when the gas temperature Tz2 within the zone 2 exceeds the ignition temperature Tig, the CPU 61 makes a "Yes" determination in step 1610 of FIG. 16, and executes the processing of step 1630. Further, the CPU 61 makes a "Yes" determination in step 1635 subsequent thereto, and proceeds to step 1640 so as to change the value of the flag XZ3 from "0" to "1."

Figure 23:
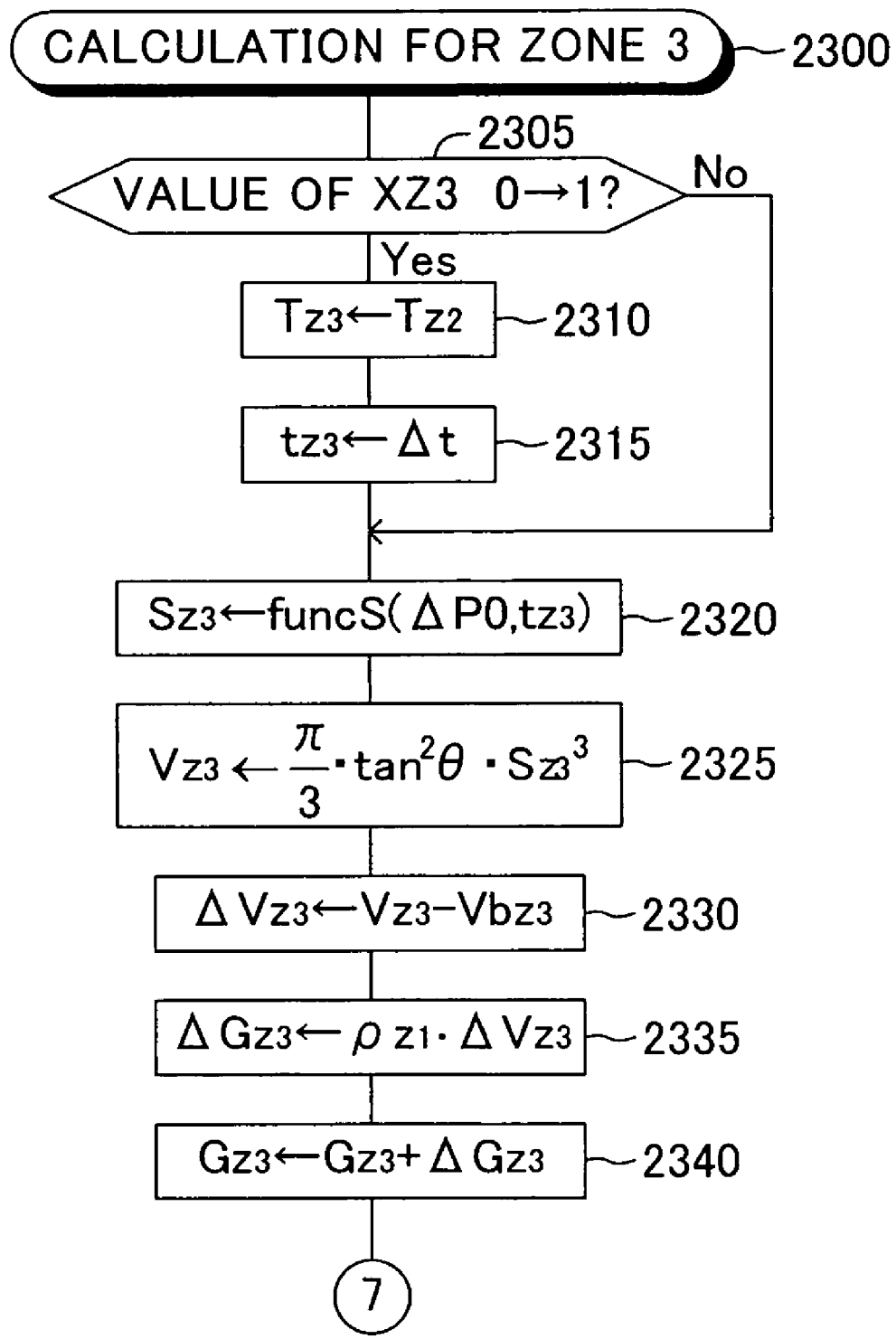
FIG. 23 is a flowchart showing a first portion of a sub routine for performing calculations associated with the zone 3, which is executed by the CPU shown in FIG. 1.
Figure 24:
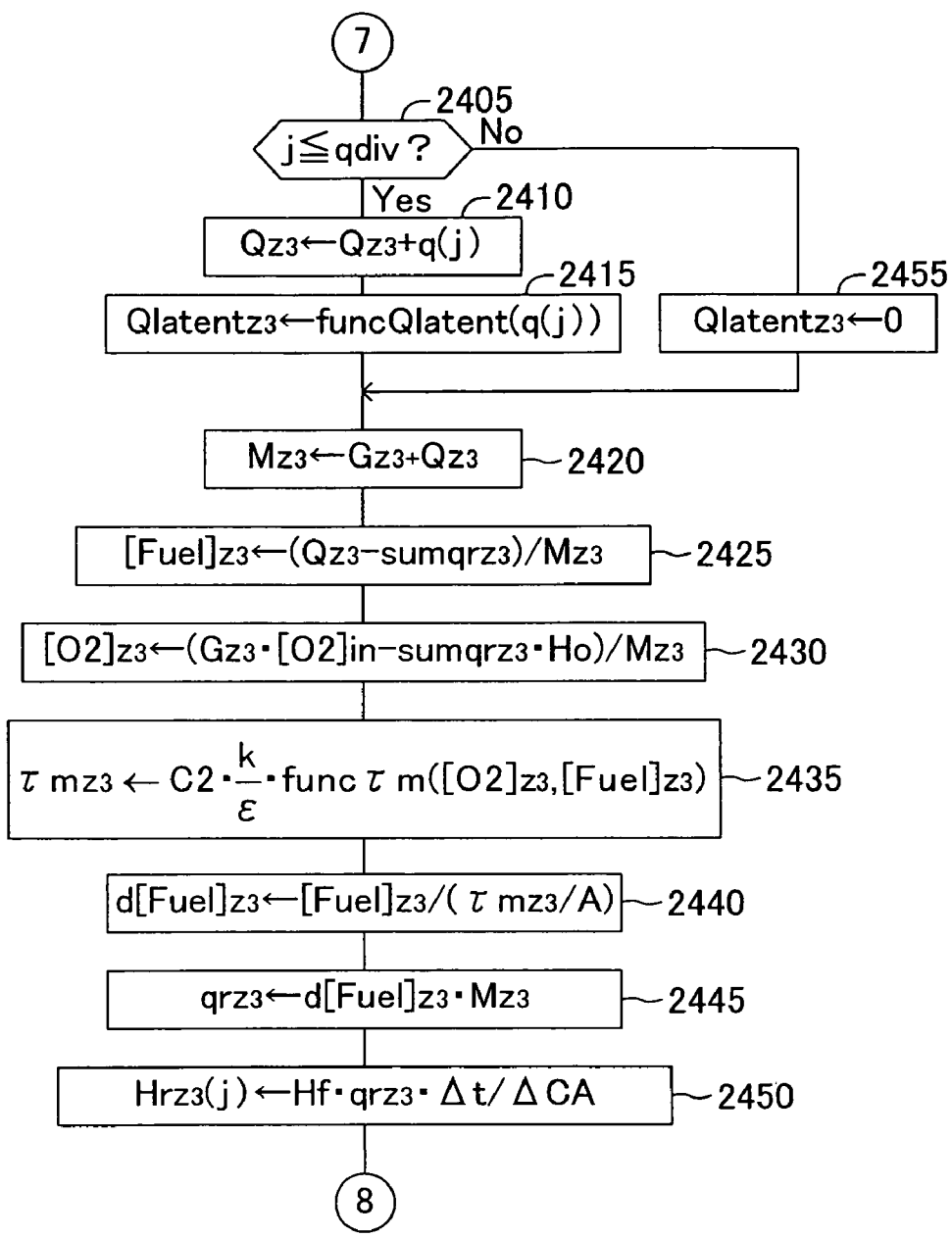
FIG. 24 is a flowchart showing a second portion of the sub routine for performing calculations associated with the zone 3, which is executed by the CPU shown in FIG. 1.
Figure 25:
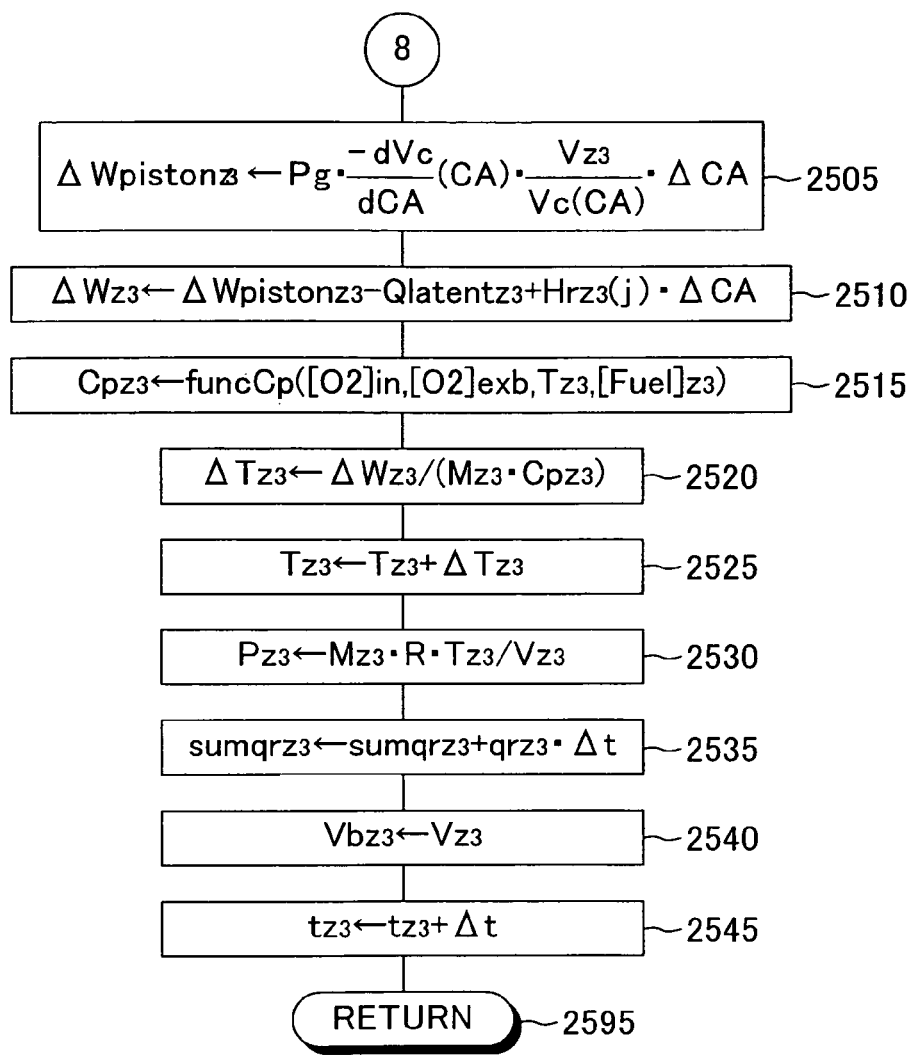
FIG. 25 is a flowchart showing a third portion of the sub routine for performing calculations associated with the zone 3, which is executed by the CPU shown in FIG. 1.

AS a result, after that point in time, in addition to the value of the flag XIG, the value of the flag XZ3 is maintained at "1." Accordingly, the CPU 61 starts to operate such that it makes a "Yes" determination when it proceeds to step 1540 of FIG. 15, and executes the processing of step 1560 (accordingly, the routines of FIGS. 23 to 25 for "calculation for the zone 3"). That is, the processings of steps 1520 (the routine of FIG. 19), 1525, 1535 (the routine of FIGS. 20 to 22), 1540, 1560 (the routine of FIGS. 23 to 25), 1545, 1550, and 1555 (the routine of FIGS. 26 to 29); and steps 1605, 1615, 1620, and 1625 of FIG. 16 are repeated executed. The details of the routines of FIGS. 23 to 25 for "calculation for the zone 3" will be described in detail later.

Thus, the various physical quantities of the gas within the zone 1, the various physical quantities of the gas within the zone 2, the various physical quantities of the gas within the zone 3, and the standard deviation as of the fuel mass fractions within the gas mixture are calculated and updated in response to the increase of the crank angle CA (=CAinj+j·ΔCA). Further, in this case, a "No" determination is made in step 2140 of FIG. 21, and the above-described steps 2160 to 2190 are executed. Therefore, the heat generation rate Hrz2(j) of the zone 2 for the crank angle CA (=CAinj+j·ΔCA) is calculated from the combustion speed qrz2 (g/sec) which is determined in consideration of diffusion combustion and premix combustion based on high-temperature oxidation reaction within the zone 2 (see step 2150).

Further, the heat generation rate Hrz3(j) of the zone 3 for the crank angle CA (=CAinj+j·ΔCA) is calculated from the combustion speed qrz3 (g/sec) which is determined in consideration of diffusion combustion within the zone 3 only (see step 2450 of FIG. 24 to be described later). The heat generation rate Hr(j) for the crank angle CA (=CAinj+j·ΔCA) is calculated such that it becomes equal to the sum (Hrz2(j)+Hrz3(j)) of the heat generation rate Hrz2(j) of the zone 2 and the heat generation rate Hrz3(j) of the zone 3 (see step 1545 of FIG. 15).

Notably, in this case, after the time of ignition (that is, after a point in time when the value of the flag XZ3 has become "1"), the CPU 61 makes a "No" determination when it proceeds to step 2105 of FIG. 21, and proceeds directly to step 2155. That is, after the time of ignition, the latent heat Qlatentz2 for the zone 2 is maintained at zero, and the zone 2 injected fuel quantity Qz2 is fixed to the value at the present point in time (<Qfin). This is processing for coping with the fact that, after the time of ignition, the fuel injection is performed for the zone 3 only, and is not performed for the zone 2.

In addition, in this case, after the time of ignition (that is, after the point in time when the value of the flag XZ3 has become "1"), the CPU 61 makes a "No" determination when it proceeds to step 2050 of FIG. 20, and proceeds to step 2075 so as to obtain the volume Vz2 of the zone 2 in accordance with the above-described Equation (28); i.e., by subtracting the volume Vz3 of the zone 3, which is updated at step 2325 of FIG. 23 to be described later, from the spray volume VOLtotal obtained in step 2045. This corresponds to the fact that a portion occupied by the zone 3 is started to be generated within the spray volume VOLtotal after the time of ignition.

Next, the routine of FIGS. 23 to 25 for "calculation for the zone 3" will be described in detail. As described above, in the case of post-ignition continued injection, the value of the flag XZ3 is changed from "0" to "1" at the time of ignition. Therefore, after the time of ignition, the CPU 61 starts to operate such that the CPU 61 makes a "Yes" determination when it proceeds to step 1540 of FIG. 15, and proceeds to step 1560. In step 1560, the CPU 61 starts the processing of a series of routines (sub routine) shown in FIGS. 23 to 25 in the form of flowcharts from step 2300 so as to perform the "calculation for the zone 3."

When the CPU 61 proceeds from step 2300 to step 2305, it determines whether or not the present point in time is immediately after the value of the flag XZ3 has been changed from "0" to "1." Here, the present point in time is assumed to be immediately after the value of the flag XZ3 has been changed from "0" to "1" by the processing of step 1640 of FIG. 16. In such a case, the CPU 61 makes a "Yes" determination in step 2305, and proceeds to step 2310 so as to set the gas temperature Tz3 (the initial value thereof) within the zone 3 to a value equal to the gas temperature Tz2 within the zone 2 updated in the previously-described step 2225 (that is, the gas temperature within the zone 2 at the start of ignition).

Subsequently, the CPU 61 proceeds to step 2315 so as to set the post ignition time tz3 to the minute time Δt. As described above, various values necessary for starting calculation for zone 3 are calculated in steps 2310 and 2315.

Next, the CPU 61 proceeds to step 2320, and obtains the reach distance Sz3 on the basis of the above-described effective injection pressure ΔP0, the post ignition time tz3, and a function func corresponding to the above-described Equation (12). In step 2325 subsequent thereto, the CPU 61 obtains the volume Vz3 of the zone 3 on the basis of the spray angle θ obtained in the previously-described step 2025, the reach distance Sz3, and an equation corresponding to the above-described Equation (13).

Next, the CPU 61 proceeds to step 2330, and obtains an increase amount ΔVz3 of the volume of the zone 3 during the minute time Δt by subtracting the previous value Vbz3 of the volume of the zone 3 from the above-described volume Vz3 of the zone 3. Only in the present time (first time), "0" is used as Vbz3 because of the processing of the above-described step 1805. However, from the next time, the value updated in step 2540 (which will be described later) during immediately previous execution of the present routine is used.

Next, the CPU 61 proceeds to step 2335, and obtains an increase amount ΔGz3 of the zone 3 cylinder interior gas mass during the minute time Δt by multiplying the gas density ρz1 within the zone 1 updated in the previously-described step 1915 by the above-described increase amount ΔVz3 of the volume of the zone 3. Subsequently, the CPU 61 proceeds to step 2340, and updates the zone 3 cylinder interior gas mass Gz3 by adding the above-described increase amount ΔGz3 to the value at the present point in time (this time (first time), "0" because of the processing of the previously-described step 1815).

Subsequently, the CPU 61 proceeds to step 2405 of FIG. 24, and determines whether or not the value of the variable j is equal to or less than the division number qdiv. As in the above-described case, the relation "j≦qdiv" corresponds to the state in which the fuel injection continues, and the relation "j>qdiv" corresponds to the state after completion of the fuel injection.

In the case where the fuel injection continues ("j≦qdiv"), the CPU 61 makes a "Yes" determination step 2405, and proceeds to step 2410 so as to update the zone 3 injected fuel quantity Qz3 by adding the fuel quantity q(j) during the minute time Δt obtained in the previously-described step 1740 to the value at the present point in time (this time (first time), "0" because of the processing of the previously-described step 1820). The CPU 61 then proceeds to step 2415, and obtains the latent heat Qlatentz3 on the basis of the above-described fuel quantity q(j) and a function funcQlatent for obtaining the latent heat by using q(j) as an argument.

Meanwhile, after the end of fuel injection (j>qdiv), the CPU 61 makes a "No" determination in step 2405, and proceeds to step 2455. After that point in time, the latent heat Qlatentz3 is set to zero.

When the CPU 61 proceeds to step 2420, it obtains the gas mass Mz3 within the zone 3 by adding the zone 3 injected fuel quantity Qz3 obtained in the previously-described step 2410 to the zone 3 cylinder interior gas mass Gz3 obtained in the previously-described step 2340.

Subsequently, the CPU 61 proceeds to step 2425, and obtains the fuel concentration [Fuel]z3 within the zone 3 on the basis of the above-described zone 3 injected fuel quantity Qz3, the zone 3 consumed fuel quantity sumqrz3, the above-described gas mass Mz3 within the zone 3, and an equation corresponding to the above-described Equation (25). Only in the present time (first time), "0" is used as sumqrz3 because of the processing of the above-described step 1825. However, from the next time, the value updated in step 2535 (which will be described later) during immediately previous execution of the present routine is used.

The CPU 61 then proceeds to step 2430, and obtains the oxygen concentration [O2]z3 within the zone 3 on the basis of the above-described zone 3 cylinder interior gas mass Gz3, the intake-gas oxygen concentration [O2]in set in the previously-described step 1705, the above-described consumed fuel quantity sumqrz3, the above-described gas mass Mz3 within the zone 3, and an equation corresponding to the above-described Equation (27). For sumqrz3, the same value as that used in step 2425 is used.

Figure 20:
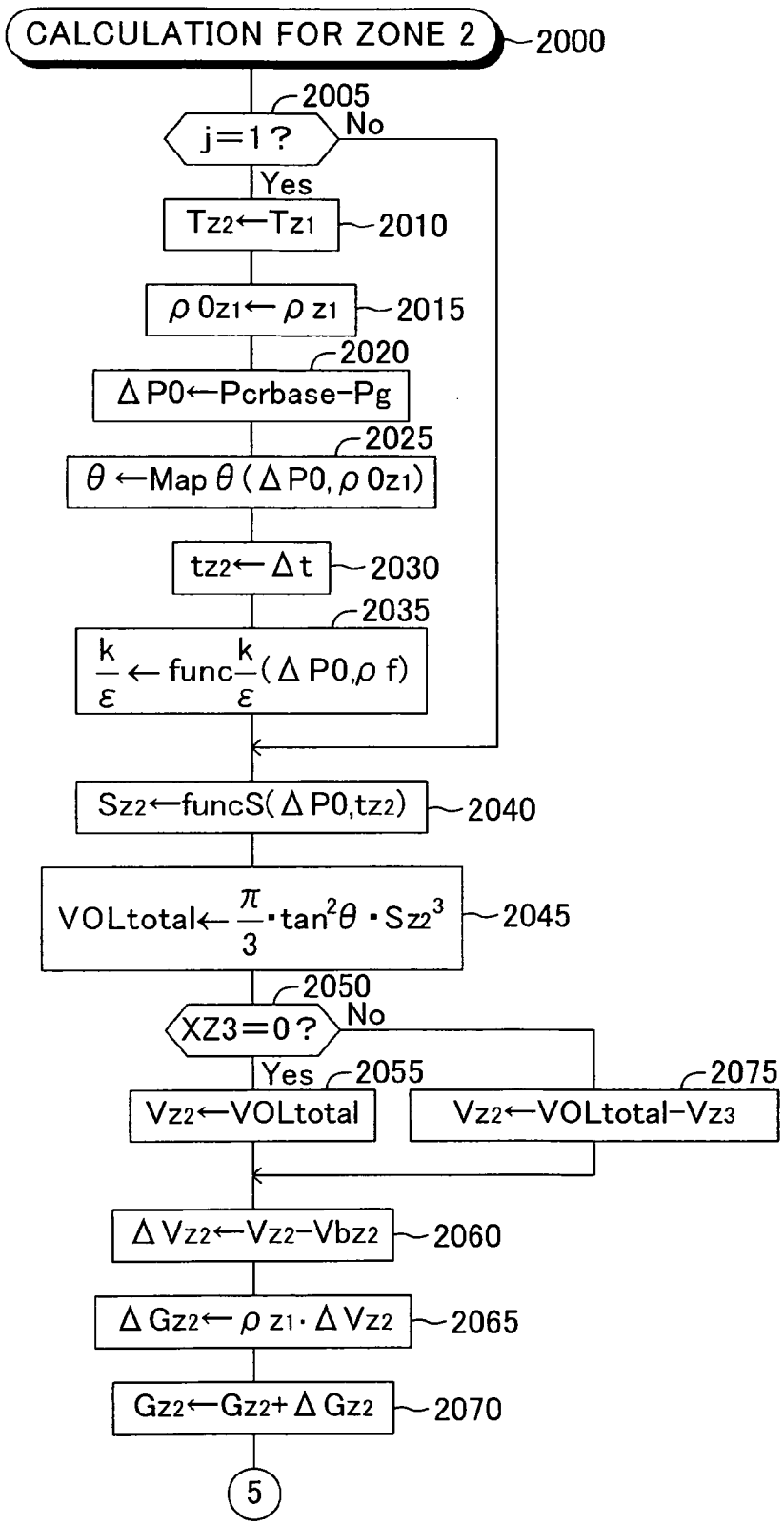
FIG. 20 is a flowchart showing a first portion of a sub routine for performing calculations associated with the zone 2, which is executed by the CPU shown in FIG. 1.

Next, the CPU 61 proceeds to step 2435, and obtains the turbulent flow characteristic time Tmz3 on the basis of the value (k/ε) obtained in step 2035 of FIG. 20, the above-described the oxygen concentration [O2]z3 within the zone 3, the above-described fuel concentration [Fuel]z3 within the zone 3, the above-described function funcτm, and the above-described Equation (32).

The CPU 61 then proceeds to step 2440, and obtains a fuel concentration decrease speed d[Fuel]z3 on the basis of the above-described fuel concentration [Fuel]z3 within the zone 3, the above-described turbulent flow characteristic time τmz3, the above-described correction coefficient A, and an equation in described in the block of step 2440. In step 2445 subsequent thereto, the CPU 61 obtains the combustion speed qrz3 (g/sec) of the zone 3 on the bases of the above-described fuel concentration decrease speed d[Fuel]z3, the gas mass Mz3 within the zone 3 obtained in step 2420, and an equation in described in the block of step 2445. The calculations in steps 2440 and 2445 correspond to the calculation of the above-described Equation (46).

Subsequently, the CPU 61 proceeds to step 2450, and obtains the heat generation rate Hrz3(j) of the zone 3 on the basis of the obtained combustion speed qrz3 and an equation corresponding to the above-described Equation (24). The heat generation rate Hrz3(j) is a value at the crank angle CA (=CAinj+j·ΔCA). In this manner, the heat generation rate Hrz3(j) of the zone 3 is calculated from the combustion speed qrz3 (g/sec) determined in consideration of diffusion combustion within the zone 3 only.

Next, the CPU 61 proceeds to step 2505 of FIG. 25, and obtains the minute piston work ΔWpistonz3 for the zone 3 on the basis of the combustion chamber internal pressure Pg (see step 1550 of FIG. 15), the above-described volume Vz3 of the zone 3, and an equation corresponding to the above-described Equation (19).

The CPU 61 then proceeds to step 2510, and obtains the minute energy ΔWz3 for the zone 3 on the basis of the above-described minute piston work ΔWpistonz3 for the zone 3, the latent heat Qlatentz3 obtained in the previously-described step 2415, the heat generation rate Hrz3(j) obtained in the previously-described step 2450, and an equation corresponding to the above-described Equation (18).

Next, the CPU 61 proceeds to step 2515, and obtains the constant-pressure specific heat Cpz3 of the gas within the zone 3 on the basis of the above-described intake-gas oxygen concentration [O2]in, the above-described exhaust-gas oxygen concentration [O2]exb, the gas temperature Tz3 within the zone 3, and the fuel concentration [Fuel]z3 within the zone 3 obtained in the previously-described step 2425, and an equation corresponding to the above-described Equation (17).

Subsequently, the CPU 61 proceeds to step 2520, and obtains an increase amount ΔTz3 of the gas temperature within the zone 3 on the basis of the minute energy ΔWz3 obtained in the previously-described step 2510, the gas mass Mz3 within the zone 3 obtained in the previously-described step 2420, and the above-described constant-pressure specific heat Cpz3 of the gas within the zone 3. The CPU 61 then proceeds to step 2525 so as to update the gas temperature Tz3 within the zone 3 by adding the above-described increase amount ΔTz3 to the value at the present point in time.

Next, the CPU 61 proceeds to step 2530, and obtains the gas pressure Pz3 within the zone 3 on the basis of the above-described gas mass Mz3 within the zone 3, the above-described, updated gas temperature Tz3 within the zone 3, the volume Vz3 of the zone 3 obtained in the previously-described step 2325, and the state equation of the gas within the zone 3 (see an equation in the block of step 2530). In principle, the gas pressure Pz3 within the zone 3 is calculated to have a value different from the gas pressure Pz1 within the zone 1 updated in the previously-described step 1945 and different from the gas pressure Pz2 within the zone 2 updated in the previously-described step 2230.

The CPU 61 then proceeds to step 2535 so as to update the consumed fuel quantity sumqrz3 within the zone 3 by adding a value "qrz3·Δt" to the value at the present point in time. For qrz3, the value obtained in the previously-described step 2445 is used.

The CPU 61 then proceeds to step 2540 so as to set the previous value Vbz3 of the volume of the zone 3 to the above-described volume Vz3 of the zone 3. In step 2545 subsequent thereto, the CPU 61 updates the post ignition time tz3 by adding the minute time Δt to the value at the present point in time. After that, the CPU 61 returns to step 1545 of FIG. 15 via step 2595.

In the case of post-ignition continued injection, through the above-described procedure, the various physical quantities of the gas within the zone 3 at the crank angle CA (=CAinj+j·ΔCA) are calculated and updated after the ignition. In the case of post-ignition continued injection as well, as in the case where the fuel injection does not continue after the ignition, the heat generation rate Hr(j) (j=1, 2, . . . ) for the crank angle CA (=CAinj+j·ΔCA) during the period between the crank angel CAinj and the crank angle CAend for the cylinder into which fuel is injected this time can be obtained immediately after IVC (accordingly, before the actual fuel injection timing CAinj comes).

Accordingly, combustion noise, torque, etc., which may be generated from the combustion of fuel injected this time, can be predicted immediately after IVC. Therefore, the manner of fuel injection (fuel injection pressure, fuel injection timing, etc.) for the fuel injection of this time can be feedback-controlled on the basis of the prediction results such that the combustion noise, the generated torque, etc. are maintained at proper values.

Figure 27:
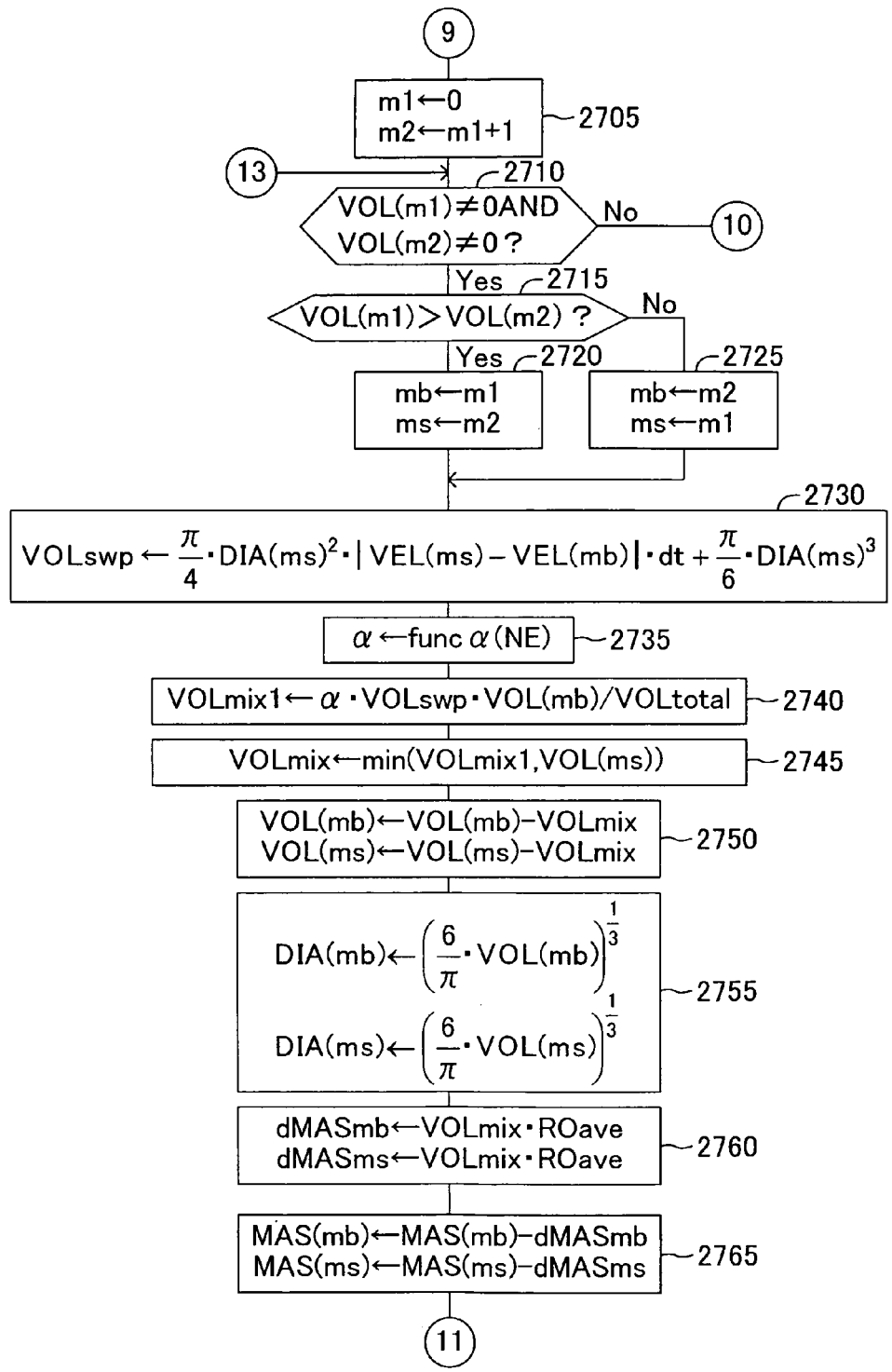
FIG. 27 is a flowchart showing a second portion of the sub routine for calculating the nonuniformity, which is executed by the CPU shown in FIG. 1.

Notably, the above-described nonuniformity acquisition means corresponds to the routine of FIGS. 26 to 29; the above-described fuel-mass-ratio specifying means corresponds to step 2805 of FIG. 28; the above-described gas-volume quantity acquisition means corresponds to steps 2640 and 2645 of FIG. 26, step 2765 of FIG. 27, and step 2855 of FIG. 28; the above-described mixing volume acquisition means corresponds to step 2745 of FIG. 27; the above-described gas-volume velocity acquisition means corresponds to steps 2630 and 2635 of FIG. 26 and steps 2845 and 2850 of FIG. 28; the above-described gas-mixture-state acquisition means corresponds to the routines of FIGS. 19 to 25; the above-described gas-mixture-temperature acquisition means corresponds to step 2225 of FIG. 22 and step 2525 of FIG. 25;

and the above-described fuel-reaction-speed acquisition means corresponds to steps 2145 and 2190 of FIG. 21 and step 2445 of FIG. 24.

As described above, in the embodiment of the gas-mixture-state acquisition apparatus including the gas-mixture-nonuniformity acquisition apparatus according to the present invention, a gas mixture is assumed to be an aggregate of sphere gas volumes (i) having different fuel mass fractions FRACmas(i). In a period after the fuel injection start timing CAinj, in which the gas mixture is being formed, every time the minute time Δt elapses (every time the crank angle increases by the minute crank angle ΔCA), the above-described "collision reaction" is successively performed for all combinations each formed by two arbitrary gas volumes of the gas volumes (i) which are present at that point in time. With this, the distribution of the masses MAS(i) of the gas volumes (i) within the gas mixture is obtained and updated every time the minute time Δt elapses, and the nonuniformity of the gas mixture (the standard deviation σ of fuel mass fractions) is obtained and updated without solving complicated differential equations or the like.

In the present embodiment, the heat generation rate Hr(j) (j=1, 2, . . . ) for the crank angle CA (=CAinj+j·ΔCA) after the fuel injection start timing CAinj is calculated. When this heat generation rate Hr(j) is calculated, in order to solve the above-described problem 2 (see the portions B of FIGS. 6 and 14), the nonuniformity of the gas mixture (the standard deviation σ) obtained in the above-described manner is reflected.

In addition, in order to solve the above-described problem 1 (see the portions A of FIGS. 6 and 14) in the case where fuel injection continues ever after the gas mixture is ignited (the case of post-ignition continued injection), the gas mixture is handled such that it is divided into a portion (zone 2) based on fuel injected before the time of ignition, and a portion (zone 3) based on fuel injected after the time of ignition. Specifically, the heat generation rate Hrz3(j) of the zone 3 is successively calculated in parallel with and independently of the heat generation rate Hrz2(j) of the zone 2 by a calculation method different form the calculation method for the heat generation rate Hrz2(j) of the zone 2 (Hr(j)=Hrz2(j)+Hrz3(j)).

It was found that, when the above-described method is employed, the calculated heat generation rate Hr(j) (j=1, 2, . . . ) for the crank angle CA (CA=CAinj+j·ΔCA) coincides with the experiment results very much (see FIG. 14). Accordingly, since the combustion noise, the generated torque, etc. can be predicted accurately, the manner of fuel injection (fuel injection pressure, fuel injection timing, etc.) can be feed-back-controlled accurately on the basis of the prediction results such that the combustion noise, the generated torque, etc. are maintained at proper values.

The present invention is not limited to the above-described embodiment, and various modifications can be employed within the scope of the present invention. For example, in the above-described embodiment, in order to reflect the nonuniformity of the gas mixture (specifically, the standard deviation σ of fuel mass fractions) in the calculation of the heat generation rate Hr(j), the combustion speed qrz2 of the zone 2 is calculated in accordance with the above-described Equation (45) in which the correction coefficient A (see FIG. 13) corresponding to the standard deviation σ is taken into consideration. However, the combustion speed qrz2 of the zone 2 may be calculated in accordance with the above-described Equation (20) while using the characteristic time τcz2 obtained by the following Equation (47) in which the correction coefficient A is taken into consideration.

$$\tau cz2 = \tau az2 + C3 \cdot \frac{\tau mz2}{A} \quad (47)$$

Further, in the above-described embodiment, the passage volume VOLswp, which serves as a basis for calculation of the mixing volume VOLmix, is obtained in accordance with the above-described Equation (38), which is an equation for obtaining the volume of a capsule-shaped space shown in FIG. 10. However, the passage volume VOLswp may be obtained in accordance with the following Equation (48) (an equation obtained by removing the second term from the right side of the above-described Equation (38)), which is an equation for obtaining the volume of a cylindrical columnar space obtained by removing hemisphere portions from the opposite ends of the capsule-shaped space.

$$VOLswp = \frac{\pi}{4} \cdot DIAsmall^2 \cdot |VELA - VELB| \cdot \Delta t \quad (48)$$

In the present embodiment, it is assumed that all of the fuel of the quantity q(j) injected in a period corresponding to the minute crank angle ΔCA (see step 1740 of FIG. 17) immediately becomes fuel vapor, which is added to the volume of fuel vapor (the gas volume (Nd)). However, it may be assumed that a portion of the injected fuel of the quantity q(j) becomes fuel vapor. In this case, the embodiment may be modified such that a portion of the fuel whose quantity corresponds to a value obtained by multiplying the quantity q(j) by a coefficient C (0<C<1) becomes fuel vapor, which is added to the volume of fuel vapor (the gas volume (Nd)).

In the above-described embodiment, a combination of two gas volumes which are generated in the gas mixture and which are subjected to the "collision reaction" is selected in the ascending order of the fuel mass fraction FRACmas. However, the combination may be selected in the descending order (or the ascending order) of the mass of the gas volume.

In the above-described embodiment, calculation is performed under the assumption that both the volumes of separated portions of two gas volumes which are subjected to the "collision reaction" are equal to the mixing volume VOLmix (see the above-described Equation (39)). However, the separated portions of two gas volumes which are subjected to the "collision reaction" may have different volumes.

In the above-described embodiment, the standard deviation σ of fuel mass fractions, which represents the nonuniformity of the gas mixture, is obtained from the distribution of the mass MAS(i) of he gas volume (i) within the gas mixture. However, the standard deviation σ of fuel mass fractions may be obtained from the distribution of the volume VOL(i) of he gas volume (i) within the gas mixture.

In the above-described embodiment, the standard deviation σ of fuel mass fractions is used as an index value which represents the nonuniformity of the gas mixture. However, the variance of fuel mass fractions (=σ²) may be used.

In the above-described embodiment, in the case where the gas volume (i) whose fuel mass fraction FRACmas(i) completely coincides with the value of the fuel mass fraction FRACmix of the mix-formed gas volume calculated in accordance with the above-described Equation (34) (see step 2805) does not exist, two gas volumes (md) and (mu) whose fuel mass fractions FRACmas(md) and FRACmas(mu) sandwich the value of the fuel mass fraction FRACmix of the mix-formed gas volume are used as the mix-formed gas volume. In this case, a single gas volume (mz) whose fuel mass fractions FRACmas(mz) is the closest to the value of the fuel mass fraction FRACmix of the mix-formed gas volume may be used as the mix-formed gas volume.

In the above-described embodiment, in the above-described Equation (38) used for obtaining the passage volume VOLswp, the difference in velocity between the two to-be-collided gas volumes is used as the relative speed of the two to-be-collided gas volumes (that is, it is assumed that all the gas volumes move in the same direction). However, the relative speed of the two to-be-collided gas volumes may be obtained in consideration of the directions of motions of the gas volumes.

In the above-described embodiment, the gas mixture is assumed to be an aggregate of spherical gas volumes (i) having different fuel mass fractions FRACmas (i). However, the gas mixture may be assumed to be an aggregate of gas volumes (i) having a shape (e.g., a cubic shape) different from that of the spherical gas volumes.

In the above-described embodiment, the heat loss from the gas within the combustion chamber to the wall of the combustion chamber is not taken into consideration when the temperature of the gas within the combustion chamber (the gas temperatures Tz1, Tz2, and Tz3 within the zones 1, 2, and 3). However, the heat loss from the gas within the combustion chamber to the wall of the combustion chamber may be taken into consideration.

What is claimed is:

1. A gas-mixture-nonuniformity acquisition apparatus for an internal combustion engine, comprising:
    nonuniformity acquisition means for acquiring a nonuniformity of fuel concentration within an entire gas mixture where, in a process in which a cylinder interior gas taken into a combustion chamber of the engine and fuel injected into the combustion chamber mix together within the combustion chamber to form a gas mixture, a collision reaction repeatedly takes place within the gas mixture in such a manner that, due to collision of two gas volumes having different fuel mass ratios, respective portions of the two gas volumes mix together, and the mixed portions separate from the corresponding gas volumes, respectively, and form the entirety of another gas volume having a fuel mass ratio different from those of the two gas volumes,
    gas-volume quantity acquisition means for acquiring quantities of two or more gas volumes located within the gas mixture and having different fuel mass ratios; and
    mixing volume acquisition means for acquiring a mixing volume which is a volume in which the respective portions of the collided two gas volumes mix together, wherein
    the gas-volume quantity acquisition means calculates decrease amounts of the quantities of the collided two gas volumes corresponding to the respective portions and an increase amount of the quantity of the another gas volume, by use of the acquired mixing volume, to thereby update and acquire the quantities of the two gas volume and the quantity of the another gas volume; and
    the nonuniformity acquisition means acquires the nonuniformity on the basis of the distribution of the updated and acquired quantities of the respective gas volumes.

2. A gas-mixture-nonuniformity acquisition apparatus for an internal combustion engine according to claim 1, wherein the nonuniformity acquisition means uses, as the nonuniformity, a standard deviation regarding the fuel mass ratio, which is obtained on the basis of the updated and acquired distribution of the quantities of the gas volumes.

3. A gas-mixture-nonuniformity acquisition apparatus for an internal combustion engine according to claim 1, wherein the mixing volume acquisition means acquires the mixing volume on the basis of smaller one of the quantities of the collided two gas volumes.

4. A gas-mixture-nonuniformity acquisition apparatus for an internal combustion engine according to claim 3, wherein the mixing volume acquisition means acquires the mixing volume on the basis of a ratio of the volume of one of the collided two gas volumes having a larger quantity to the volume of the entire gas mixture.

5. A gas-mixture-nonuniformity acquisition apparatus for an internal combustion engine according to claim 1, wherein the nonuniformity acquisition means handles a volume of the cylinder interior gas whose fuel mass ratio is "0" and a volume of fuel vapor whose fuel mass ratio is "1" as the gas volumes to be subjected to the collision reaction.

6. A gas-mixture-nonuniformity acquisition apparatus for an internal combustion engine according to claim 5, wherein the nonuniformity acquisition means acquires the nonuniformity when the collision reaction is successively performed for all combinations each formed by two arbitrary gas volumes among two or more gas volumes located within the gas mixture and having different fuel mass ratios.

7. A gas-mixture-nonuniformity acquisition apparatus for an internal combustion engine according to claim 5, further comprising:
    fuel-mass-ratio specifying means for specifying a fuel mass ratio of the another gas volume by making use of a law of conservation of mass regarding fuel that the sum of masses of fuels contained in the respective portions of the collided two gas volumes is equal to a value obtained by multiplying the sum of masses of the respective portions of the two gas volumes by the fuel mass ratio of the another gas volume.

8. A gas-mixture-nonuniformity acquisition apparatus for an internal combustion engine according to claim 1, further comprising gas-volume velocity acquisition means for acquiring velocities of the two or more gas volumes located within the gas mixture and having different fuel mass ratios,
    wherein the mixing volume acquisition means acquires the mixing volume on the basis of a difference between the velocities of the collided two gas volumes.

9. A gas-mixture-nonuniformity acquisition apparatus for an internal combustion engine according to claim 8, wherein the gas-volume velocity acquisition means updates and acquires the velocity of the another gas volume by making use of a law of conservation of momentum that the sum of a momentum of the another gas volume before the collision reaction and respective momentums of the respective portions of the two gas volumes before the collision reaction is equal to a momentum of the another gas volume after the collision reaction.

10. A gas-mixture-nonuniformity acquisition apparatus for an internal combustion engine according to claim 8, wherein the gas-volume velocity acquisition means acquires the velocity of the volume of the cylinder interior gas while regarding the velocity of the cylinder interior gas newly taken into the gas mixture to be zero.

11. A gas-mixture-nonuniformity acquisition apparatus for an internal combustion engine according to claim 8, wherein the gas-volume velocity acquisition means acquires the velocity of the volume of the fuel vapor by making use of the velocity of the injected fuel.

12. A gas-mixture-state acquisition apparatus for an internal combustion engine comprising gas-mixture-state acquisition means for acquiring the state of the gas mixture by making use of the nonuniformity of fuel concentration within the gas mixture acquired by a gas-mixture-nonuniformity acquisition apparatus according to claim 1.

13. A gas-mixture-state acquisition apparatus for an internal combustion engine according to claim 12, wherein the gas-mixture-state acquisition means comprises:

gas-mixture-temperature acquisition means for acquiring a temperature of the gas mixture; and fuel-reaction-speed acquisition means for acquiring a reaction speed of the fuel while changing a method of acquiring the reaction speed of the fuel within the gas mixture depending on whether or not the temperature of the gas mixture has exceeded a predetermined ignition temperature.

14. A gas-mixture-state acquisition apparatus for an internal combustion engine according to claim 13, wherein the fuel-reaction-speed acquisition means acquires the reaction speed of the fuel in consideration of premix combustion based on low-temperature oxidation reaction when the temperature of the gas mixture has not yet exceeded the predetermined ignition temperature, and acquires the reaction speed of the fuel in consideration of diffusion combustion and premix combustion based on high-temperature oxidation reaction when the temperature of the gas mixture has exceeded the predetermined ignition temperature.

15. A gas-mixture-state acquisition apparatus for an internal combustion engine according to claim 14, wherein, in the case where the injection of fuel continues even after the temperature of the gas mixture has exceeded the predetermined ignition temperature, the fuel-reaction-speed acquisition means divides the gas mixture into a pre-ignition injected portion based on fuel injected before the temperature of the gas mixture has exceeded the predetermined ignition temperature and a post-ignition injected portion based on fuel injected after the temperature of the gas mixture has exceeded the predetermined ignition temperature, individually handles the pre-ignition injected portion and the post-ignition injected portion, acquiring the reaction speed of fuel for the pre-ignition injected portion in consideration of the diffusion combustion and the premix combustion based on the high-temperature oxidation reaction, and acquiring the reaction speed of fuel for the post-ignition injected portion in consideration of the diffusion combustion only.

\* \* \* \* \*